US010963969B1

(12) United States Patent
Konrardy et al.

(10) Patent No.: US 10,963,969 B1
(45) Date of Patent: *Mar. 30, 2021

(54) AUTONOMOUS COMMUNICATION FEATURE USE AND INSURANCE PRICING

(71) Applicant: State Farm Mutual Automobile Insurance Company, Bloomington, IL (US)

(72) Inventors: Blake Konrardy, Bloomington, IL (US); Scott T. Christensen, Gibson City, IL (US); Gregory Hayward, Bloomington, IL (US); Scott Farris, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/201,100

(22) Filed: Nov. 27, 2018

Related U.S. Application Data

(63) Continuation of application No. 14/713,194, filed on May 15, 2015, now Pat. No. 10,181,161.
(Continued)

(51) Int. Cl.
*G06Q 40/08* (2012.01)
*G06Q 10/10* (2012.01)

(52) U.S. Cl.
CPC .................... *G06Q 40/08* (2013.01)

(58) Field of Classification Search
CPC ............... G06Q 40/08; G06Q 10/10
(Continued)

(56) References Cited

U.S. PATENT DOCUMENTS 4,218,763 A 8/1980 Kelley et al.
4,386,376 A 5/1983 Takimoto
(Continued)

FOREIGN PATENT DOCUMENTS

DE 102010001006 A1 7/2011
DE 102015208358 A1 11/2015
(Continued)

OTHER PUBLICATIONS

Garza, Andrew P., "Look Ma, No Hands: Wrinkles and Wrecks in the Age of Autonomous Vehicles", 46 Eng. L. Rev. 581, 616 (2012).
(Continued)

*Primary Examiner* — Hai Tran

(57) ABSTRACT

Methods and systems for determining risk associated with operation of autonomous vehicles using autonomous communication are provided. According to certain aspects, autonomous operation features associated with a vehicle may be determined, including features associated with autonomous communication between vehicles or with infrastructure. This information may be used to determine risk levels for a plurality of features, which may be based upon test data regarding the features or actual loss data. Expected use levels and autonomous communication levels may further be determined and used with the risk levels to determine a total risk level associated with operation of the vehicle. The autonomous communication levels may indicate the types of communications, the levels of communication with other vehicles or infrastructure, or the frequency of autonomous communication. The total risk level may be used to determine or adjust aspects of an insurance policy associated with the vehicle.

20 Claims, 10 Drawing Sheets

Related U.S. Application Data

(60) Provisional application No. 62/056,893, filed on Sep. 29, 2014, provisional application No. 62/047,307, filed on Sep. 8, 2014, provisional application No. 62/036,090, filed on Aug. 11, 2014, provisional application No. 62/035,983, filed on Aug. 11, 2014, provisional application No. 62/035,980, filed on Aug. 11, 2014, provisional application No. 62/035,878, filed on Aug. 11, 2014, provisional application No. 62/035,867, filed on Aug. 11, 2014, provisional application No. 62/035,859, filed on Aug. 11, 2014, provisional application No. 62/035,832, filed on Aug. 11, 2014, provisional application No. 62/035,780, filed on Aug. 11, 2014, provisional application No. 62/035,769, filed on Aug. 11, 2014, provisional application No. 62/035,729, filed on Aug. 11, 2014, provisional application No. 62/035,723, filed on Aug. 11, 2014, provisional application No. 62/035,669, filed on Aug. 11, 2014, provisional application No. 62/035,660, filed on Aug. 11, 2014, provisional application No. 62/018,169, filed on Jun. 27, 2014, provisional application No. 62/000,878, filed on May 20, 2014.

(58) Field of Classification Search
USPC .................................................. 705/4
See application file for complete search history.

(56) References Cited

U.S. PATENT DOCUMENTS

| | | |
|---|---|---|
| 4,565,997 A | 1/1986 | Seko et al. |
| 4,833,469 A | 5/1989 | David |
| 5,214,582 A | 5/1993 | Gray |
| 5,363,298 A | 11/1994 | Survanshi et al. |
| 5,367,456 A | 11/1994 | Summerville |
| 5,368,464 A | 11/1994 | Stewart |
| 5,368,484 A | 11/1994 | Copperman |
| 5,436,839 A | 7/1995 | Dausch |
| 5,453,939 A | 9/1995 | Hoffman et al. |
| 5,488,353 A | 1/1996 | Kawakami et al. |
| 5,499,182 A | 3/1996 | Ousborne |
| 5,515,026 A | 5/1996 | Ewert |
| 5,574,641 A | 11/1996 | Kawakami et al. |
| 5,626,362 A | 5/1997 | Mottola |
| 5,689,241 A | 11/1997 | Clarke et al. |
| 5,797,134 A | 8/1998 | McMillan et al. |
| 5,835,008 A | 11/1998 | Colemere, Jr. |
| 5,983,161 A | 11/1999 | Lemelson |
| 6,031,354 A | 2/2000 | Wiley et al. |
| 6,064,970 A | 5/2000 | McMillan et al. |
| 6,067,488 A | 5/2000 | Tano |
| 6,141,611 A | 10/2000 | Mackey |
| 6,151,539 A | 11/2000 | Bergholz |
| 6,246,933 B1 | 6/2001 | Bague |
| 6,253,129 B1 | 6/2001 | Jenkins et al. |
| 6,271,745 B1 | 8/2001 | Anzai et al. |
| 6,285,931 B1 | 9/2001 | Hattori et al. |
| 6,298,290 B1 | 10/2001 | Abe et al. |
| 6,313,749 B1 | 11/2001 | Horne et al. |
| 6,323,761 B1 | 11/2001 | Son |
| 6,353,396 B1 | 3/2002 | Atlas |
| 6,400,835 B1 | 6/2002 | Lemelson et al. |
| 6,473,000 B1 | 10/2002 | Secreet et al. |
| 6,477,117 B1 | 11/2002 | Narayanaswami et al. |
| 6,553,354 B1 | 4/2003 | Hausner et al. |
| 6,556,905 B1 | 4/2003 | Mittelsteadt et al. |
| 6,570,609 B1 | 5/2003 | Heien |
| 6,579,233 B2 | 6/2003 | Hursh |
| 6,661,345 B1 | 12/2003 | Bevan et al. |
| 6,701,234 B1 | 3/2004 | Vogelsang |
| 6,704,434 B1 | 3/2004 | Sakoh et al. |
| 6,727,800 B1 | 4/2004 | Dutu |
| 6,765,495 B1 | 7/2004 | Dunning et al. |
| 6,795,759 B2 | 9/2004 | Doyle |
| 6,832,141 B2 | 12/2004 | Skeen et al. |
| 6,889,137 B1 | 5/2005 | Rychlak |
| 6,909,647 B2 | 6/2005 | Horiguchi |
| 6,909,947 B2 | 6/2005 | Douros et al. |
| 6,934,365 B2 | 8/2005 | Suganuma et al. |
| 6,944,536 B2 | 9/2005 | Singleton |
| 6,983,313 B1 | 1/2006 | Korkea-Aho |
| 6,987,737 B2 | 1/2006 | Castellano et al. |
| 6,989,737 B2 | 1/2006 | Yasui |
| 7,027,621 B1 | 4/2006 | Prokoski |
| 7,054,723 B2 | 5/2006 | Seto et al. |
| 7,102,496 B1 | 9/2006 | Ernst et al. |
| 7,138,922 B2 | 11/2006 | Strumolo et al. |
| 7,149,533 B2 | 12/2006 | Laird et al. |
| 7,253,724 B2 | 8/2007 | Prakah-Asante et al. |
| 7,254,482 B2 | 8/2007 | Kawasaki et al. |
| 7,266,532 B2 | 9/2007 | Sutton et al. |
| 7,290,275 B2 | 10/2007 | Baudoin et al. |
| 7,302,344 B2 | 11/2007 | Olney et al. |
| 7,315,233 B2 | 1/2008 | Yuhara |
| 7,330,124 B2 | 2/2008 | Ota |
| 7,348,882 B2 | 3/2008 | Adamczyk et al. |
| 7,349,860 B1 | 3/2008 | Wallach et al. |
| 7,356,392 B2 | 4/2008 | Hubbard et al. |
| 7,386,376 B2 | 6/2008 | Basir et al. |
| 7,424,414 B2 | 9/2008 | Craft |
| 7,499,774 B2 | 3/2009 | Barrett |
| 7,565,230 B2 | 7/2009 | Gardner et al. |
| 7,596,242 B2 | 9/2009 | Breed et al. |
| 7,609,150 B2 | 10/2009 | Wheatley et al. |
| 7,639,148 B2 | 12/2009 | Victor |
| 7,676,062 B2 | 3/2010 | Breed et al. |
| 7,692,552 B2 | 4/2010 | Harrington et al. |
| 7,719,431 B2 | 5/2010 | Bolourchi |
| 7,783,426 B2 | 8/2010 | Kato et al. |
| 7,783,505 B2 | 8/2010 | Roschelle et al. |
| 7,791,503 B2 | 9/2010 | Breed et al. |
| 7,792,328 B2 | 9/2010 | Albertson et al. |
| 7,797,107 B2 | 9/2010 | Shiller |
| 7,812,712 B2 | 10/2010 | White et al. |
| 7,813,888 B2 | 10/2010 | Vian |
| 7,835,834 B2 | 11/2010 | Smith et al. |
| 7,865,378 B2 | 1/2011 | Gay |
| 7,870,010 B2 | 1/2011 | Joao |
| 7,877,275 B2 | 1/2011 | Ball |
| 7,881,951 B2 | 2/2011 | Roschelle et al. |
| 7,890,355 B2 | 2/2011 | Gay et al. |
| 7,904,219 B1 | 3/2011 | Lowrey et al. |
| 7,973,674 B2 | 7/2011 | Bell et al. |
| 7,979,172 B2 | 7/2011 | Breed |
| 7,979,173 B2 | 7/2011 | Breed |
| 7,983,802 B2 | 7/2011 | Breed |
| 7,987,103 B2 | 7/2011 | Gay et al. |
| 7,991,629 B2 | 8/2011 | Gay et al. |
| 8,005,467 B2 | 8/2011 | Gerlach et al. |
| 8,009,051 B2 | 8/2011 | Omi |
| 8,010,283 B2 | 8/2011 | Yoshida et al. |
| 8,016,595 B2 | 9/2011 | Aoki et al. |
| 8,027,853 B1 | 9/2011 | Kazenas |
| 8,035,508 B2 | 10/2011 | Breed |
| 8,040,247 B2 | 10/2011 | Gunaratne |
| 8,040,359 B2 | 10/2011 | Harper |
| 8,068,983 B2 | 11/2011 | Vian |
| 8,078,334 B2 | 12/2011 | Goodrich |
| 8,090,598 B2 | 1/2012 | Bauer et al. |
| 8,095,394 B2 | 1/2012 | Nowak et al. |
| 8,106,769 B1 | 1/2012 | Maroney et al. |
| 8,108,655 B2 | 1/2012 | Abernathy |
| 8,117,049 B2 | 2/2012 | Berkobin et al. |
| 8,123,686 B2 | 2/2012 | Fennell et al. |
| 8,139,109 B2 | 3/2012 | Schmiedel |
| 8,140,249 B2 | 3/2012 | Hessling et al. |
| 8,140,358 B1 | 3/2012 | Ling |
| 8,140,359 B2 | 3/2012 | Daniel |
| 8,164,432 B2 | 4/2012 | Broggi |
| 8,180,522 B2 | 5/2012 | Tuff |
| 8,180,655 B1 | 5/2012 | Hopkins, III |

(56) References Cited

U.S. PATENT DOCUMENTS

| | | | |
|---|---|---|---|
| 8,185,380 B2 | 5/2012 | Kameyama |
| 8,188,887 B2 | 5/2012 | Catten et al. |
| 8,190,323 B2 | 5/2012 | Maeda et al. |
| 8,255,144 B2 | 8/2012 | Breed et al. |
| 8,255,243 B2 | 8/2012 | Raines et al. |
| 8,255,244 B2 | 8/2012 | Raines et al. |
| 8,260,489 B2 | 9/2012 | Nielsen et al. |
| 8,260,639 B1 | 9/2012 | Medina, III et al. |
| 8,265,861 B2 | 9/2012 | Ikeda et al. |
| 8,275,417 B2 | 9/2012 | Flynn |
| 8,280,752 B1 | 10/2012 | Cripe et al. |
| 8,311,858 B2 | 11/2012 | Everett et al. |
| 8,314,708 B2 | 11/2012 | Gunderson et al. |
| 8,332,242 B1 | 12/2012 | Medina, III |
| 8,340,893 B2 | 12/2012 | Yamaguchi et al. |
| 8,340,902 B1 | 12/2012 | Chiang |
| 8,344,849 B2 | 1/2013 | Larsson et al. |
| 8,352,118 B1 | 1/2013 | Mittelsteadt et al. |
| 8,355,837 B2 | 1/2013 | Avery |
| 8,364,391 B2 | 1/2013 | Nagase et al. |
| 8,384,534 B2 | 2/2013 | James et al. |
| 8,386,168 B2 | 2/2013 | Hao |
| 8,423,239 B2 | 4/2013 | Blumer et al. |
| 8,437,966 B2 | 5/2013 | Connolly et al. |
| 8,447,231 B2 | 5/2013 | Bai et al. |
| 8,451,105 B2 | 5/2013 | McNay |
| 8,457,880 B1 | 6/2013 | Malalur |
| 8,473,143 B2 | 6/2013 | Stark et al. |
| 8,487,775 B2 | 7/2013 | Victor et al. |
| 8,520,695 B1 | 8/2013 | Rubin et al. |
| 8,554,468 B1 | 10/2013 | Bullock |
| 8,554,587 B1 | 10/2013 | Nowak et al. |
| 8,566,126 B1 | 10/2013 | Hopkins, III |
| 8,595,034 B2 | 11/2013 | Bauer et al. |
| 8,595,037 B1 | 11/2013 | Hyde et al. |
| 8,605,947 B2 | 12/2013 | Zhang et al. |
| 8,618,922 B2 | 12/2013 | Debouk |
| 8,634,980 B1 | 1/2014 | Urmson et al. |
| 8,645,014 B1 | 2/2014 | Kozlowski et al. |
| 8,645,029 B2 | 2/2014 | Kim et al. |
| 8,698,639 B2 | 4/2014 | Fung |
| 8,700,251 B1 | 4/2014 | Zhu |
| 8,725,311 B1 | 5/2014 | Breed |
| 8,725,472 B2 | 5/2014 | Hagelin et al. |
| 8,731,977 B1 | 5/2014 | Hardin et al. |
| 8,742,936 B2 | 6/2014 | Galley et al. |
| 8,781,442 B1 | 7/2014 | Link, II |
| 8,781,669 B1 | 7/2014 | Teller et al. |
| 8,788,299 B1 | 7/2014 | Medina, III |
| 8,799,034 B1 | 8/2014 | Brandmaier |
| 8,816,836 B2 | 8/2014 | Lee et al. |
| 8,818,608 B2 | 8/2014 | Cullinane et al. |
| 8,825,258 B2 | 9/2014 | Cullinane et al. |
| 8,849,558 B2 | 9/2014 | Morotomi et al. |
| 8,868,288 B2 | 10/2014 | Plante |
| 8,874,301 B1 | 10/2014 | Rao et al. |
| 8,874,305 B2 | 10/2014 | Dolgov et al. |
| 8,876,535 B2 | 11/2014 | Fields et al. |
| 8,880,291 B2 | 11/2014 | Hampiholi |
| 8,892,271 B2 | 11/2014 | Breed |
| 8,902,054 B2 | 12/2014 | Morris |
| 8,909,428 B1 | 12/2014 | Lombrozo |
| 8,917,182 B2 | 12/2014 | Chang et al. |
| 8,928,495 B2 | 1/2015 | Hassib |
| 8,935,036 B1 | 1/2015 | Christensen et al. |
| 8,954,205 B2 | 2/2015 | Sagar |
| 8,954,217 B1 | 2/2015 | Montemerlo et al. |
| 8,954,226 B1 | 2/2015 | Binion et al. |
| 8,965,677 B2 | 2/2015 | Breed et al. |
| 8,972,100 B2 | 3/2015 | Mullen |
| 8,989,959 B2 | 3/2015 | Plante |
| 8,996,228 B1 | 3/2015 | Ferguson et al. |
| 8,996,240 B2 | 3/2015 | Plante |
| 9,008,952 B2 | 4/2015 | Caskey et al. |
| 9,019,092 B1 | 4/2015 | Brandmaier et al. |
| 9,020,876 B2 | 4/2015 | Rakshit |
| 9,049,584 B2 | 6/2015 | Hatton |
| 9,053,588 B1 | 6/2015 | Briggs et al. |
| 9,056,395 B1 | 6/2015 | Ferguson et al. |
| 9,063,543 B2 | 6/2015 | An et al. |
| 9,070,243 B1 | 6/2015 | Kozlowski et al. |
| 9,075,413 B2 | 7/2015 | Cullinane et al. |
| 9,079,587 B1 | 7/2015 | Rupp |
| 9,081,650 B1 | 7/2015 | Brinkmann et al. |
| 9,098,080 B2 | 8/2015 | Norris et al. |
| 9,123,250 B2 | 9/2015 | Duncan |
| 9,135,803 B1 | 9/2015 | Fields et al. |
| 9,141,996 B2 | 9/2015 | Christensen |
| 9,144,389 B2 | 9/2015 | Srinivasan et al. |
| 9,147,219 B2 | 9/2015 | Binion et al. |
| 9,147,353 B1 | 9/2015 | Slusar |
| 9,151,692 B2 | 10/2015 | Breed |
| 9,164,507 B2 | 10/2015 | Cheatham, III |
| 9,177,475 B2 | 11/2015 | Sellschopp |
| 9,182,942 B2 | 11/2015 | Kelly |
| 9,188,985 B1 | 11/2015 | Hobbs |
| 9,194,168 B1 | 11/2015 | Lu et al. |
| 9,205,805 B2 | 12/2015 | Cudak et al. |
| 9,205,842 B1 | 12/2015 | Fields et al. |
| 9,221,396 B1 | 12/2015 | Zhu et al. |
| 9,224,293 B2 | 12/2015 | Taylor |
| 9,235,211 B2 | 1/2016 | Davidsson et al. |
| 9,262,789 B1 | 2/2016 | Tofte |
| 9,274,525 B1 | 3/2016 | Ferguson et al. |
| 9,275,417 B2 | 3/2016 | Binion et al. |
| 9,275,552 B1 | 3/2016 | Fields et al. |
| 9,282,430 B1 | 3/2016 | Brandmaier et al. |
| 9,282,447 B2 | 3/2016 | Gianakis |
| 9,283,847 B2 | 3/2016 | Riley et al. |
| 9,299,108 B2 | 3/2016 | Diana et al. |
| 9,302,678 B2 | 4/2016 | Murphy et al. |
| 9,308,891 B2 | 4/2016 | Cudak et al. |
| 9,311,271 B2 | 4/2016 | Wright |
| 9,317,983 B2 | 4/2016 | Ricci |
| 9,342,074 B2 | 5/2016 | Dolgov |
| 9,342,993 B1 | 5/2016 | Fields et al. |
| 9,352,709 B2 | 5/2016 | Brenneis et al. |
| 9,352,752 B2 | 5/2016 | Cullinane et al. |
| 9,355,423 B1 | 5/2016 | Slusar |
| 9,361,599 B1 | 6/2016 | Biemer et al. |
| 9,371,072 B1 | 6/2016 | Sisbot |
| 9,376,090 B2 | 6/2016 | Gennermann |
| 9,377,315 B2 | 6/2016 | Grover et al. |
| 9,381,916 B1 | 7/2016 | Zhu |
| 9,384,491 B1 | 7/2016 | Briggs et al. |
| 9,390,451 B1 * | 7/2016 | Slusar .................. G06Q 40/04 |
| 9,390,452 B1 | 7/2016 | Biemer et al. |
| 9,390,567 B2 | 7/2016 | Kim et al. |
| 9,399,445 B2 | 7/2016 | Abou et al. |
| 9,406,177 B2 | 8/2016 | Attard |
| 9,421,972 B2 | 8/2016 | Davidsson et al. |
| 9,424,607 B2 | 8/2016 | Bowers |
| 9,429,943 B2 | 8/2016 | Wilson et al. |
| 9,430,944 B2 | 8/2016 | Grimm et al. |
| 9,440,657 B1 | 9/2016 | Fields et al. |
| 9,443,152 B2 | 9/2016 | Atsmon et al. |
| 9,443,436 B2 | 9/2016 | Scheidt |
| 9,454,786 B1 | 9/2016 | Srey et al. |
| 9,466,214 B2 | 10/2016 | Fuehrer |
| 9,475,496 B2 | 10/2016 | Attard et al. |
| 9,477,990 B1 | 10/2016 | Binion et al. |
| 9,478,150 B1 | 10/2016 | Fields et al. |
| 9,489,635 B1 | 11/2016 | Zhu |
| 9,505,494 B1 | 11/2016 | Marlow et al. |
| 9,511,765 B2 | 12/2016 | Obradovich |
| 9,511,767 B1 | 12/2016 | Okumura et al. |
| 9,511,779 B2 | 12/2016 | Cullinane et al. |
| 9,517,771 B2 | 12/2016 | Attard et al. |
| 9,524,648 B1 | 12/2016 | Gopalakrishnan et al. |
| 9,529,361 B2 | 12/2016 | You et al. |
| 9,530,333 B1 | 12/2016 | Fields et al. |
| 9,542,846 B2 | 1/2017 | Zeng |
| 9,558,667 B2 | 1/2017 | Bowers |
| 9,566,959 B2 | 2/2017 | Breuer et al. |

(56) References Cited

U.S. PATENT DOCUMENTS

| | | |
|---|---|---|
| 9,567,007 B2 | 2/2017 | Cudak et al. |
| 9,587,952 B1 | 3/2017 | Slusar |
| 9,594,373 B2 | 3/2017 | Solyom et al. |
| 9,604,652 B2 | 3/2017 | Strauss |
| 9,632,502 B1 | 4/2017 | Levinson et al. |
| 9,633,318 B2 | 4/2017 | Plante |
| 9,646,428 B1 | 5/2017 | Konrardy et al. |
| 9,650,051 B2 | 5/2017 | Hoye et al. |
| 9,656,606 B1 | 5/2017 | Vose et al. |
| 9,663,112 B2 | 5/2017 | Abou-Nasr et al. |
| 9,665,101 B1 | 5/2017 | Templeton |
| 9,679,487 B1 | 6/2017 | Hayward |
| 9,694,765 B2 | 7/2017 | Chen et al. |
| 9,697,733 B1 | 7/2017 | Penilla |
| 9,707,942 B2 | 7/2017 | Cheatham, III |
| 9,712,549 B2 | 7/2017 | Almurayh |
| 9,715,711 B1 | 7/2017 | Konrardy et al. |
| 9,720,419 B2 | 8/2017 | O'Neill et al. |
| 9,725,036 B1 | 8/2017 | Tarte |
| 9,727,920 B1 | 8/2017 | Healy |
| 9,747,353 B2 | 8/2017 | Libfeld et al. |
| 9,753,390 B2 | 9/2017 | Kabai |
| 9,754,325 B1 | 9/2017 | Konrardy et al. |
| 9,754,424 B2 | 9/2017 | Ling |
| 9,754,490 B2 | 9/2017 | Kentley et al. |
| 9,761,139 B2 | 9/2017 | Acker et al. |
| 9,766,625 B2 | 9/2017 | Boroditsky et al. |
| 9,767,516 B1 | 9/2017 | Konrardy et al. |
| 9,772,626 B2 | 9/2017 | Bendewald et al. |
| 9,773,281 B1 | 9/2017 | Hanson |
| 9,792,656 B1 | 10/2017 | Konrardy et al. |
| 9,805,423 B1 | 10/2017 | Konrardy et al. |
| 9,805,601 B1 | 10/2017 | Fields et al. |
| 9,816,827 B1 | 11/2017 | Slusar |
| 9,817,400 B1 | 11/2017 | Poeppel et al. |
| 9,830,662 B1 | 11/2017 | Baker et al. |
| 9,847,033 B1 | 12/2017 | Carmack et al. |
| 9,852,475 B1 | 12/2017 | Konrardy et al. |
| 9,858,621 B1 | 1/2018 | Konrardy et al. |
| 9,868,394 B1 | 1/2018 | Fields et al. |
| 9,870,649 B1 | 1/2018 | Fields et al. |
| 9,884,611 B2 | 2/2018 | Abou et al. |
| 9,904,928 B1 | 2/2018 | Leise |
| 9,939,279 B2 | 4/2018 | Pan et al. |
| 9,940,676 B1 | 4/2018 | Biemer |
| 9,940,834 B1 | 4/2018 | Konrardy et al. |
| 9,944,282 B1 | 4/2018 | Fields et al. |
| 9,946,531 B1 | 4/2018 | Fields et al. |
| 9,948,477 B2 | 4/2018 | Marten |
| 9,949,676 B2 | 4/2018 | Al-Ali |
| 9,972,054 B1 | 5/2018 | Konrardy et al. |
| 9,986,404 B2 | 5/2018 | Mehta et al. |
| 10,007,263 B1 | 6/2018 | Fields et al. |
| 10,013,697 B1 | 7/2018 | Cote et al. |
| 10,019,901 B1 | 7/2018 | Fields et al. |
| 10,026,130 B1 | 7/2018 | Konrardy et al. |
| 10,026,237 B1 | 7/2018 | Fields et al. |
| 10,042,359 B1 | 8/2018 | Konrardy et al. |
| 10,043,323 B1 | 8/2018 | Konrardy et al. |
| 10,049,505 B1 | 8/2018 | Harvey et al. |
| 10,055,794 B1 | 8/2018 | Konrardy et al. |
| 10,065,517 B1 | 9/2018 | Konrardy et al. |
| 10,086,782 B1 | 10/2018 | Konrardy et al. |
| 10,089,693 B1 | 10/2018 | Konrardy et al. |
| 10,096,067 B1 | 10/2018 | Slusar |
| 10,102,586 B1 | 10/2018 | Marlow et al. |
| 10,102,590 B1 | 10/2018 | Farnsworth et al. |
| 10,106,083 B1 | 10/2018 | Fields et al. |
| 10,134,278 B1 | 11/2018 | Konrardy et al. |
| 10,156,848 B1 | 12/2018 | Konrardy et al. |
| 10,157,423 B1 | 12/2018 | Fields et al. |
| 10,163,350 B1 | 12/2018 | Fields et al. |
| 10,166,994 B1 | 1/2019 | Fields et al. |
| 10,168,703 B1 | 1/2019 | Konrardy et al. |
| 10,181,161 B1 | 1/2019 | Konrardy et al. |
| 10,185,997 B1 | 1/2019 | Konrardy et al. |
| 10,185,998 B1 | 1/2019 | Konrardy et al. |
| 10,185,999 B1 | 1/2019 | Konrardy et al. |
| 10,783,586 B1 | 9/2020 | Augustine et al. |
| 10,783,587 B1 | 9/2020 | Augustine et al. |
| 10,796,369 B1 | 10/2020 | Augustine et al. |
| 10,803,525 B1 | 10/2020 | Augustine et al. |
| 2001/0005217 A1 | 6/2001 | Hamilton et al. |
| 2002/0016655 A1 | 2/2002 | Joao |
| 2002/0049535 A1 | 4/2002 | Rigo et al. |
| 2002/0091483 A1 | 7/2002 | Douet |
| 2002/0103622 A1 | 8/2002 | Burge |
| 2002/0103678 A1 | 8/2002 | Burkhalter et al. |
| 2002/0111725 A1 | 8/2002 | Burge |
| 2002/0116228 A1 | 8/2002 | Bauer et al. |
| 2002/0128751 A1 | 9/2002 | Engstrom et al. |
| 2002/0128882 A1 | 9/2002 | Nakagawa et al. |
| 2002/0135618 A1 | 9/2002 | Maes et al. |
| 2002/0146667 A1 | 10/2002 | Dowdell et al. |
| 2003/0028298 A1 | 2/2003 | Macky et al. |
| 2003/0061160 A1 | 3/2003 | Asahina |
| 2003/0095039 A1 | 5/2003 | Shimomura et al. |
| 2003/0112133 A1 | 6/2003 | Webb et al. |
| 2003/0139948 A1 | 7/2003 | Strech |
| 2003/0146850 A1 | 8/2003 | Fallenstein |
| 2003/0182042 A1 | 9/2003 | Watson et al. |
| 2003/0182183 A1 | 9/2003 | Pribe |
| 2003/0200123 A1 | 10/2003 | Burge et al. |
| 2004/0005927 A1 | 1/2004 | Bonilla et al. |
| 2004/0011301 A1 | 1/2004 | Gordon |
| 2004/0017106 A1 | 1/2004 | Aizawa et al. |
| 2004/0019539 A1 | 1/2004 | Raman et al. |
| 2004/0039503 A1 | 2/2004 | Doyle |
| 2004/0054452 A1 | 3/2004 | Bjorkman |
| 2004/0077285 A1 | 4/2004 | Bonilla et al. |
| 2004/0085198 A1 | 5/2004 | Saito |
| 2004/0090334 A1 | 5/2004 | Zhang et al. |
| 2004/0111301 A1 | 6/2004 | Wahlbin et al. |
| 2004/0122639 A1 | 6/2004 | Qiu |
| 2004/0139034 A1 | 7/2004 | Farmer |
| 2004/0153362 A1 | 8/2004 | Bauer et al. |
| 2004/0158355 A1 | 8/2004 | Holmqvist et al. |
| 2004/0158476 A1 | 8/2004 | Blessinger et al. |
| 2004/0169034 A1 | 9/2004 | Park |
| 2004/0198441 A1 | 10/2004 | Cooper et al. |
| 2004/0226043 A1 | 11/2004 | Mettu et al. |
| 2004/0252027 A1 | 12/2004 | Torkkola et al. |
| 2004/0260579 A1 | 12/2004 | Tremiti |
| 2005/0007438 A1 | 1/2005 | Busch |
| 2005/0046584 A1 | 3/2005 | Breed |
| 2005/0055249 A1 | 3/2005 | Helitzer et al. |
| 2005/0059151 A1 | 3/2005 | Bosch |
| 2005/0065678 A1 | 3/2005 | Smith et al. |
| 2005/0071052 A1 | 3/2005 | Coletrane et al. |
| 2005/0071202 A1 | 3/2005 | Kendrick |
| 2005/0073438 A1 | 4/2005 | Rodgers et al. |
| 2005/0080519 A1 | 4/2005 | Oesterling et al. |
| 2005/0088291 A1 | 4/2005 | Blanco et al. |
| 2005/0088521 A1 | 4/2005 | Blanco et al. |
| 2005/0093684 A1 | 5/2005 | Cunnien |
| 2005/0108910 A1 | 5/2005 | Esparza et al. |
| 2005/0131597 A1 | 6/2005 | Raz et al. |
| 2005/0137757 A1 | 6/2005 | Phelan et al. |
| 2005/0154513 A1 | 7/2005 | Matsunaga et al. |
| 2005/0216136 A1 | 9/2005 | Lengning et al. |
| 2005/0228763 A1 | 10/2005 | Lewis et al. |
| 2005/0237784 A1 | 10/2005 | Kang |
| 2005/0246256 A1 | 11/2005 | Gastineau et al. |
| 2005/0259151 A1 | 11/2005 | Hamilton et al. |
| 2005/0267784 A1 | 12/2005 | Slen et al. |
| 2006/0031103 A1 | 2/2006 | Henry |
| 2006/0052909 A1 | 3/2006 | Cherouny |
| 2006/0052929 A1 | 3/2006 | Bastian et al. |
| 2006/0053038 A1 | 3/2006 | Warren |
| 2006/0055565 A1 | 3/2006 | Kawamata et al. |
| 2006/0079280 A1 | 4/2006 | LaPerch |
| 2006/0089763 A1 | 4/2006 | Barrett |
| 2006/0089766 A1 | 4/2006 | Allard et al. |
| 2006/0092043 A1 | 5/2006 | Lagassey |

(56) References Cited

U.S. PATENT DOCUMENTS

| | | |
|---|---|---|
| 2006/0136291 A1 | 6/2006 | Morita et al. |
| 2006/0149461 A1 | 7/2006 | Rowley et al. |
| 2006/0184295 A1 | 8/2006 | Hawkins et al. |
| 2006/0212195 A1 | 9/2006 | Veith et al. |
| 2006/0220905 A1 | 10/2006 | Hovestadt |
| 2006/0229777 A1 | 10/2006 | Hudson et al. |
| 2006/0232430 A1 | 10/2006 | Takaoka et al. |
| 2006/0272704 A1 | 12/2006 | Fima |
| 2006/0294514 A1 | 12/2006 | Bauchot et al. |
| 2007/0001831 A1 | 1/2007 | Raz et al. |
| 2007/0027726 A1 | 2/2007 | Warren et al. |
| 2007/0036678 A1 | 2/2007 | Sundararajan et al. |
| 2007/0048707 A1 | 3/2007 | Caamano et al. |
| 2007/0052530 A1 | 3/2007 | Diebold et al. |
| 2007/0055422 A1 | 3/2007 | Anzai et al. |
| 2007/0080816 A1 | 4/2007 | Haque et al. |
| 2007/0088469 A1 | 4/2007 | Schmiedel |
| 2007/0093947 A1 | 4/2007 | Gould et al. |
| 2007/0122771 A1 | 5/2007 | Maeda et al. |
| 2007/0124599 A1 | 5/2007 | Morita et al. |
| 2007/0132773 A1 | 6/2007 | Plante |
| 2007/0149208 A1 | 6/2007 | Syrbe et al. |
| 2007/0159344 A1 | 7/2007 | Kisacanin |
| 2007/0159354 A1 | 7/2007 | Rosenberg |
| 2007/0208498 A1 | 9/2007 | Barker et al. |
| 2007/0219720 A1 | 9/2007 | Trepagnier et al. |
| 2007/0265540 A1 | 11/2007 | Fuwamoto et al. |
| 2007/0282489 A1 | 12/2007 | Boss et al. |
| 2007/0282638 A1 | 12/2007 | Surovy |
| 2007/0291130 A1 | 12/2007 | Broggi |
| 2007/0299700 A1 | 12/2007 | Gay et al. |
| 2008/0027761 A1 | 1/2008 | Bracha |
| 2008/0028974 A1 | 2/2008 | Bianco |
| 2008/0033684 A1 | 2/2008 | Vian |
| 2008/0052134 A1 | 2/2008 | Nowak |
| 2008/0061953 A1 | 3/2008 | Bhogal et al. |
| 2008/0064014 A1 | 3/2008 | Wojtczak et al. |
| 2008/0065427 A1 | 3/2008 | Helitzer et al. |
| 2008/0082372 A1 | 4/2008 | Burch |
| 2008/0084473 A1 | 4/2008 | Romanowich |
| 2008/0106390 A1 | 5/2008 | White |
| 2008/0111666 A1 | 5/2008 | Plante |
| 2008/0114502 A1 | 5/2008 | Breed et al. |
| 2008/0114530 A1 | 5/2008 | Petrisor et al. |
| 2008/0126137 A1 | 5/2008 | Kidd et al. |
| 2008/0143497 A1 | 6/2008 | Wasson et al. |
| 2008/0147265 A1 | 6/2008 | Breed |
| 2008/0147266 A1 | 6/2008 | Plante et al. |
| 2008/0147267 A1 | 6/2008 | Plante et al. |
| 2008/0161989 A1 | 7/2008 | Breed |
| 2008/0167821 A1 | 7/2008 | Breed |
| 2008/0180237 A1 | 7/2008 | Fayyad et al. |
| 2008/0189142 A1 | 8/2008 | Brown et al. |
| 2008/0255887 A1 | 10/2008 | Gruter |
| 2008/0255888 A1 | 10/2008 | Berkobin et al. |
| 2008/0258885 A1 | 10/2008 | Akhan |
| 2008/0258890 A1 | 10/2008 | Follmer et al. |
| 2008/0291008 A1 | 11/2008 | Jeon |
| 2008/0294690 A1 | 11/2008 | McClellan et al. |
| 2008/0297488 A1 | 12/2008 | Operowsky et al. |
| 2008/0300733 A1 | 12/2008 | Rasshofer et al. |
| 2008/0313007 A1 | 12/2008 | Callahan et al. |
| 2008/0319665 A1 | 12/2008 | Berkobin et al. |
| 2009/0005979 A1 | 1/2009 | Nakao et al. |
| 2009/0015684 A1 | 1/2009 | Ooga |
| 2009/0027188 A1 | 1/2009 | Saban |
| 2009/0063030 A1 | 3/2009 | Howarter et al. |
| 2009/0069953 A1 | 3/2009 | Hale |
| 2009/0079839 A1 | 3/2009 | Fischer |
| 2009/0081923 A1 | 3/2009 | Dooley et al. |
| 2009/0085770 A1 | 4/2009 | Mergen |
| 2009/0106135 A1 | 4/2009 | Steiger |
| 2009/0115638 A1 | 5/2009 | Shankwitz et al. |
| 2009/0132294 A1 | 5/2009 | Haines |
| 2009/0140887 A1 | 6/2009 | Breed et al. |
| 2009/0174573 A1 | 7/2009 | Smith |
| 2009/0207005 A1 | 8/2009 | Habetha et al. |
| 2009/0210257 A1 | 8/2009 | Chalfant et al. |
| 2009/0248231 A1 | 10/2009 | Kamiya |
| 2009/0254240 A1 | 10/2009 | Olsen et al. |
| 2009/0267801 A1 | 10/2009 | Kawai et al. |
| 2009/0300065 A1 | 12/2009 | Birchall |
| 2009/0303026 A1 | 12/2009 | Broggi |
| 2009/0313566 A1 | 12/2009 | Vian |
| 2009/0326796 A1 | 12/2009 | Prokhorov |
| 2010/0004995 A1 | 1/2010 | Hickman |
| 2010/0030540 A1 | 2/2010 | Choi et al. |
| 2010/0030586 A1 | 2/2010 | Taylor et al. |
| 2010/0042318 A1 | 2/2010 | Kaplan et al. |
| 2010/0055649 A1 | 3/2010 | Takahashi et al. |
| 2010/0070136 A1 | 3/2010 | Williams et al. |
| 2010/0076646 A1 | 3/2010 | Basir et al. |
| 2010/0085171 A1 | 4/2010 | Do |
| 2010/0106346 A1 | 4/2010 | Badli |
| 2010/0106356 A1 | 4/2010 | Trepagnier et al. |
| 2010/0128127 A1 | 5/2010 | Ciolli |
| 2010/0131300 A1 | 5/2010 | Collopy et al. |
| 2010/0131302 A1 | 5/2010 | Collopy et al. |
| 2010/0131304 A1 | 5/2010 | Collopy et al. |
| 2010/0131307 A1 | 5/2010 | Collopy et al. |
| 2010/0143872 A1 | 6/2010 | Lankteee |
| 2010/0157255 A1 | 6/2010 | Togino |
| 2010/0164737 A1 | 7/2010 | Lu et al. |
| 2010/0198491 A1 | 8/2010 | Mays |
| 2010/0214087 A1 | 8/2010 | Nakagoshi et al. |
| 2010/0219944 A1 | 9/2010 | Mc et al. |
| 2010/0253541 A1 | 10/2010 | Seder et al. |
| 2010/0256836 A1 | 10/2010 | Mudalige |
| 2010/0286845 A1 | 11/2010 | Rekow et al. |
| 2010/0293033 A1 | 11/2010 | Hall et al. |
| 2010/0299021 A1 | 11/2010 | Jalili |
| 2011/0009093 A1 | 1/2011 | Self |
| 2011/0010042 A1 | 1/2011 | Boulet et al. |
| 2011/0043350 A1 | 2/2011 | Ben David |
| 2011/0043377 A1 | 2/2011 | McGrath et al. |
| 2011/0054767 A1 | 3/2011 | Schafer et al. |
| 2011/0060496 A1 | 3/2011 | Nielsen et al. |
| 2011/0066310 A1 | 3/2011 | Sakai et al. |
| 2011/0077809 A1 | 3/2011 | Leary |
| 2011/0087505 A1 | 4/2011 | Terlep |
| 2011/0090075 A1 | 4/2011 | Armitage et al. |
| 2011/0090093 A1 | 4/2011 | Grimm |
| 2011/0093134 A1 | 4/2011 | Emanuel et al. |
| 2011/0093350 A1 | 4/2011 | Laumeyer et al. |
| 2011/0106370 A1 | 5/2011 | Duddle et al. |
| 2011/0109462 A1 | 5/2011 | Deng et al. |
| 2011/0118907 A1 | 5/2011 | Elkins |
| 2011/0128161 A1 | 6/2011 | Bae et al. |
| 2011/0133954 A1 | 6/2011 | Ooshima et al. |
| 2011/0137684 A1 | 6/2011 | Peak et al. |
| 2011/0140919 A1 | 6/2011 | Hara et al. |
| 2011/0140968 A1 | 6/2011 | Bai et al. |
| 2011/0144854 A1 | 6/2011 | Cramer et al. |
| 2011/0153367 A1 | 6/2011 | Amigo |
| 2011/0161116 A1 | 6/2011 | Peak |
| 2011/0161119 A1 | 6/2011 | Collins |
| 2011/0169625 A1 | 7/2011 | James |
| 2011/0184605 A1 | 7/2011 | Neff |
| 2011/0187559 A1 | 8/2011 | Applebaum |
| 2011/0190972 A1 | 8/2011 | Timmons et al. |
| 2011/0196571 A1 | 8/2011 | Foladare et al. |
| 2011/0202305 A1 | 8/2011 | Willis et al. |
| 2011/0241862 A1 | 10/2011 | Debouk |
| 2011/0251751 A1 | 10/2011 | Knight |
| 2011/0279263 A1 | 11/2011 | Rodkey et al. |
| 2011/0288770 A1 | 11/2011 | Greasby |
| 2011/0295446 A1 | 12/2011 | Basir et al. |
| 2011/0295546 A1 | 12/2011 | Khazanov |
| 2011/0301839 A1 | 12/2011 | Pudar et al. |
| 2011/0304465 A1 | 12/2011 | Boult et al. |
| 2011/0307188 A1 | 12/2011 | Peng |
| 2011/0307336 A1 | 12/2011 | Smirnov et al. |
| 2012/0004933 A1 | 1/2012 | Foladare et al. |
| 2012/0010906 A1 | 1/2012 | Foladare et al. |

(56) References Cited

U.S. PATENT DOCUMENTS

| | | |
|---|---|---|
| 2012/0013582 A1 | 1/2012 | Inoue et al. |
| 2012/0019001 A1 | 1/2012 | Hede |
| 2012/0025969 A1 | 2/2012 | Dozza |
| 2012/0028680 A1 | 2/2012 | Breed |
| 2012/0053824 A1 | 3/2012 | Nam et al. |
| 2012/0056758 A1 | 3/2012 | Kuhlman et al. |
| 2012/0059227 A1 | 3/2012 | Friedlander et al. |
| 2012/0066007 A1 | 3/2012 | Ferrick et al. |
| 2012/0071151 A1 | 3/2012 | Abramson et al. |
| 2012/0072214 A1 | 3/2012 | Cox |
| 2012/0072243 A1 | 3/2012 | Collins et al. |
| 2012/0072244 A1 | 3/2012 | Collins et al. |
| 2012/0083668 A1 | 4/2012 | Pradeep et al. |
| 2012/0083923 A1 | 4/2012 | Matsumoto et al. |
| 2012/0083960 A1 | 4/2012 | Zhu et al. |
| 2012/0083964 A1 | 4/2012 | Montemerlo et al. |
| 2012/0083974 A1 | 4/2012 | Sandblom |
| 2012/0092157 A1 | 4/2012 | Tran |
| 2012/0101680 A1 | 4/2012 | Trepagnier et al. |
| 2012/0101855 A1 | 4/2012 | Collins et al. |
| 2012/0108909 A1 | 5/2012 | Slobounov et al. |
| 2012/0109407 A1 | 5/2012 | Yousefi et al. |
| 2012/0109692 A1 | 5/2012 | Collins |
| 2012/0123806 A1 | 5/2012 | Schumann, Jr. |
| 2012/0135382 A1 | 5/2012 | Winston et al. |
| 2012/0143391 A1 | 6/2012 | Gee |
| 2012/0143630 A1 | 6/2012 | Hertenstein |
| 2012/0172055 A1 | 7/2012 | Edge |
| 2012/0185034 A1 | 7/2012 | Hossainy |
| 2012/0185204 A1 | 7/2012 | Jallon et al. |
| 2012/0188100 A1 | 7/2012 | Min et al. |
| 2012/0190001 A1 | 7/2012 | Knight et al. |
| 2012/0191343 A1 | 7/2012 | Haleem |
| 2012/0191373 A1 | 7/2012 | Soles et al. |
| 2012/0197669 A1 | 8/2012 | Kote et al. |
| 2012/0200427 A1 | 8/2012 | Kamata |
| 2012/0203418 A1 | 8/2012 | Braennstroem |
| 2012/0209634 A1 | 8/2012 | Ling et al. |
| 2012/0209692 A1 | 8/2012 | Bennett |
| 2012/0215375 A1 | 8/2012 | Chang |
| 2012/0221168 A1 | 8/2012 | Zeng |
| 2012/0235865 A1 | 9/2012 | Nath et al. |
| 2012/0239242 A1 | 9/2012 | Uehara |
| 2012/0239281 A1 | 9/2012 | Hinz |
| 2012/0239471 A1 | 9/2012 | Grimm et al. |
| 2012/0246733 A1 | 9/2012 | Schafer et al. |
| 2012/0256769 A1 | 10/2012 | Satpathy |
| 2012/0258702 A1 | 10/2012 | Matsuyama |
| 2012/0265380 A1 | 10/2012 | Kuwata et al. |
| 2012/0271500 A1 | 10/2012 | Tsimhoni et al. |
| 2012/0277950 A1 | 11/2012 | Plante et al. |
| 2012/0286974 A1 | 11/2012 | Claussen et al. |
| 2012/0289819 A1 | 11/2012 | Snow |
| 2012/0303177 A1 | 11/2012 | Jauch et al. |
| 2012/0303222 A1 | 11/2012 | Cooprider et al. |
| 2012/0306663 A1 | 12/2012 | Mudalige |
| 2012/0316406 A1 | 12/2012 | Rahman et al. |
| 2013/0006674 A1 | 1/2013 | Bowne et al. |
| 2013/0006675 A1 | 1/2013 | Bowne et al. |
| 2013/0018677 A1 | 1/2013 | Chevrette |
| 2013/0030606 A1 | 1/2013 | Mudalige et al. |
| 2013/0038437 A1 | 2/2013 | Talati et al. |
| 2013/0044008 A1 | 2/2013 | Gafford et al. |
| 2013/0046562 A1 | 2/2013 | Taylor |
| 2013/0066751 A1 | 3/2013 | Glazer |
| 2013/0073115 A1 | 3/2013 | Levin et al. |
| 2013/0097128 A1 | 4/2013 | Suzuki et al. |
| 2013/0116855 A1 | 5/2013 | Nielsen et al. |
| 2013/0131907 A1 | 5/2013 | Green et al. |
| 2013/0144459 A1 | 6/2013 | Ricci |
| 2013/0151027 A1 | 6/2013 | Petrucci et al. |
| 2013/0151202 A1 | 6/2013 | Denny et al. |
| 2013/0164715 A1 | 6/2013 | Hunt et al. |
| 2013/0179198 A1 | 7/2013 | Bowne et al. |
| 2013/0189649 A1 | 7/2013 | Mannino |
| 2013/0190966 A1 | 7/2013 | Collins et al. |
| 2013/0209968 A1 | 8/2013 | Miller et al. |
| 2013/0211656 A1 | 8/2013 | An et al. |
| 2013/0218603 A1 | 8/2013 | Hagelstein |
| 2013/0218604 A1 | 8/2013 | Hagelstein et al. |
| 2013/0226391 A1 | 8/2013 | Nordbruch et al. |
| 2013/0227409 A1 | 8/2013 | Das et al. |
| 2013/0237194 A1 | 9/2013 | Davis |
| 2013/0245857 A1 | 9/2013 | Gariepy et al. |
| 2013/0245881 A1 | 9/2013 | Scarbrough |
| 2013/0257626 A1 | 10/2013 | Masli et al. |
| 2013/0267194 A1 | 10/2013 | Breed |
| 2013/0278442 A1* | 10/2013 | Rubin ............... G08G 9/02 340/905 |
| 2013/0289819 A1 | 10/2013 | Hassib et al. |
| 2013/0290876 A1 | 10/2013 | Anderson et al. |
| 2013/0302758 A1 | 11/2013 | Wright |
| 2013/0304513 A1 | 11/2013 | Hyde et al. |
| 2013/0304514 A1 | 11/2013 | Hyde et al. |
| 2013/0307786 A1 | 11/2013 | Heubel |
| 2013/0317693 A1 | 11/2013 | Jefferies et al. |
| 2013/0317711 A1 | 11/2013 | Plante |
| 2013/0317786 A1 | 11/2013 | Kuhn |
| 2013/0317865 A1 | 11/2013 | Tofte et al. |
| 2013/0332402 A1 | 12/2013 | Rakshit |
| 2013/0339062 A1 | 12/2013 | Brewer et al. |
| 2014/0002651 A1 | 1/2014 | Plante |
| 2014/0004734 A1 | 1/2014 | Hoang |
| 2014/0006660 A1 | 1/2014 | Frei et al. |
| 2014/0009307 A1 | 1/2014 | Bowers et al. |
| 2014/0012492 A1 | 1/2014 | Bowers et al. |
| 2014/0019170 A1 | 1/2014 | Coleman et al. |
| 2014/0039934 A1 | 2/2014 | Rivera |
| 2014/0047347 A1 | 2/2014 | Mohn et al. |
| 2014/0047371 A1 | 2/2014 | Palmer et al. |
| 2014/0052323 A1 | 2/2014 | Reichel |
| 2014/0052336 A1 | 2/2014 | Moshchuk et al. |
| 2014/0052479 A1 | 2/2014 | Kawamura |
| 2014/0058761 A1 | 2/2014 | Freiberger et al. |
| 2014/0059066 A1 | 2/2014 | Koloskov |
| 2014/0070980 A1 | 3/2014 | Park |
| 2014/0080100 A1 | 3/2014 | Phelan et al. |
| 2014/0095009 A1 | 4/2014 | Oshima et al. |
| 2014/0095214 A1 | 4/2014 | Mathe |
| 2014/0099607 A1 | 4/2014 | Armitage et al. |
| 2014/0100892 A1 | 4/2014 | Collopy et al. |
| 2014/0104405 A1 | 4/2014 | Weidl et al. |
| 2014/0106782 A1 | 4/2014 | Chitre et al. |
| 2014/0108198 A1 | 4/2014 | Jariyasunant et al. |
| 2014/0111332 A1 | 4/2014 | Przybylko et al. |
| 2014/0114691 A1 | 4/2014 | Pearce |
| 2014/0125474 A1 | 5/2014 | Gunaratne |
| 2014/0129053 A1 | 5/2014 | Kleve et al. |
| 2014/0129301 A1 | 5/2014 | Van et al. |
| 2014/0130035 A1 | 5/2014 | Desai et al. |
| 2014/0135598 A1 | 5/2014 | Weidl et al. |
| 2014/0148988 A1 | 5/2014 | Lathrop et al. |
| 2014/0149148 A1 | 5/2014 | Luciani |
| 2014/0152422 A1 | 6/2014 | Breed |
| 2014/0156176 A1 | 6/2014 | Caskey et al. |
| 2014/0156182 A1 | 6/2014 | Nemec et al. |
| 2014/0167967 A1 | 6/2014 | He et al. |
| 2014/0168399 A1 | 6/2014 | Plummer et al. |
| 2014/0172467 A1 | 6/2014 | He et al. |
| 2014/0172727 A1 | 6/2014 | Abhyanker et al. |
| 2014/0188322 A1 | 7/2014 | Oh et al. |
| 2014/0191858 A1 | 7/2014 | Morgan et al. |
| 2014/0207707 A1 | 7/2014 | Na et al. |
| 2014/0218187 A1 | 8/2014 | Chun et al. |
| 2014/0218520 A1 | 8/2014 | Teich et al. |
| 2014/0221781 A1 | 8/2014 | Schrauf et al. |
| 2014/0236638 A1 | 8/2014 | Pallesen |
| 2014/0240132 A1 | 8/2014 | Bychkov |
| 2014/0253376 A1 | 9/2014 | Large et al. |
| 2014/0257866 A1 | 9/2014 | Gay et al. |
| 2014/0266655 A1 | 9/2014 | Palan |
| 2014/0272811 A1 | 9/2014 | Palan |
| 2014/0277895 A1 | 9/2014 | Shankwitz et al. |
| 2014/0278571 A1 | 9/2014 | Mullen et al. |

(56) References Cited

U.S. PATENT DOCUMENTS

| | | |
|---|---|---|
| 2014/0278840 A1 | 9/2014 | Scofield et al. |
| 2014/0279707 A1 | 9/2014 | Joshua et al. |
| 2014/0301218 A1 | 10/2014 | Luo et al. |
| 2014/0303827 A1 | 10/2014 | Dolgov |
| 2014/0306799 A1 | 10/2014 | Ricci |
| 2014/0306814 A1 | 10/2014 | Ricci |
| 2014/0309833 A1 | 10/2014 | Ferguson et al. |
| 2014/0309864 A1 | 10/2014 | Ricci |
| 2014/0309870 A1 | 10/2014 | Ricci et al. |
| 2014/0310186 A1 | 10/2014 | Ricci |
| 2014/0337930 A1 | 11/2014 | Hoyos et al. |
| 2014/0343972 A1 | 11/2014 | Fernandes et al. |
| 2014/0350970 A1 | 11/2014 | Schumann et al. |
| 2014/0358324 A1 | 12/2014 | Sagar |
| 2014/0358592 A1 | 12/2014 | Wedig et al. |
| 2014/0380264 A1 | 12/2014 | Misra et al. |
| 2015/0006278 A1 | 1/2015 | Di et al. |
| 2015/0012800 A1 | 1/2015 | Yang |
| 2015/0019266 A1 | 1/2015 | Stempora |
| 2015/0024705 A1 | 1/2015 | Rashidi |
| 2015/0025917 A1 | 1/2015 | Stempora |
| 2015/0032581 A1 | 1/2015 | Blackhurst et al. |
| 2015/0035685 A1 | 2/2015 | Strickland et al. |
| 2015/0039350 A1 | 2/2015 | Martin et al. |
| 2015/0039397 A1 | 2/2015 | Fuchs |
| 2015/0045983 A1 | 2/2015 | Fraser et al. |
| 2015/0051752 A1 | 2/2015 | Paszkowicz |
| 2015/0051787 A1 | 2/2015 | Doughty |
| 2015/0066284 A1 | 3/2015 | Yopp |
| 2015/0070265 A1 | 3/2015 | Cruz-Hernandez et al. |
| 2015/0088334 A1 | 3/2015 | Bowers et al. |
| 2015/0088358 A1 | 3/2015 | Yopp |
| 2015/0088360 A1 | 3/2015 | Bonnet et al. |
| 2015/0088373 A1 | 3/2015 | Wilkins |
| 2015/0088550 A1 | 3/2015 | Bowers et al. |
| 2015/0100189 A1 | 4/2015 | Tellis |
| 2015/0100190 A1 | 4/2015 | Yopp |
| 2015/0100191 A1 | 4/2015 | Yopp |
| 2015/0109450 A1 | 4/2015 | Walker |
| 2015/0112504 A1 | 4/2015 | Binion et al. |
| 2015/0112543 A1 | 4/2015 | Binion |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0113521 A1 | 4/2015 | Suzuki et al. |
| 2015/0120331 A1 | 4/2015 | Russo et al. |
| 2015/0127570 A1 | 5/2015 | Doughty et al. |
| 2015/0128123 A1 | 5/2015 | Eling |
| 2015/0142262 A1 | 5/2015 | Lee |
| 2015/0149018 A1 | 5/2015 | Attard et al. |
| 2015/0149265 A1 | 5/2015 | Huntzicker et al. |
| 2015/0153733 A1 | 6/2015 | Ohmura et al. |
| 2015/0158469 A1 | 6/2015 | Cheatham, III et al. |
| 2015/0158495 A1 | 6/2015 | Duncan |
| 2015/0160653 A1 | 6/2015 | Cheatham, III et al. |
| 2015/0161738 A1 | 6/2015 | Stempora |
| 2015/0161893 A1 | 6/2015 | Duncan |
| 2015/0161894 A1 | 6/2015 | Duncan |
| 2015/0166069 A1 | 6/2015 | Engelman |
| 2015/0169311 A1 | 6/2015 | Dickerson et al. |
| 2015/0170287 A1* | 6/2015 | Tirone ............... G06Q 40/08 705/4 |
| 2015/0170290 A1 | 6/2015 | Bowne et al. |
| 2015/0170522 A1 | 6/2015 | Noh |
| 2015/0178997 A1 | 6/2015 | Ohsaki |
| 2015/0178998 A1 | 6/2015 | Attard et al. |
| 2015/0185034 A1 | 7/2015 | Abhyanker |
| 2015/0187013 A1 | 7/2015 | Adams et al. |
| 2015/0187015 A1 | 7/2015 | Adams |
| 2015/0187016 A1 | 7/2015 | Adams |
| 2015/0187019 A1 | 7/2015 | Fernandes |
| 2015/0187194 A1 | 7/2015 | Hypolite et al. |
| 2015/0189241 A1 | 7/2015 | Kim et al. |
| 2015/0193219 A1 | 7/2015 | Pandya et al. |
| 2015/0193220 A1 | 7/2015 | Rork et al. |
| 2015/0203107 A1 | 7/2015 | Lippman |
| 2015/0203113 A1 | 7/2015 | Duncan et al. |
| 2015/0229885 A1 | 8/2015 | Offenhaeuser |
| 2015/0235323 A1 | 8/2015 | Oldham |
| 2015/0235480 A1 | 8/2015 | Cudak et al. |
| 2015/0235557 A1 | 8/2015 | Engelman |
| 2015/0239436 A1 | 8/2015 | Kanai et al. |
| 2015/0241853 A1 | 8/2015 | Vechart et al. |
| 2015/0242953 A1 | 8/2015 | Suiter |
| 2015/0246672 A1 | 9/2015 | Pilutti et al. |
| 2015/0254955 A1 | 9/2015 | Fields |
| 2015/0266489 A1 | 9/2015 | Solyom et al. |
| 2015/0266490 A1 | 9/2015 | Coelingh et al. |
| 2015/0268665 A1 | 9/2015 | Ludwick et al. |
| 2015/0271201 A1 | 9/2015 | Ruvio et al. |
| 2015/0274072 A1 | 10/2015 | Croteau et al. |
| 2015/0293534 A1 | 10/2015 | Takamatsu |
| 2015/0294422 A1 | 10/2015 | Carver |
| 2015/0307110 A1 | 10/2015 | Grewe et al. |
| 2015/0310742 A1 | 10/2015 | Albornoz |
| 2015/0310758 A1 | 10/2015 | Daddona et al. |
| 2015/0332407 A1 | 11/2015 | Wilson et al. |
| 2015/0334545 A1 | 11/2015 | Maier et al. |
| 2015/0336502 A1 | 11/2015 | Hillis et al. |
| 2015/0338852 A1 | 11/2015 | Ramanujam |
| 2015/0339928 A1 | 11/2015 | Ramanujam |
| 2015/0343947 A1 | 12/2015 | Bernico et al. |
| 2015/0346727 A1 | 12/2015 | Ramanujam |
| 2015/0348335 A1 | 12/2015 | Ramanujam |
| 2015/0348337 A1 | 12/2015 | Choi |
| 2015/0356797 A1 | 12/2015 | McBride et al. |
| 2015/0382085 A1 | 12/2015 | Lawrie-Fussey |
| 2016/0014252 A1 | 1/2016 | Biderman et al. |
| 2016/0019790 A1 | 1/2016 | Tobolski et al. |
| 2016/0027276 A1 | 1/2016 | Freeck et al. |
| 2016/0036899 A1 | 2/2016 | Moody et al. |
| 2016/0042463 A1 | 2/2016 | Gillespie |
| 2016/0042644 A1 | 2/2016 | Velusamy |
| 2016/0042650 A1 | 2/2016 | Stenneth |
| 2016/0055750 A1 | 2/2016 | Linder et al. |
| 2016/0068103 A1 | 3/2016 | McNew et al. |
| 2016/0071418 A1 | 3/2016 | Oshida et al. |
| 2016/0083285 A1 | 3/2016 | De et al. |
| 2016/0086285 A1 | 3/2016 | Jordan Peters |
| 2016/0086393 A1 | 3/2016 | Collins et al. |
| 2016/0092962 A1 | 3/2016 | Wasserman et al. |
| 2016/0093212 A1 | 3/2016 | Barfield et al. |
| 2016/0104250 A1 | 4/2016 | Allen et al. |
| 2016/0105365 A1 | 4/2016 | Droste et al. |
| 2016/0116913 A1 | 4/2016 | Niles |
| 2016/0117871 A1 | 4/2016 | McClellan et al. |
| 2016/0117928 A1 | 4/2016 | Hodges et al. |
| 2016/0125735 A1 | 5/2016 | Tuukkanen |
| 2016/0129917 A1 | 5/2016 | Gariepy et al. |
| 2016/0140783 A1 | 5/2016 | Catt et al. |
| 2016/0140784 A1 | 5/2016 | Akanuma et al. |
| 2016/0147226 A1 | 5/2016 | Akselrod et al. |
| 2016/0163217 A1 | 6/2016 | Harkness |
| 2016/0167652 A1 | 6/2016 | Slusar |
| 2016/0171521 A1 | 6/2016 | Ramirez et al. |
| 2016/0187127 A1 | 6/2016 | Purohit et al. |
| 2016/0187368 A1 | 6/2016 | Modi et al. |
| 2016/0189303 A1 | 6/2016 | Fuchs |
| 2016/0189544 A1 | 6/2016 | Ricci |
| 2016/0203560 A1 | 7/2016 | Parameshwaran |
| 2016/0221575 A1 | 8/2016 | Posch et al. |
| 2016/0231746 A1 | 8/2016 | Hazelton et al. |
| 2016/0248598 A1 | 8/2016 | Lin et al. |
| 2016/0255154 A1 | 9/2016 | Kim et al. |
| 2016/0264132 A1 | 9/2016 | Paul et al. |
| 2016/0272219 A1 | 9/2016 | Ketfi-Cherif et al. |
| 2016/0275790 A1 | 9/2016 | Kang et al. |
| 2016/0277911 A1 | 9/2016 | Kang et al. |
| 2016/0282874 A1 | 9/2016 | Kurata et al. |
| 2016/0288833 A1 | 10/2016 | Heimberger et al. |
| 2016/0291153 A1 | 10/2016 | Mossau et al. |
| 2016/0292679 A1 | 10/2016 | Kolin et al. |
| 2016/0301698 A1 | 10/2016 | Katara et al. |

(56) References Cited

U.S. PATENT DOCUMENTS

| | | |
|---|---|---|
| 2016/0303969 A1 | 10/2016 | Akula |
| 2016/0304027 A1 | 10/2016 | Di et al. |
| 2016/0304091 A1 | 10/2016 | Remes |
| 2016/0313132 A1 | 10/2016 | Larroy |
| 2016/0314224 A1 | 10/2016 | Wei |
| 2016/0321674 A1 | 11/2016 | Lux |
| 2016/0323233 A1 | 11/2016 | Song et al. |
| 2016/0327949 A1 | 11/2016 | Wilson et al. |
| 2016/0343249 A1 | 11/2016 | Gao et al. |
| 2016/0347329 A1 | 12/2016 | Zelman et al. |
| 2016/0370194 A1 | 12/2016 | Colijn et al. |
| 2017/0011467 A1 | 1/2017 | Farmer |
| 2017/0015263 A1 | 1/2017 | Makled et al. |
| 2017/0017734 A1 | 1/2017 | Groh et al. |
| 2017/0023945 A1 | 1/2017 | Cavalcanti et al. |
| 2017/0024938 A1 | 1/2017 | Lindsay |
| 2017/0036678 A1 | 2/2017 | Takamatsu |
| 2017/0038773 A1 | 2/2017 | Gordon et al. |
| 2017/0067764 A1 | 3/2017 | Skupin et al. |
| 2017/0068245 A1 | 3/2017 | Scofield et al. |
| 2017/0072967 A1 | 3/2017 | Fendt et al. |
| 2017/0076606 A1 | 3/2017 | Gupta et al. |
| 2017/0080900 A1 | 3/2017 | Huennekens et al. |
| 2017/0084175 A1 | 3/2017 | Sedlik et al. |
| 2017/0086028 A1 | 3/2017 | Hwang et al. |
| 2017/0106876 A1 | 4/2017 | Gordon et al. |
| 2017/0116794 A1 | 4/2017 | Gortsas |
| 2017/0120761 A1 | 5/2017 | Kapadia et al. |
| 2017/0123421 A1 | 5/2017 | Kentley et al. |
| 2017/0123428 A1 | 5/2017 | Levinson et al. |
| 2017/0136902 A1 | 5/2017 | Ricci |
| 2017/0147722 A1 | 5/2017 | Greenwood |
| 2017/0148102 A1 | 5/2017 | Franke et al. |
| 2017/0148324 A1 | 5/2017 | High et al. |
| 2017/0154479 A1 | 6/2017 | Kim |
| 2017/0168493 A1 | 6/2017 | Miller et al. |
| 2017/0169627 A1 | 6/2017 | Kim et al. |
| 2017/0176641 A1 | 6/2017 | Zhu et al. |
| 2017/0192428 A1 | 7/2017 | Vogt et al. |
| 2017/0200367 A1 | 7/2017 | Mielenz |
| 2017/0212511 A1 | 7/2017 | Paiva et al. |
| 2017/0234689 A1 | 8/2017 | Gibson et al. |
| 2017/0236210 A1 | 8/2017 | Kumar et al. |
| 2017/0249844 A1 | 8/2017 | Perkins et al. |
| 2017/0270617 A1 | 9/2017 | Fernandes et al. |
| 2017/0274897 A1 | 9/2017 | Rink et al. |
| 2017/0278312 A1 | 9/2017 | Minster et al. |
| 2017/0308082 A1 | 10/2017 | Ullrich et al. |
| 2017/0309092 A1 | 10/2017 | Rosenbaum |
| 2017/0330448 A1 | 11/2017 | Moore et al. |
| 2018/0004223 A1 | 1/2018 | Baldwin |
| 2018/0013831 A1 | 1/2018 | Dey et al. |
| 2018/0046198 A1 | 2/2018 | Nordbruch et al. |
| 2018/0053411 A1 | 2/2018 | Wieskamp et al. |
| 2018/0080995 A1 | 3/2018 | Heinen |
| 2018/0091981 A1 | 3/2018 | Sharma et al. |
| 2018/0099678 A1 | 4/2018 | Absmeier et al. |
| 2018/0188733 A1 | 7/2018 | Iandola et al. |
| 2018/0194343 A1 | 7/2018 | Lorenz |
| 2018/0231979 A1 | 8/2018 | Miller et al. |
| 2018/0284807 A1 | 10/2018 | Wood et al. |
| 2018/0307250 A1 | 10/2018 | Harvey |
| 2018/0345811 A1 | 12/2018 | Michels et al. |
| 2019/0005464 A1 | 1/2019 | Harris et al. |
| 2019/0005745 A1 | 1/2019 | Patil et al. |
| 2019/0146491 A1 | 5/2019 | Hu et al. |
| 2019/0146496 A1 | 5/2019 | Woodrow et al. |

FOREIGN PATENT DOCUMENTS

| | | |
|---|---|---|
| EP | 700009 A2 | 3/1996 |
| EP | 3239686 A1 | 11/2017 |
| GB | 2268608 A | 1/1994 |
| GB | 2432922 A | 6/2007 |
| GB | 2488956 A | 9/2012 |
| GB | 2494727 A | 3/2013 |
| JP | 2002-259708 A | 9/2002 |
| KR | 101515496 B1 | 5/2015 |
| WO | WO-2005/083605 A1 | 9/2005 |
| WO | WO-2010/034909 A1 | 4/2010 |
| WO | 2010062899 A1 | 6/2010 |
| WO | 2014/092769 A1 | 6/2014 |
| WO | 2014/148976 A1 | 9/2014 |
| WO | 2014139821 A1 | 9/2014 |
| WO | WO-2014/139821 A1 | 9/2014 |
| WO | 2016/067610 A1 | 5/2016 |
| WO | 2016/156236 A1 | 10/2016 |
| WO | 2017/142931 A1 | 8/2017 |

OTHER PUBLICATIONS

Al-Shihabi, Talal et al., "A Framework for Modeling Human-like Driving Behaviors for Autonomous Vehicles in Driving Simulators", Copyright 2001, Northeastern University, 6 pages.

Villasenor, John, "Products Liability and Driverless Cars: Issues and Guiding Principles for Legislation", Apr. 2014, Brookings Center for Technology Innovation, 25 pages.

Duffy, Sophia and Hopkins, Jamie Patrick, "Sit, Stay, Drive: The Future of Autonomous Car Liability" (2013). 16 SMU Sci. & Tech. Law Rev. 101 (Winter 2013).

Franke, Uwe & Gavrila, Dariu & Görzig, Steffen & Lindner, Frank & Paetzold, Frfank & Wöhler, Christian, (1998). Autonomous Driving Goes Downtown.. IEEE Intelligent Systems. 13. 40-48. 10.1109/5254.736001. (Year: 1998).

Davies, Alex, "Here's How Mercedes-Benz Tested Its New Self-Driving Car", Nov. 20, 2012, Business Insider, 4 pages (Year: 2012).

Birch, Stuart, "Mercedes-Benz' world class driving simulator complex enhances moose safety", Nov. 13, 2010, SAE International, Automobile Engineering (Year: 2010).

Mercedes-Benz, "Press Information", Nov. 2012, Mercedes-Benz Driving Simulator (Year: 2012).

Broggi, Alberto et al., "Extensive Tests of Autonomous Driving Technologies", May 30, 2013, IEEE Transactions on Intelligent Transportation Systems, vol. 14, Issue 3.

Alberti, Thomas James et al., "A Proposed Standardized Testing Procedure for Autonomous Ground Vehicles", Apr. 29, 2008, Virginia Polytechnic Institute and State University.

Miller, Christian Kurtz, "A Simulation and Regression Testing Framework for Autonoumous Vehicles", Aug. 2007, Case Western University.

Zhou, Jie et al., "A Simulation Model to Evaluate and Verify Functions of Autonomous Vehicle Based on Simulink", Copyright 2009, Tongji University.

Figueiredo, Miguel C. et al., "An Approach to Simulate Autonomous Vehicles in Urban Traffic Scenerios", Nov. 2009, Unversity of Porto.

Pereira, Jose Luis Ferras, "An Integrated Architecture for Autonomous Vehicles Simulation", Jun. 2011, University of Porto.

Hars, Alexander, "Autonomous Cars: The Next Revolution Looms", Jan. 2010, Inventivio GmbH.

Campbell, Mark et al., "Autonomous Driving in Urban Envirionments: Approaches, Lessons, and Challenges", Sep. 6, 2010, Philosophical Transactions of The Royal Society. Phil. Trans. R. Soc. A (2010) 368, 4649-4672.

Lee, Sangho et al., "Autonomous Vehicle Simulation Project", Sep. 2013, International Journal of Software Engineering and Its Applications, vol. 7, No. 5 (2013).

Quinlan, Michael et al., "Bringing Simulation to Life: A Mixed Reality Autonomous Intersection", Oct. 2010, Proceedings of IROS 2010-IEEE/RSJ International Conference on Intelligent Robots and Systems, (IROS 2010), Taipei, Taiwan.

Stavens, David Michael, "Learning to Drive: Perception to Autonomous Cars", May 2011, Stanford University.

Gechter, Franck et al., "Towards a Hybrid Real/Virtual Simulation of Autonomus Vehicles for Critical Scenerios", Copyright 2014, International Academy, Research, and Industry Association (IARIA).

(56) References Cited

OTHER PUBLICATIONS

Wang, Shuiying et al., "Shader-based sensor simulation for autonomous car testing," 2012 15th International IEEE Conference on Intelligent Transportation Systems, Anchorage, AK, 2012. pp. 224-229.
Progressive Insurance, "Linking Driving Behavior to Automobile Accidents and Insurance Rates", Jul. 2012, Progressive Snapshot.
KPMG, "Self-driving cars: The next revolution", Copyright 2012, Center for Automobile Research.
Aala Santhosh Reddy, "The New Auto Insurance Ecosystem: Telematics, Mobility and the connected car", Aug. 2012, Cognizant.
Roberts, Les, "What is telemactics insurance?", Jun. 20, 2012, MoneySupermarket.
The history of driveless cars by Fact site; 11 pages; Jun. 2017 (Year; 2017).
"Driverless Cars . . . The Future is Already Here", AutoInsurance Center, downloaded from the Internet at: <http://www.autoinsurancecenter.com/driverless-cars . . . the-future-is-already-here.htm> (2010; downloaded on Mar. 27, 2014).
"Integrated Vehicle-Based Safety Systems (IVBSS)", Research and Innovative Technology Administration (RITA), http://www.its.dot.gov/ivbss/, retrieved from the internet on Nov. 4, 2013, 3 pages.
Advisory Action dated Apr. 1, 2015 for U.S. Appl. No. 14/269,490, 4 pgs.
Carroll et al. "Where Innovation is Sorely Needed", http://www.technologyreview.com/news/422568/where-innovation-is-sorely-needed/?nlid, retrieved from the internet on Nov. 4, 2013, 3 pages.
Davies, Avoiding Squirrels and Other Things Google's Robot Car Can't Do, downloaded from the Internet at: <http://www.wired.com/2014/05/google-self-driving-car-can-cant/ (downloaded on May 28, 2014).
Fields et al., U.S. Appl. No. 14/511,712, filed Oct. 10, 2014.
Fields et al., U.S. Appl. No. 14/511,750, filed Oct. 10, 2014.
Final Office Action, U.S. Appl. No. 14/255,934, dated Sep. 23, 2014.
Final Office Action, U.S. Appl. No. 14/269,490, dated Jan. 23, 2015.
Hancock, G.M., P.A. Hancock, and C.M. Janelle, "The impact of Emotions and Predominant Emotion Regulation Technique on Driving Performance," pp. 5882-5885, 2012.
Levendusky, Advancements in automotive technology and their effect on personal auto insurance, downloaded from the Internet at: <http://www.verisk.com/visualize/advancements-in-automotive-technology-and-their-effect> (2013).
McCraty, R., B. Barrios-Choplin, M. Atkinson, and D. Tomasino. "The Effects of Different Types of Music on Mood, Tension, and Mental Clarity." Alternative Therapies in Health and Medicine 4.1 (1998): 75-84. NCBI PubMed. Web. Jul. 11, 2013.
Mui, Will auto insurers survive their collision with driverless cars? (Part 6), downloaded from the Internet at: <http://www.forbes.com/sites/chunkamui/2013/03/28/will-auto-insurers-survive-their-collision> (Mar. 28, 2013).
Nonfinal Office Action, U.S. Appl. No. 14/255,934, dated Jan. 15, 2015.
Nonfinal Office Action, U.S. Appl. No. 14/255,934, dated Jun. 18, 2014.
Nonfinal Office Action, U.S. Appl. No. 14/269,490, dated Sep. 12, 2014.
Notice of Allowance in U.S. Appl. No. 14/057,408 dated Sep. 25, 2014.
Notice of Allowance in U.S. Appl. No. 14/057,419 dated Oct. 5, 2015.
Notice of Allowance in U.S. Appl. No. 14/208,626 dated May 11, 2015.
Notice of Allowance in U.S. Appl. No. 14/208,626 dated Sep. 1, 2015.
Notice of Allowance in U.S. Appl. No. 14/255,934 dated May 27, 2015.
Notice of Allowance in U.S. Appl. No. 14/729,290 dated Aug. 5, 2015.
Office Action dated Dec. 26, 2014 for U.S. Appl. No. 14/511,712, 21 pgs.
Office Action in U.S. Appl. No. 13/844,090 dated Dec. 4, 2013.
Office Action in U.S. Appl. No. 14/057,419 dated Mar. 31, 2015.
Office Action in U.S. Appl. No. 14/057,419 dated Oct. 9, 2014.
Office Action in U.S. Appl. No. 14/057,456 dated Mar. 17, 2015.
Office Action in U.S. Appl. No. 14/201,491 dated Apr. 29, 2015.
Office Action in U.S. Appl. No. 14/201,491 dated Jan. 16, 2015.
Office Action in U.S. Appl. No. 14/201,491 dated Sep. 11, 2015.
Office Action in U.S. Appl. No. 14/201,491 dated Sep. 26, 2014.
Office Action in U.S. Appl. No. 14/215,789 dated Sep. 17, 2015.
Office Action in U.S. Appl. No. 14/255,934 dated Jan. 15, 2015.
Office Action in U.S. Appl. No. 14/255,934 dated Jun. 18, 2014.
Office Action in U.S. Appl. No. 14/255,934 dated Sep. 23, 2014.
Office Action in U.S. Appl. No. 14/269,490 dated Jan. 23, 2015.
Office Action in U.S. Appl. No. 14/269,490 dated Jun. 11, 2015.
Office Action in U.S. Appl. No. 14/269,490 dated Sep. 12, 2014.
Office Action in U.S. Appl. No. 14/511,712 dated Jun. 25, 2015.
Office Action in U.S. Appl. No. 14/511,712 dated Oct. 10, 2014.
Office Action in U.S. Appl. No. 14/511,750 dated Dec. 19, 2014.
Office Action in U.S. Appl. No. 14/511,750 dated Jun. 30, 2015.
Office Action in U.S. Appl. No. 14/057,408 dated Jan. 28, 2014.
Office Action in U.S. Appl. No. 14/057,408 dated May 22, 2014.
Office Action in U.S. Appl. No. 14/057,419 dated Jan. 28, 2014.
Office Action in U.S. Appl. No. 14/057,419 dated Jun. 18, 2014.
Office Action in U.S. Appl. No. 14/057,435 dated Jul. 23, 2014.
Office Action in U.S. Appl. No. 14/057,435 dated Mar. 20, 2014.
Office Action in U.S. Appl. No. 14/057,435 dated May 29, 2015.
Office Action in U.S. Appl. No. 14/057,435 dated Nov. 18, 2014.
Office Action in U.S. Appl. No. 14/057,447 dated Aug. 28, 2014.
Office Action in U.S. Appl. No. 14/057,447 dated Dec. 18, 2014.
Office Action in U.S. Appl. No. 14/057,447 dated Feb. 24, 2014.
Office Action in U.S. Appl. No. 14/057,447 dated Jul. 6, 2015.
Office Action in U.S. Appl. No. 14/057,456 dated Mar. 14, 2014.
Office Action in U.S. Appl. No. 14/057,456 dated Oct. 28, 2014.
Office Action in U.S. Appl. No. 14/057,467 dated Feb. 23, 2015.
Office Action in U.S. Appl. No. 14/057,467 dated Jan. 27, 2014.
Office Action in U.S. Appl. No. 14/057,467 dated Jun. 11, 2014.
Office Action in U.S. Appl. No. 14/057,467 dated Oct. 17, 2014.
Office Action in U.S. Appl. No. 14/208,626 dated Apr. 29, 2914.
Office Action in U.S. Appl. No. 14/208,626 dated Aug. 13, 2014.
Office Action in U.S. Appl. No. 14/208,626 dated Dec. 23, 2014.
Office Action in U.S. Appl. No. 14/339,652 dated May 15, 2015.
Office Action in U.S. Appl. No. 14/339,652 dated Oct. 23, 2014.
Office Action in U.S. Appl. No. 14/339,652 dated Sep. 24, 2015.
Office Action in U.S. Appl. No. 14/528,424 dated Feb. 27, 2015.
Office Action in U.S. Appl. No. 14/528,424 dated Jul. 30, 2015.
Office Action in U.S. Appl. No. 14/528,642 dated Jan. 13, 2015.
Office Action in U.S. Appl. No. 14/713,230 dated Oct. 9, 2015.
Office Action in U.S. Appl. No. 14/713,254 dated Oct. 9, 2015.
Office Action in U.S. Appl. No. 14/718,338 dated Jul. 7, 2015.
Read, Autonomous cars & the death of auto insurance, downloaded from the Internet at: <http://www.thecarconnection.com/news/1083266_autonomous-cars-the-death-of-auto-insurance> (Apr. 1, 2013).
Riley et al., U.S. Appl. No. 14/269,490, filed May 5, 2014.
Ryan, Can having safety features reduce your insurance premiums? (Dec. 15, 2010).
Search Report in EP Application No. 13167206.5 dated Aug. 13, 2013, 6 pages.
Sharma, Driving the future: the legal implications of autonomous vehicles conference recap, downloaded from the Internet at: <http://law.scu.edu/hightech/autonomousvehicleconfrecap2012> (2012).
Stienstra, Autonomous Vehicles & the Insurance Industry, 2013 CAS Annual Meeting—Minneapolis, MN (2013).
U.S. Appl. No. 14/215,789, filed Mar. 17, 2014, Baker et al., "Split Sensing Method".
U.S. Appl. No. 14/339,652, filed Jul. 24, 2014, Freeck et al., "System and Methods for Monitoring a Vehicle Operator and Monitoring an Operating Environment Within the Vehicle".
U.S. Appl. No. 14/528,424, filed Oct. 30, 2014, Christensen et al., "Systems and Methods for Processing Trip-Based Insurance Policies".

(56) References Cited

OTHER PUBLICATIONS

U.S. Appl. No. 14/528,642, filed Oct. 30, 2014, Christensen et al., "Systems and Methods for Managing Units Associated with Time-Based Insurance Policies".
U.S. Appl. No. 14/713,184, filed May 15, 2015, Konrardy et al., "Autonomous Vehicle Insurance Pricing".
U.S. Appl. No. 14/713,188, filed May 15, 2015, Konrardy et al., "Autonomous Feature Use Monitoring and Insurance Pricing".
U.S. Appl. No. 14/713,201, filed May 15, 2015, Konrardy et al., "Autonomous Vehicle Insurance Pricing and Offering Based Upon Accident Risk Factors".
U.S. Appl. No. 14/713,206, filed May 15, 2015, Konrardy et al., "Determining Autonomous Vehicle Technology Performance for Insurance Pricing and Offering".
U.S. Appl. No. 14/713,214, filed May 15, 2015, Konrardy et al., "Accident Risk Model Determination Using Autonomous Vehicle Operating Data".
U.S. Appl. No. 14/713,217, filed May 15, 2015, Konrardy et al., "Autonomous Vehicle Operation Feature Usage Recommendations".
U.S. Appl. No. 14/713,223, filed May 15, 2015, Konrardy et al., "Driver Feedback Alerts Based Upon Monitoring Use of Autonomous Vehicle Operation Features".
U.S. Appl. No. 14/713,226, filed May 15, 2015, Konrardy et al., "Accident Response Using Autonomous Vehicle Monitoring".
U.S. Appl. No. 14/713,230, filed May 15, 2015, Konrardy et al., "Accident Fault Determination for Autonomous Vehicles".
U.S. Appl. No. 14/713,237, filed May 15, 2015, Konrardy et al., "Autonomous Vehicle Technology Effectiveness Determination for Insurance Pricing".
U.S. Appl. No. 14/713,240, filed May 15, 2015. Konrardy et al., "Fault Determination with Autonomous Feature Use Monitoring".
U.S. Appl. No. 14/713,244, filed May 15, 2015, Konrardy et al. "Autonomous Vehicle Operation Feature Evaulation".
U.S. Appl. No. 14/713,249, flied May 15, 2015, Konrardy et al. "Autonomous Vehicle Operation Feature Monitoring and Evaluation of Effectiveness".
U.S. Appl. No. 14/713,254, filed May 15, 2015, Konrardy et al. "Accident Fault Determination for Autonomous Vehicles".
U.S. Appl. No. 14/713,261, filed May 15, 2015, Konrardy et al. "Accident Fault Determination for Autonomous Vehicles".
U.S. Appl. No. 14/713,266, filed May 15, 2015, Konrardy et al., "Autonomous Vehicle Operation Feature Monitoring and Evaluation of Effectiveness".
U.S. Appl. No. 14/713,271, filed May 15, 2015, Konrardy et al. "Fully Autonomous Vehicle Insurance Pricing".
U.S. Appl. No. 14/729,290, filed Jun. 3, 2015, Fields et al., "Advanced Vehicle Operator Intelligence System".
U.S. Appl. No. 14/857,242, filed Sep. 17, 2015, Fields et al., "Advanced Vehicle Operator Intelligence System".
Wiesenthal, David L., Dwight A. Hennessy, and Brad Totten, "The Influence of Music on Driver Stress," Journal of Applied Social Psychology 30, 8, pp. 1709-1719, 2000.
Young et al., "Cooperative Collision Warning Based Highway Vehicle Accident Reconstruction", Eighth International Conference on Intelligent Systems Design and Applications, Nov. 26-28, 2008, pp. 561-565.
Office Action, U.S. Appl. No. 14/713,261, dated Oct. 21, 2015.
Nonfinal Office Action, U.S. Appl. No. 14/713,184, dated Feb. 1, 2016.
Nonfinal Office Action, U.S. Appl. No. 14/713,188, dated Dec. 3, 2015.
Nonfinal Office Action, U.S. Appl. No. 14/713,206, dated Nov. 20, 2015.
Nonfinal Office Action, U.S. Appl. No. 14/713,217, dated Feb. 12, 2016.
Nonfinal Office Action, U.S. Appl. No. 14/713,226, dated Jan. 13, 2016.
Nonfinal Office Action, U.S. Appl. No. 14/713,249, dated Jan. 20, 2016.
Nonfinal Office Action, U.S. Appl. No. 14/713,271, dated Nov. 6, 2015.
U.S. Appl. No. 14/934,326, filed Nov. 6, 2015, Fields et al., "Autonomous Vehicle Operating Status Assessment".
U.S. Appl. No. 14/934,333, filed Nov. 6, 2015, Fields et al., "Autonomous Vehicle Control Assessment and Selection".
U.S. Appl. No. 14/934,339, filed Nov. 6, 2015, Fields et al., "Autonomous Vehicle Operator Identification".
U.S. Appl. No. 14/934,343, filed Nov. 6, 2015, Fields et al., "Autonomous Vehicle Operating Style and Mode Monitoring".
U.S. Appl. No. 14/934,345, filed Nov. 6, 2015, Fields et al., "Autonomous Vehicle Feature Recommendations".
U.S. Appl. No. 14/934,347, filed Nov. 6, 2015, Fields et al., "Autonomous Vehicle Software Version Assessment".
U.S. Appl. No. 14/934,352, filed Nov. 6, 2015, Fields et al., "Autonomous Vehicle Automatic Parking".
U.S. Appl. No. 14/934,355, filed Nov. 6, 2015, Fields et al., "Autonomous Vehicle Insurance Based Upon Usage".
U.S. Appl. No. 14/934,357, filed Nov. 6, 2015, Fields et al., "Autonomous Vehicle Salvage and Repair".
U.S. Appl. No. 14/934,361, filed Nov. 6, 2015, Fields et al., "Autonomous Vehicle Infrastructure Communication Device".
U.S. Appl. No. 14/934,371, filed Nov. 6, 2015, Fields et al., "Autonomous Vehicle Accident and Emergency Response".
U.S. Appl. No. 14/934,381, filed Nov. 6, 2015, Fields et al., "Personal Insurance Policies".
U.S. Appl. No. 14/934,385, filed Nov. 6, 2015, Fields et al., "Autonomous Vehicle Operating Status Assessment".
U.S. Appl. No. 14/934,388, filed Nov. 6, 2015, Fields et al., "Autonomous Vehicle Control Assessment and Selection".
U.S. Appl. No. 14/934,393, filed Nov. 6, 2015, Fields et al., "Autonomous Vehicle Control Assessment and Selection".
U.S. Appl. No. 14/934,400, filed Nov. 6, 2015, Fields et al., "Autonomous Vehicle Control Assessment and Selection".
U.S. Appl. No. 14/934,405, filed Nov. 6, 2015, Fields et al., "Autonomous Vehicle Automatic Parking".
Marchant, Gary E. et al., "The Coming Collision Between Autonomous Vehicles and the Liability Statement", Dec. 17, 2012, Santa Clara Law Review, vol. 52, No. 4, Article 6, 21 pages.
Peterson, Robert W., New Technology—Old Law: Autonomous Vehicles and California's Insurance Framework, Dec. 18, 2012, Santa Clara Law Review, vol. 52, No. 4, Article 7, 60 pages.
Funkhouse, Kevin, "Paving the Road Ahead: Autonomous Vehicles, Products Liability, and the Need for a New Approach", Copyright 2013, Issue 1, 2013 Utah L. Rev. 437 2013, 33 pages.
Dittrich et al. "Multi-Sensor Navigation System for an Autonomous Helicopter" IEEE, 9 pages (Year: 2002).
Filev et al., Future Mobility: Integrating Vehicle Control with Cloud Computing, Mechanical Engineering, 135.3:S18-S24 American Society of Mechanical Engineers (Mar. 2013).
Gerdes et al., Implementable ethics for autonomous vehicles, Chapter 5, IN: Maurer et al. (eds.), Autonomes Fahren, Soringer Vieweg, Berlin (2015).
Gietelink et al. "Development of advanced driver assistance systems with vehicle hardware-in-the-loop simulations", Vehicle System Dynamics, vol. 44, No. 7, pp. 569-590, Jul. 2006. (Year: 2006).
Gleeson, "Flow much is a monitored alarm insurance deduction?", Demand Media (Oct. 30, 2014).
Gray et al., A unified Approach to threat assessment and control for automotive active safety, IEEE, 14(3):1490-9 (Sep. 2013).
Lattner et al., Knowledge-based risk assessment for intelligent vehicles, pp. 191-196, IEEE KIMAS 2005, Apr. 18-21, Waltham, Massachusetts (Apr. 2005).
Lewis, The History of Driverless Cars, downloaded from the Internet at: <www.thefactsite.com/2017/06/driverless-cars-history.html> (Jun. 2017).
Martin et al. "Certification for Autonomous Vehicles", 34 pages. (Year: 2015).
Miller, A simulation and regression testing framework for autonomous workers, Case Western Reserve University, 12 pages (Aug. 2007).

(56) References Cited

OTHER PUBLICATIONS

Private Ownership Costs, RACO, Wayback Machine, http://www.racq.com.au:80/-/media/pdf/racqpdfs/cardsanddriving/cars/0714_vehicle_running_cost s.ashx/ (Oct. 6, 2014).

Saberi et al. "An Approach for Functional Safety Improvement of an Existing Automotive System" IEEE, 6 pages. (Year: 2015).

Sepulcre et al., "Cooperative Vehicle-to-Vehicle Active Safety Testing Under Challenging Conditions", Transportation Research Part C 26 (2013), Jan. 2013, pp. 233-255.

Tiberkak et al., An architecture for policy-based home automation system (PBHAS), 2010 IEEE Green Technologies Conference (Apr. 15-16, 2010).

Vasudevan et al., Safe semi-autonomous control with enhanced driver modeling, 2012 American Control Conference, Fairmont Queen Elizabeth, Montreal, Canada (Jun. 27-29, 2012).

Wardzinski, Dynamic risk assessment in autonomous vehicles motion planning, Proceedings of the 2008 1st International Conference on Information Technology, IT 2008, Gdansk, Poland (May 19-21, 2008).

Franke, Uwe & Gavrila, Dariu & Gorzig, Steffen & Lindner, Frank & Paetzold, Frank & Wohler, Christian, Autonomous Driving Goes Downtown., Nov. 1998, IEEE Intelligent System, 1-13 (Year: 1998).

Funkhouser, Kevin, "Paving the Road Ahead: Autonomous Vehicles, Products Liability, and the Need for a New Approach", Copyright 2013, Issue 1,2013 Utah L Rev. 437 2013, 33 pages.

Gurney, Jeffrey K., "Sue My Car Not Me: Products Liability and Accidents Involving Autonomous Vehicles", Nov. 15, 2013, 2013 U. III. J.L. Tech. & Pol'y 247, 31 pages.

J.D. Power and Associates, "The Influence of Telematics on Customer Experience: Case Study of Progressive's Snapshot Program", Copyright 2013, McGraw Hill Financial.

KPMG, "Self-driving cars: The next revolution", Copyright 2012, Center for Automotive Research.

Marchant, Gary E. et al., "The Coming Collision Between Autonomous Vehicles and the Liability System", Dec. 17, 2012, Santa Clara Law Review, vol. 52, No. 4, Article 6, 21 pages.

Pohanka, Pavel et al., "Sensors Simulation Environment for Sensor Data Fusion", 14th International Conference on Information Fusion, Chicago, IL, 2011, pp. 1-8.

Reifel, Joe et al., "Telematics: The Game Changer—Reinventing Auto Insurance", Copyright 2010, A.T. Kearney.

Alberi, James, Thomas, "A proposed Standardized Testing Procedure for Autonomous Ground Vehicles", Partial Requirement for the Master of Science Degree in Mechanical Engineering Thesis, Virginia Polytechnic Institute and State University, pp. 1-63 ( Year: 2008).

Conference Paper, "A simulation model to evaluate and verify functions of autonomous vehicle based on Simulink" by Chen, Hui & Xiu.Caiiing, Dec. 2009, pp. 645-656 (Year: 2009).

Gao, Yigi, "Model Predictive Control for Autonomous & Semi-autonomous vehicles", a Dissertation in partial satisfaction of the requirements of Doctor of Philosophy in Engineering- Mechanical Engineering in the Graduate Division of the University of California, Berkley, Spring 2014, pp. 1-107 (Year: 2014).

Markulla, Gustav, "Evaluating vehicle stability support systems by measuring, analyzing, and modeling driver behavior", Chalmers of University Technology, 2013, pp. 1-74 (Year: 2013).

Wardzinski, Andrzej, "Dynamic Risk Assessment in Autonomous Vehicle Motion Planning", IEEE 1st International Conference on Information Technology, Gdansk, May, 18-21, 2008, pp. 1-4, (Year: 2008).

\* cited by examiner

AUTONOMOUS COMMUNICATION FEATURE USE AND INSURANCE PRICING

CROSS-REFERENCE TO RELATED APPLICATIONS

This application is a continuation of, and claims the benefit of, U.S. patent application Ser. No. 14/713,194, entitled "Autonomous Communication Feature Use and Insurance Pricing" and filed May 15, 2015, which claims the benefit of U.S. Provisional Application No. 62/000,878 (filed May 20, 2014); U.S. Provisional Application No. 62/018,169 (filed Jun. 27, 2014); U.S. Provisional Application No. 62/035,660 (filed Aug. 11, 2014); U.S. Provisional Application No. 62/035,669 (filed Aug. 11, 2014); U.S. Provisional Application No. 62/035,723 (filed Aug. 11, 2014); U.S. Provisional Application No. 62/035,729 (filed Aug. 11, 2014); U.S. Provisional Application No. 62/035,769 (filed Aug. 11, 2014); U.S. Provisional Application No. 62/035,780 (filed Aug. 11, 2014); U.S. Provisional Application No. 62/035,832 (filed Aug. 11, 2014); U.S. Provisional Application No. 62/035,859 (filed Aug. 11, 2014); U.S. Provisional Application No. 62/035,867 (filed Aug. 11, 2014); U.S. Provisional Application No. 62/035,878 (filed Aug. 11, 2014); U.S. Provisional Application No. 62/035,980 (filed Aug. 11, 2014); U.S. Provisional Application No. 62/035,983 (filed Aug. 11, 2014); U.S. Provisional Application No. 62/036,090 (filed Aug. 11, 2014); U.S. Provisional Application No. 62/047,307 (filed Sep. 8, 2014); and U.S. Provisional Application No. 62/056,893 (filed Sep. 29, 2014) The entirety of each of the foregoing provisional applications is incorporated by reference herein.

Additionally, the present application is related to co-pending U.S. patent application Ser. No. 14/951,774 (filed Nov. 25, 2015); co-pending Ser. No. 14/978,266 (filed Dec. 22, 2015); co-pending U.S. patent application Ser. No. 14/713,184 (filed May 15, 2015); co-pending U.S. patent application Ser. No. 14/713,271 (filed May 15, 2015); co-pending U.S. patent application Ser. No. 14/713,188 (filed May 15, 2015); co-pending U.S. patent application Ser. No. 14/713,201 (filed May 15, 2015); co-pending U.S. patent application Ser. No. 14/713,206 (filed May 15, 2015); co-pending U.S. patent application Ser. No. 14/713,214 (filed May 15, 2015); co-pending U.S. patent application Ser. No. 14/713,217 (filed May 15, 2015); co-pending U.S. patent application Ser. No. 14/713,223 (filed May 15, 2015); co-pending U.S. patent application Ser. No. 14/713,226 (tiled May 15, 2015); co-pending U.S. patent application Ser. No. 14/713,230 (filed May 15, 2015); co-pending U.S. patent application Ser. No. 14/713,237 (filed May 15, 2015); co-pending U.S. patent application Ser. No. 14/713,240 (filed May 15, 2015); co-pending U.S. patent application Ser. No. 14/713,244 (filed May 15, 2015); co-pending U.S. patent application Ser. No. 14/713,249 (May 15, 2015); co-pending U.S. patent application Ser. No. 14/713,254 (filed May 15, 2015); co-pending U.S. patent application Ser. No. 14/951,803 (filed Nov. 25, 2015); co-pending U.S. patent application Ser. No. 14/713,261 (filed May 15, 2015); co-pending U.S. patent application Ser. No. 14/951,798 (filed Nov. 25, 2015); and co-pending U.S. patent application Ser. No. 14/713,266 (May 15, 2015).

FIELD

The present disclosure generally relates to systems and methods for determining risk, pricing, and offering vehicle insurance policies, specifically vehicle insurance policies where vehicle operation is partially or fully automated.

BACKGROUND

Vehicle or automobile insurance exists to provide financial protection against physical damage and/or bodily injury resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy. The payments from the insured are generally referred to as "premiums," and typically are paid on behalf of the insured over time at periodic intervals. An insurance policy may remain "in-force" while premium payments are made during the term or length of coverage of the policy as indicated in the policy. An insurance policy may "lapse" (or have a status or state of "lapsed"), for example, when premium payments are not being paid or if the insured or the insurer cancels the policy.

Premiums may be typically determined based upon a selected level of insurance coverage, location of vehicle operation, vehicle model, and characteristics or demographics of the vehicle operator. The characteristics of a vehicle operator that affect premiums may include age, years operating vehicles of the same class, prior incidents involving vehicle operation, and losses reported by the vehicle operator to the insurer or a previous insurer. Past and current premium determination methods do not, however, account for use of autonomous vehicle operating features. The present embodiments may, inter alia, alleviate this and/or other drawbacks associated with conventional techniques.

BRIEF SUMMARY

The present embodiments may be related to autonomous or semi-autonomous vehicle functionality, including driverless operation, accident avoidance, or collision warning systems. These autonomous vehicle operation features may either assist the vehicle operator to more safely or efficiently operate a vehicle or may take full control of vehicle operation under some or all circumstances. The present embodiments may also facilitate risk assessment and premium determination for vehicle insurance policies covering vehicles with autonomous operation features.

In accordance with the described embodiments, the disclosure herein generally addresses systems and methods for determining risk and pricing insurance for a vehicle having one or more autonomous operation features for controlling the vehicle or assisting a vehicle operator in controlling the vehicle. A server may receive information regarding autonomous operation features of a vehicle, determine risks associated with the autonomous operation features, determine expected usage of the autonomous operation features, and/or determine the total risk associated with autonomous operation of the vehicle. According to some aspects, the server may further receive information regarding the vehicle operator and determine risks associated with operation of the vehicle by the vehicle operator. The total risk level may be used to determine a premium for an insurance policy associated with the vehicle, which may be determined by reference to a risk category.

In one aspect, a computer-implemented method for determining risk and pricing insurance for a vehicle having one or more autonomous operation features for controlling the vehicle may be provided. The computer-implemented method may include receiving information regarding the one or more autonomous operation features of the vehicle, determining a risk profile associated with autonomous operation of the vehicle based upon, at least in part (i.e., wholly or partially), the information regarding the one or more autonomous operation features, determining a plurality of expected use levels of the vehicle, and/or determining a total risk level associated with autonomous operation of the vehicle based upon, at least in part (i.e., wholly or partially), the risk profile and the expected use levels. The risk profile may include a plurality of risk levels associated with autonomous operation of the vehicle under a plurality of operating conditions, and the expected use levels may be associated with the plurality of operating conditions. Additionally or alternatively, the computer-implemented method may include receiving information regarding the vehicle operator and determining an operator risk profile associated with vehicle operation by the vehicle operator, in which case the total risk level may be determined based upon, at least in part (i.e., wholly or partially), the plurality of risk levels, the expected use levels, and/or the operator risk profile. Furthermore, the autonomous operation features may include one or more autonomous communication features, in which case autonomous communication levels may be determined and included in the determination of the total risk level. The method may include additional, fewer, or alternate actions, including those discussed elsewhere herein.

In another aspect, a computer system for determining risk and pricing insurance for a vehicle having one or more autonomous operation features for controlling the vehicle may be provided. The computer system may include one or more processors, one or more communication modules adapted to communicate data, and a program memory coupled to the one or more processors and storing executable instructions. The executable instruction may, when executed by the one or more processors, cause the computer system to receive information regarding the one or more autonomous operation features of the vehicle, determine a risk profile associated with autonomous operation of the vehicle based upon the information regarding the one or more autonomous operation features, determine a plurality of expected use levels of the vehicle, and/or determine a total risk level associated with autonomous operation of the vehicle based upon the risk profile and/or the expected use levels. The risk profile may include a plurality of risk levels associated with autonomous operation of the vehicle under a plurality of operating conditions, and the expected use levels may be associated with the plurality of operating conditions. Additionally, or alternatively, the computer system may receive information regarding the vehicle operator and determine an operator risk profile associated with vehicle operation by the vehicle operator, in which case the total risk level may be determined based upon the plurality of risk levels, the expected use levels, and/or the operator risk profile. Furthermore, the autonomous operation features may include one or more autonomous communication features, in which case autonomous communication levels may be determined and included in the determination of the total risk level. The system may include additional, fewer, or alternate actions, including those discussed elsewhere herein.

In yet another aspect, a tangible, non-transitory computer-readable medium storing instructions for determining risk and pricing insurance for a vehicle having one or more autonomous operation features for controlling the vehicle may be provided. The instructions may, when executed by at least one processor of a computer system, cause the computer system to receive information regarding the one or more autonomous operation features of the vehicle, determine a risk profile associated with autonomous operation of the vehicle based upon the information regarding the one or more autonomous operation features, determine a plurality of expected use levels of the vehicle, and/or determine a total risk level associated with autonomous operation of the vehicle based upon the risk profile and the expected use levels. The risk profile may include a plurality of risk levels associated with autonomous operation of the vehicle under a plurality of operating conditions, and the expected use levels may be associated with the plurality of operating conditions. Additionally or alternatively, the instruction may cause the computer system to receive information regarding the vehicle operator and determine an operator risk profile associated with vehicle operation by the vehicle operator, in which case the total risk level may be determined based upon the plurality of risk levels, the expected use levels, and the operator risk profile. Furthermore, the autonomous operation features may include one or more autonomous communication features, in which case autonomous communication levels may be determined and included in the determination of the total risk level. The method may include additional, fewer, or alternate actions, including those discussed elsewhere herein.

In some methods or systems, the total risk level may be determined without reference to factors relating to risks associated with a vehicle operator. In such methods or system, the total risk level may be based solely on the information regarding the autonomous operation features or may include information regarding the vehicle. In either case, factors relating to the risks associated with the vehicle operator (such as age, experience, or past operating history of the vehicle operator) may be excluded from the determination of the total risk level.

In some further methods or systems, the information regarding the one or more autonomous operation features may include information or be based upon test results corresponding to the one or more autonomous operation features. The information regarding the one or more autonomous operation features of the vehicle may include test results for test units corresponding to the one or more autonomous operation features, wherein the test results may include responses of the test units to test inputs corresponding to test scenarios and may be generated by the test units disposed within one or more test vehicles in response to sensor data from a plurality of sensors within the one or more test vehicles. The information regarding the one or more autonomous operation features of the vehicle may further be based upon (i) test results for test units corresponding to the one or more autonomous operation features, which test results may include responses of the test units to test inputs corresponding to test scenarios, and/or (ii) actual losses associated with insurance policies covering a plurality of other vehicles having at least one of the one or more autonomous operation features.

In some methods or systems, the operator risk profile may include a plurality of operator risk levels associated with operation of the vehicle by the operator under the plurality of operating conditions. The expected use levels associated with the plurality of operating conditions also may include information regarding expected operation of the vehicle with autonomous operation features enabled and expected operation of the vehicle with autonomous operation features disabled. Some methods or systems may receive information regarding previous use of the one or more autonomous operation features of the vehicle, and the plurality of expected use levels may be determined, at least in part, based upon the information regarding previous use of the one or more autonomous operation features. In some methods or systems, the information regarding previous use of the one or more autonomous operation features may include one or more of the following: times, road conditions, weather conditions, or autonomous operation feature settings associated with the previous use of the autonomous operation features.

In still further methods or systems, the expected use levels may include one or more of (i) expected autonomous operation levels of the vehicle, (ii) expected operation of the vehicle by a vehicle operator (such as where the vehicle operator may disable the autonomous operation features), and/or (iii) expected settings associated with the one or more autonomous operation features. In additional or alternative methods or systems, receiving information regarding the one or more autonomous operation features of the vehicle may include receiving information regarding the vehicle, determining types of the one or more autonomous operation features, and/or determining types of one or more sensors installed in the vehicle based upon the information regarding the vehicle, such that the plurality of risk levels associated with autonomous operation of the vehicle may be determined, at least in part, based upon the sensors installed in the vehicle.

In yet further methods or systems, the methods or systems may receive a request for a quote of a premium associated with a vehicle insurance policy, determine a premium associated with a vehicle insurance policy based upon the total risk level, and/or present an option to purchase the vehicle insurance policy to a customer associated with the vehicle. In still further methods or systems, the information regarding the one or more autonomous operation features may include one or more of the following: a type and version of the autonomous operation feature, an operation of the autonomous operation feature, a type and version of autonomous operation feature control software, and/or settings of the autonomous operation feature.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
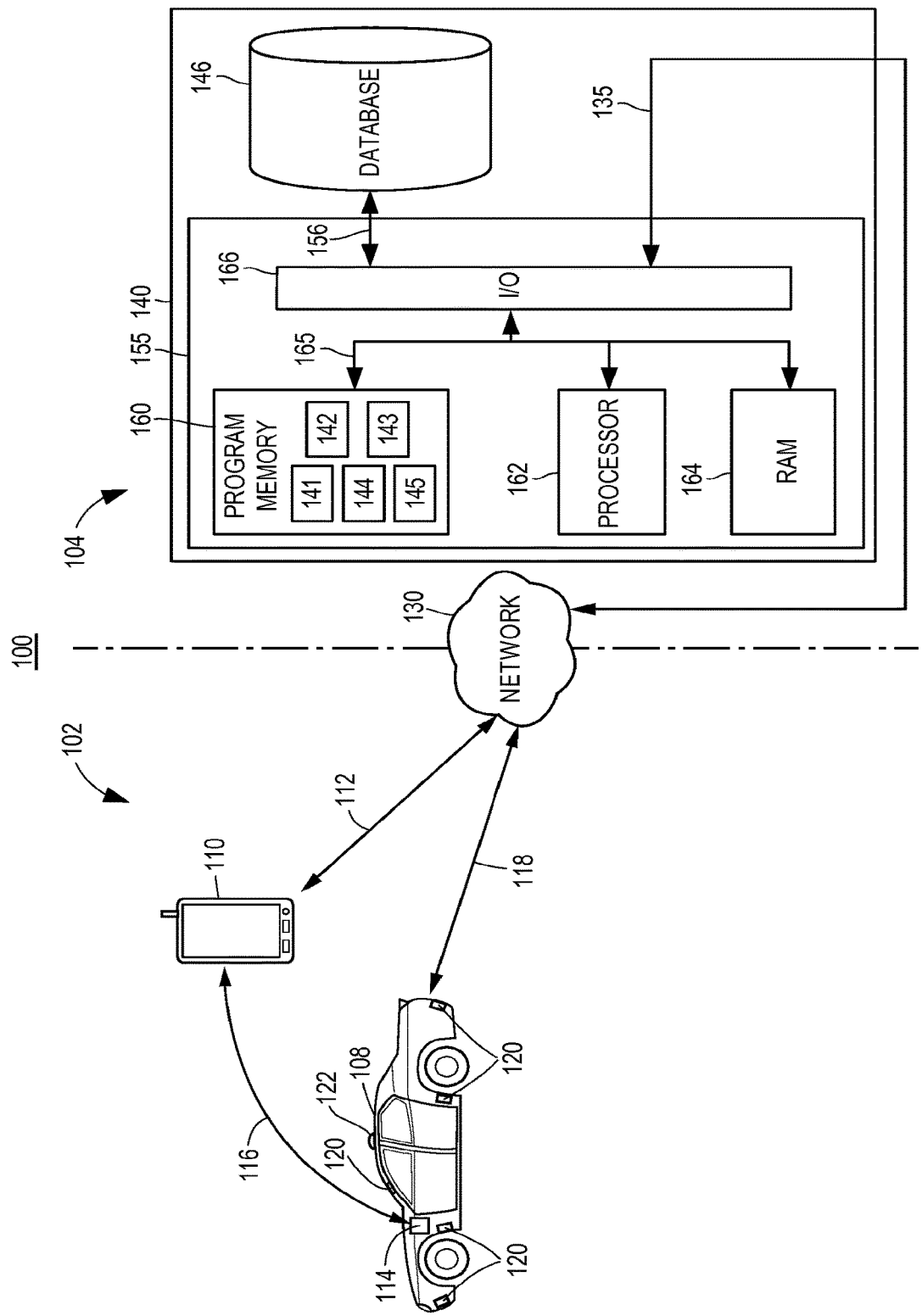
FIG. 1 illustrates a block diagram of an exemplary computer network, a computer server, a mobile device, and an on-board computer for implementing autonomous vehicle operation, monitoring, evaluation; and insurance processes in accordance with the described embodiments.

The systems and methods disclosed herein generally relate to evaluating, monitoring, pricing, and processing vehicle insurance policies for vehicles including autonomous (or semi-autonomous) vehicle operation features. The autonomous operation features may take full control of the vehicle wider certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). The autonomous operation features may affect the risk related to operating a vehicle, both individually and/or in combination. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

Information regarding the risks associated with vehicle operation with and without the autonomous operation features may then be used to determine risk categories or premiums for a vehicle insurance policy covering a vehicle with autonomous operation features. Risk category or price may be determined based upon factors relating to the evaluated effectiveness of the autonomous vehicle features. The risk or price determination may also include traditional factors, such as location, vehicle type, and level of vehicle use. For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Autonomous Automobile Insurance

The present embodiments may relate to assessing and pricing insurance based upon autonomous (or semi-autonomous) functionality of a vehicle, and not the human driver. A smart vehicle may maneuver itself without human intervention and/or include sensors, processors, computer instructions, and/or other components that may perform or direct certain actions conventionally performed by a human driver.

An analysis of how artificial intelligence facilitates avoiding accidents and/or mitigates the severity of accidents may be used to build a database and/or model of risk assessment. After which, automobile insurance risk and/or premiums (as well as insurance discounts, rewards, and/or points) may be adjusted based upon autonomous or semi-autonomous vehicle functionality, such as by groups of autonomous or semi-autonomous functionality or individual features. In one aspect, an evaluation may be performed of how artificial intelligence, and the usage thereof, impacts automobile accidents and/or automobile insurance claims.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

The adjustments to automobile insurance rates or premiums based upon the autonomous or semi-autonomous vehicle-related functionality or technology may take into account the impact of such functionality or technology on the likelihood of a vehicle accident or collision occurring. For instance, a processor may analyze historical accident information and/or test data involving vehicles having autonomous or semi-autonomous functionality. Factors that may be analyzed and/or accounted for that are related to insurance risk, accident information, or test data may include (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of interact connection for the vehicle; and/or other factors. These types of factors may also be weighted according to historical accident information; predicted accidents, vehicle trends, test data, and/or other considerations.

In one aspect, the benefit of one or more autonomous or semi-autonomous functionalities or capabilities may be determined, weighted, and/or otherwise characterized. For instance, the benefit of certain autonomous or semi-autonomous functionality may be substantially greater in city or congested traffic, as compared to open road or country driving traffic. Additionally or alternatively, certain autonomous or semi-autonomous functionality may only work effectively below a certain speed, i.e., during city driving or driving in congestion, Other autonomous or semi-autonomous functionality may operate more effectively on the highway and away from city traffic, such as cruise control. Further individual autonomous or semi-autonomous functionality may be impacted by weather, such as rain or snow, and/or time of day (day light versus night). As an example, fully automatic or semi-automatic lane detection warnings may be impacted by rain, snow, ice, and/or the amount of sunlight (all of which may impact the imaging or visibility of lane markings painted onto a road surface, and/or road markers or street signs).

Automobile insurance premiums, rates, discounts, rewards, refunds, points, etc. may be adjusted based upon the percentage of time or vehicle usage that the vehicle is the driver, i.e., the amount of time a specific driver uses each type of autonomous (or even semi-autonomous) vehicle functionality. In other words, insurance premiums, discounts, rewards, etc. may be adjusted based upon the percentage of vehicle usage during which the autonomous or semi-autonomous functionality is in use. For example, automobile insurance risk, premiums, discounts, etc. for an automobile having one or more autonomous or semi-autonomous functionalities may be adjusted and/or set based upon the percentage of vehicle usage that the one or more individual autonomous or semi-autonomous vehicle functionalities are in use, anticipated to be used or employed by the driver, and/or otherwise operating.

Such usage information for a particular vehicle may be gathered over time and/or via remote wireless communication with the vehicle. One embodiment may involve a processor on the vehicle, such as within a vehicle control system or dashboard, monitoring in real-time whether vehicle autonomous or semi-autonomous functionality is currently operating. Other types of monitoring may be remotely performed, such as via wireless communication between the vehicle and a remote server, or wireless communication between a vehicle-mounted dedicated device (that is configured to gather autonomous or semi-autonomous functionality usage information) and a remote server.

In one embodiment, if the vehicle is currently employing autonomous or semi-autonomous functionality, the vehicle may send a Vehicle-to-Vehicle (V2V) wireless communication to a nearby vehicle also employing the same or other type(s) of autonomous or semi-autonomous functionality.

As an example, the V2V wireless communication from the first vehicle to the second vehicle (following the first vehicle) may indicate that the first vehicle is autonomously braking, and the degree to which the vehicle is automatically braking and/or slowing down. In response, the second vehicle may also automatically or autonomously brake as well, and the degree of automatically braking or slowing down of the second vehicle may be determined to match, or even exceed, that of the first vehicle. As a result, the second vehicle, traveling directly or indirectly, behind the first vehicle, may autonomously safely break in response to the first vehicle autonomously breaking.

As another example, the V2V wireless communication from the first vehicle to the second vehicle may indicate that the first vehicle is beginning or about to change lanes or turn. In response, the second vehicle may autonomously take appropriate action, such as automatically slow down, change lanes, turn, maneuver, etc. to avoid the first vehicle.

As noted above, the present embodiments may include remotely monitoring, in real-time and/or via wireless communication, vehicle autonomous or semi-autonomous functionality. From such remote monitoring, the present embodiments may remotely determine that a vehicle accident has occurred. As a result, emergency responders may be informed of the location of the vehicle accident, such as via wireless communication, and/or quickly dispatched to the accident scene.

The present embodiments may also include remotely monitoring, in real-time or via wireless communication, that vehicle autonomous or semi-autonomous functionality is, or is not, in use, and/or collect information regarding the amount of usage of the autonomous or semi-autonomous functionality. From such remote monitoring, a remote server may remotely send a wireless communication to the vehicle to prompt the human driver to engage one or more specific vehicle autonomous or semi-autonomous functionalities.

Another embodiment may enable a vehicle to wirelessly communicate with a traffic light, railroad crossing, toll both, marker, sign, or other equipment along the side of a road or highway. As an example, a traffic light may wirelessly indicate to the vehicle that the traffic light is about to switch from green to yellow, or from yellow to red. In response to such an indication remotely received from the traffic light, the autonomous or semi-autonomous vehicle may automatically start to brake, and/or present or issue a warning/alert to the human driver. After which, the vehicle may wirelessly communicate with the vehicles traveling behind it that the traffic light is about to change and/or that the vehicle has started to brake or slow down such that the following vehicles may also automatically brake or slow down accordingly.

Insurance premiums, rates, ratings, discounts, rewards, special offers, points, programs, refunds, claims, claim amounts, etc. may be adjusted for, or may otherwise take into account, the foregoing functionality and/or the other functionality described herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Exemplary Embodiments

Insurance providers may currently develop a set of rating factors based upon the make, model, and model year of a vehicle. Models with better loss experience receive lower factors, and thus lower rates. One reason that this current rating system cannot be used to assess risk for autonomous technology is that many autonomous features vary for the same model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle.

The present embodiments may assess and price insurance risks at least in part based upon autonomous or semi-autonomous vehicle technology that replaces actions of the driver. In a way, the vehicle-related computer instructions and artificial intelligence may be viewed as a "driver."

In one computer-implemented method of adjusting or generating an insurance policy, (1) data may be captured by a processor (such as via wireless communication) to determine the autonomous or semi-autonomous technology or functionality associated with a specific vehicle that is, or is to be, covered by insurance; (2) the received data may be compared by the processor to a stored baseline of vehicle data (such as actual accident information, and/or autonomous or semi-autonomous vehicle testing data); (3) risk may be identified or assessed by the processor based upon the specific vehicle's ability to make driving decisions and/or avoid or mitigate crashes; (4) an insurance policy may be adjusted (or generated or created), or an insurance premium may be determined by the processor based upon the risk identified that is associated with the specific vehicle's autonomous or semi-autonomous ability or abilities; and/or (5) the insurance policy and/or premium may be presented on a display or otherwise provided to the policyholder or potential customer for their review and/or approval. The method may include additional, fewer, or alternate actions, including those discussed below and elsewhere herein.

The method may include evaluating the effectiveness of artificial intelligence and/or vehicle technology in a test environment, and/or using real driving experience. The identification or assessment of risk performed by the method (and/or the processor) may be dependent upon the extent of control and decision making that is assumed by the vehicle, rather than the driver.

Additionally or alternatively, the identification or assessment of insurance and/or accident-based risk may be dependent upon the ability of the vehicle to use external information (such as vehicle-to-vehicle and vehicle-to-infrastructure communication) to make driving decisions. The risk assessment may further be dependent upon the availability of such external information. For instance, a vehicle (or vehicle owner) may be associated with a geographical location, such as a large city or urban area, where such external information is readily available via wireless communication. On the other hand, a small town or rural area may or may not have such external information available.

The information regarding the availability of autonomous or semi-autonomous vehicle technology, such as a particular factory-installed hardware and/or software package, version, revision, or update, may be wirelessly transmitted to a remote server for analysis. The remote server may be associated with an insurance provider, vehicle manufacturer, autonomous technology provider, and/or other entity.

The driving experience and/or usage of the autonomous or semi-autonomous vehicle technology may be monitored in real time, small timeframes, and/or periodically to provide feedback to the driver, insurance provider, and/or adjust insurance policies or premiums. In one embodiment, information may be wirelessly transmitted to the insurance provider, such as from a transceiver associated with a smart car to an insurance provider remote server.

Insurance policies, including insurance premiums, discounts, and rewards, may be updated, adjusted, and/or determined based upon hardware or software functionality, and/or hardware or software upgrades. Insurance policies, including insurance premiums, discounts, etc. may also be updated, adjusted, and/or determined based upon the amount of usage and/or the type(s) of the autonomous or semi-autonomous technology employed by the vehicle.

In one embodiment, performance of autonomous driving software and/or sophistication of artificial intelligence may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous driving technology, artificial intelligence capabilities, rather than human decision making, may be evaluated to determine the relative risk of the insurance policy. This evaluation may be conducted using multiple techniques. Vehicle technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision.

Additionally, actual loss experience of the software in question may be analyzed. Vehicles with superior artificial intelligence and crash avoidance capabilities may experience lower insurance losses in real driving situations.

Results from both the test environment and/or actual insurance losses may be compared to the results of other autonomous software packages and/or vehicles lacking autonomous driving technology to determine a relative risk factor (or level of risk) for the technology in question. This risk factor (or level of risk) may be applicable to other vehicles that utilize the same or similar autonomous operation software package(s).

Emerging technology, such as new iterations of artificial intelligence systems, may be priced by combining its individual test environment assessment with actual losses corresponding to vehicles with similar autonomous operation software packages. The entire vehicle software and artificial intelligence evaluation process may be conducted with respect to various technologies and/or elements that affect driving experience. For example, a fully autonomous vehicle may be evaluated based upon its vehicle-to-vehicle communications. A risk factor could then be determined and applied when pricing the vehicle. The driver's past loss experience and/or other driver risk characteristics may not be considered for fully autonomous vehicles, in which all driving decisions are made by the vehicle's artificial intelligence.

In one embodiment, a separate portion of the automobile insurance premium may be based explicitly on the artificial intelligence software's driving performance and characteristics. The artificial intelligence pricing model may be combined with traditional methods for semi-autonomous vehicles. Insurance pricing for fully autonomous, or driverless, vehicles may be based upon the artificial intelligence model score by excluding traditional rating factors that measure risk presented by the drivers. Evaluation of vehicle software and/or artificial intelligence may be conducted on an aggregate basis or for specific combinations of technology and/or driving factors or elements (as discussed elsewhere herein). The vehicle software test results may be combined with actual loss experience to determine relative risk.

Exemplary Autonomous Vehicle Operation System

FIG. 1 illustrates a block diagram of an exemplary autonomous vehicle insurance system 100 on which the exemplary methods described herein may be implemented. The high-level architecture includes both hardware and software applications, as well as various data communications channels for communicating data between the various hardware and software components. The autonomous vehicle insurance system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 installed within the vehicle 108 that may communicate with the on-board computer 114. The front-end components 102 may further process the sensor data using the on-board computer 114 or a mobile device 110 (e.g., a smart phone, a tablet computer, a special purpose computing device, etc.) to determine when the vehicle is in operation and information regarding the vehicle. In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, determine use and effectiveness of autonomous operation features, determine risk levels or premium price, and/or facilitate purchase or renewal of an autonomous vehicle insurance policy.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., an ignition sensor, an odometer, a system clock, a speedometer, a tachometer, an accelerometer, a gyroscope, a compass, a geolocation unit, a camera, a distance sensor, etc.), which sensors may also be incorporated within or connected to the on-board computer 114. The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130. In other embodiments, the on-board computer 114 may perform all of the functions of the mobile device 110 described herein, in which case no mobile device 110 may be present in the system 100. Either or both of the mobile device 110 or on-board computer 114 may communicate with the network 130 over links 112 and 118, respectively. Additionally, the mobile device 110 and on-board computer 114 may communicate with one another directly over link 116.

The mobile device 110 may be either a general-use personal computer, cellular phone, smart phone, tablet computer, or a dedicated vehicle use monitoring device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, a camera, an accelerometer, a tachometer, or a speedometer. Some of the sensors 120 (e.g., radar. LIDAR, or camera units) may actively or passively scan the vehicle environment for obstacles (e.g., other vehicles, buildings, pedestrians, etc.), lane markings, or signs or signals. Other sensors 120 (e.g., GPS, accelerometer, or tachometer units) may provide data for determining the location or movement of the vehicle 108. Information generated or received by the sensors 120 may be communicated to the on-board computer 114 or the mobile device 110 for use in autonomous vehicle operation.

In some embodiments, the communication component 122 may receive information from external sources, such as other vehicles or infrastructure. The communication component 122 may also send information regarding the vehicle 108 to external sources. To send and receive information, the communication component may include a transmitter and a receiver designed to operate according to predetermined specifications, such as the dedicated short-range communication (DSRC) channel, wireless telephony. Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to control the steering, braking, or throttle of the vehicle 108. To facilitate such control, the on-board computer 114 may be communicatively connected to the controls or components of the vehicle 108 by various electrical or electromechanical control components (not shown). In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. Where the network 130 comprises the Internet, data communications may take place over the network 130 via an Internet communication protocol. The back-end components 104 include one or more servers 140. Each server 140 may include one or more computer processors adapted and configured to execute various software applications and components of the autonomous vehicle insurance system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, speed of the vehicle 108, RPM or other tachometer readings of the vehicle 108, lateral and longitudinal acceleration of the vehicle 108, incidents or near collisions of the vehicle 108, communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle insurance system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for autonomous operation feature information, vehicle insurance policy information, and vehicle use information. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMS 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features, a feature evaluation application 142 for determining the effectiveness of autonomous operation features under various conditions, a compatibility evaluation application 143 for determining the effectiveness of combinations of autonomous operation features, a risk assessment application 144 for determining a risk category associated with an insurance policy covering an autonomous vehicle, and an autonomous vehicle insurance policy purchase application 145 for offering and facilitating purchase or renewal of an insurance policy covering an autonomous vehicle. The various software applications may be executed on the same computer processor or on different computer processors.

Figure 2:
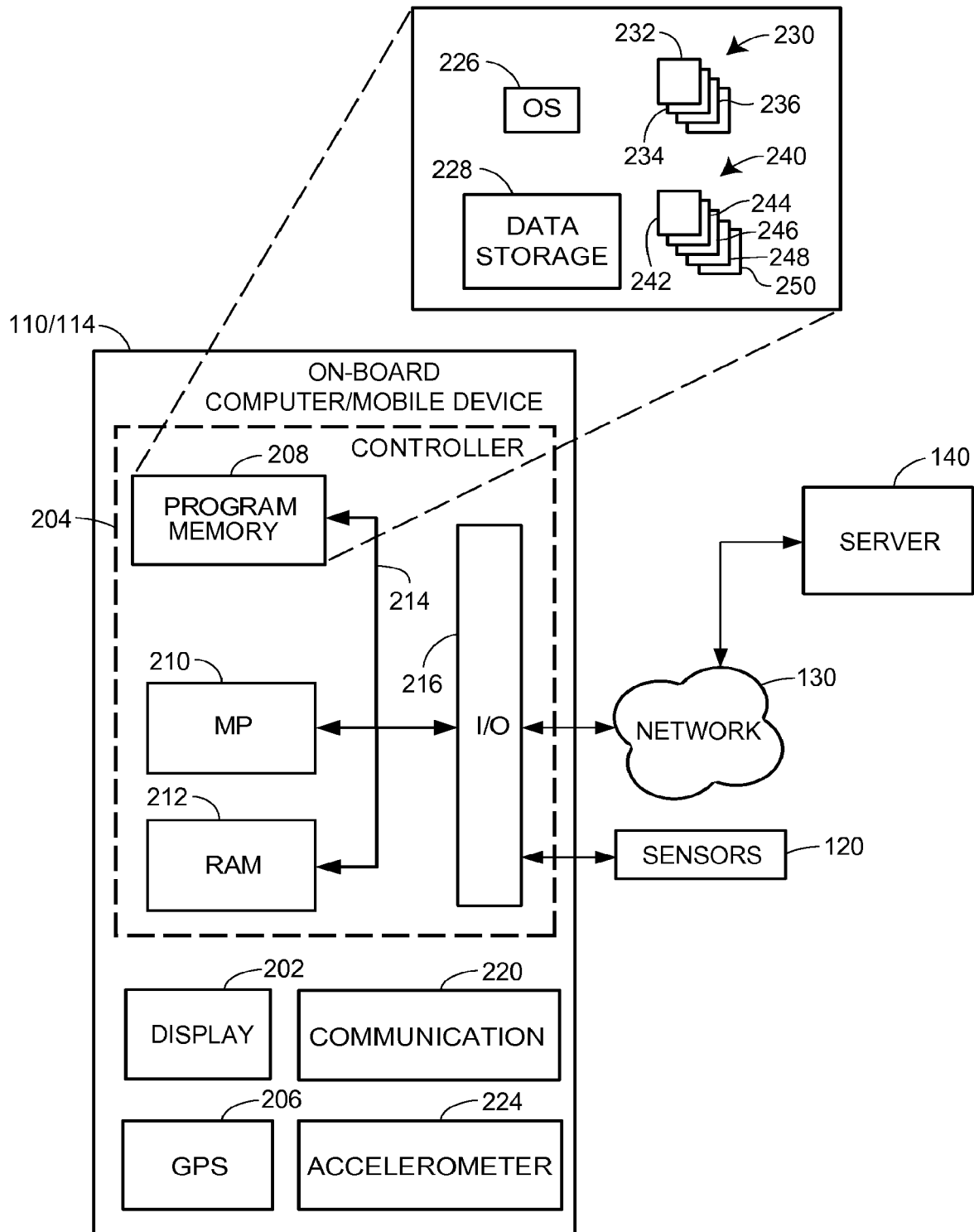
FIG. 2 illustrates a block diagram of an exemplary on-board computer or mobile device.

FIG. 2 illustrates a block diagram of an exemplary mobile device 110 or an exemplary on-board computer 114 consistent with the system 100. The mobile device 110 or on-board computer 114 may include a display 202, a GPS unit 206, a communication unit 220, an accelerometer 224, one or more additional sensors (not shown), a user-input device (not shown), and/or, like the server 140, a controller 204, in some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation. Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108, In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internee-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring and evaluation methods 400-700, the controller 204 may further implement the autonomous operation monitoring application 236 to communicate with the server 140 to provide information regarding autonomous vehicle operation. This may include information regarding settings or configurations of autonomous operation features, data from the sensors 120 regarding the vehicle environment, data from the sensors 120 regarding the response of the vehicle 108 to its environment, communications sent or received using the communication component 122 or the communication unit 220, operating status of the autonomous vehicle operation application 232 and the autonomous communication application 234, or commands sent from the on-board computer 114 to the control components (not shown) to operate the vehicle 108. The information may be received and stored by the server 140 implementing the autonomous operation information monitoring application 141, and the server 140 may then determine the effectiveness of autonomous operation under various conditions by implementing the feature evaluation application 142 and the compatibility evaluation application 143. The effectiveness of autonomous operation features and the extent of their use may be further used to determine risk associated with operation of the autonomous vehicle by the server 140 implementing the risk assessment application 144.

In addition to connections to the sensors 120, the mobile device 110 or the on-board computer 114 may include additional sensors, such as the GPS unit 206 or the accelerometer 224, which may provide information regarding the vehicle 108 for autonomous operation and other purposes. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via, any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Exemplary Autonomous Vehicle Operation Method

Figure 3:
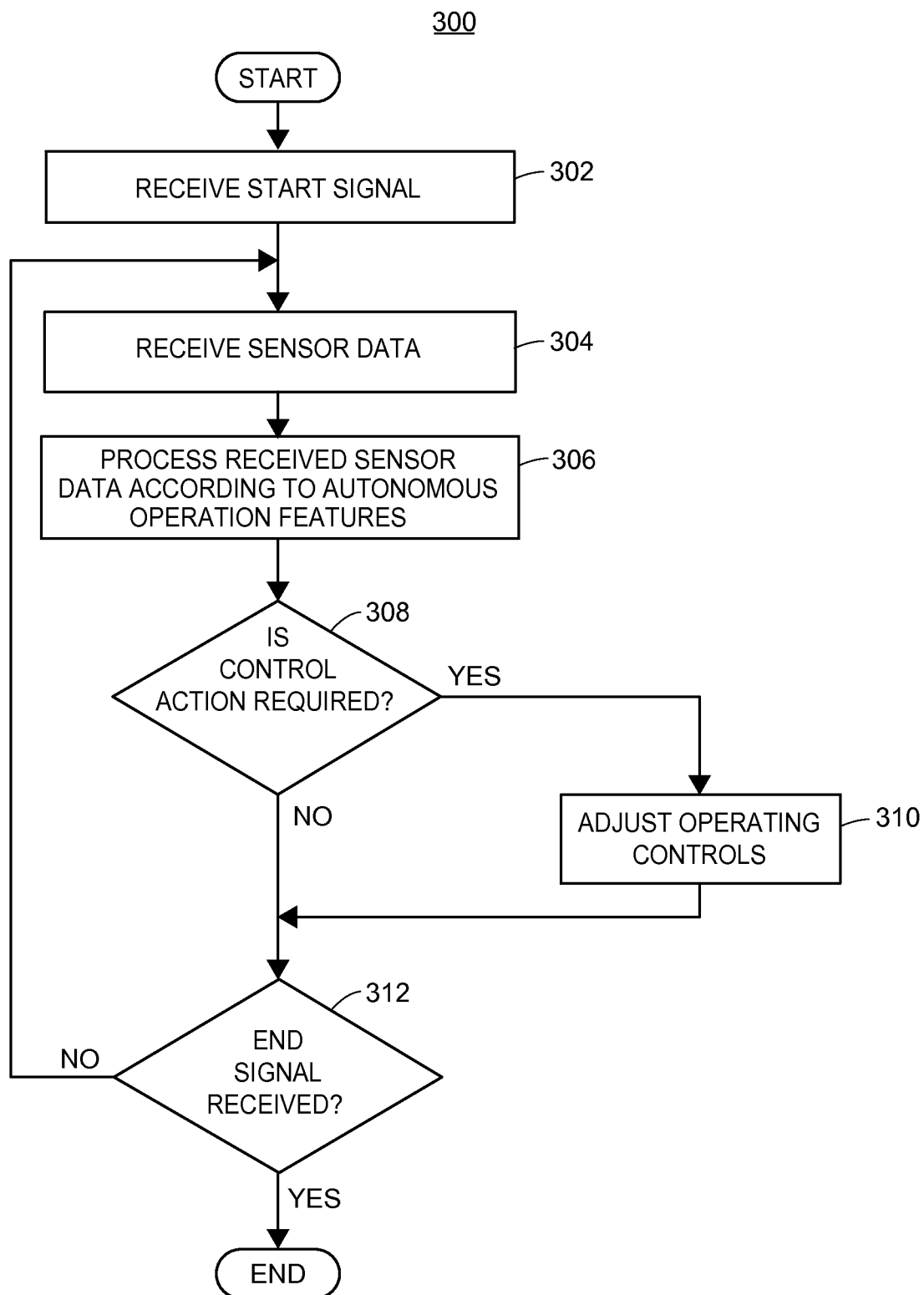
FIG. 3 illustrates a flow diagram of an exemplary autonomous vehicle operation method in accordance with the presently described embodiments.

FIG. 3 illustrates a flow diagram of an exemplary autonomous vehicle operation method 300, which may be implemented by the autonomous vehicle insurance system 100. The method 300 may begin at block 302 when the controller 204 receives a start signal. The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108. For other autonomous vehicles, the settings may include enabling or disabling particular autonomous operation features, specifying thresholds for autonomous operation, specifying warnings or other information to be presented to the vehicle operator, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle. In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle).

After receiving the start signal at block 302, the controller 204 receives sensor data from the sensors 120 during vehicle operation at block 304. In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data at block 306 in accordance with the autonomous operation features. The controller 204 may process the sensor data to determine whether an autonomous control action is required or to determine adjustments to the controls of the vehicle 108. For example, the controller 204 may receive sensor data indicating a decreasing distance to a nearby object in the vehicle's path and process the received sensor data to determine whether to begin braking (and, if so, how abruptly to slow the vehicle 108). As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may, determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

When the controller 204 determines an autonomous control action is required at block 308, the controller 204 may cause the control components of the vehicle 108 to adjust the operating controls of the vehicle to achieve desired operation at block 310. For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed further below, the controller 204 may also log or transmit the autonomous control actions to the server 140 via, the network 130 for analysis.

Figure 4:
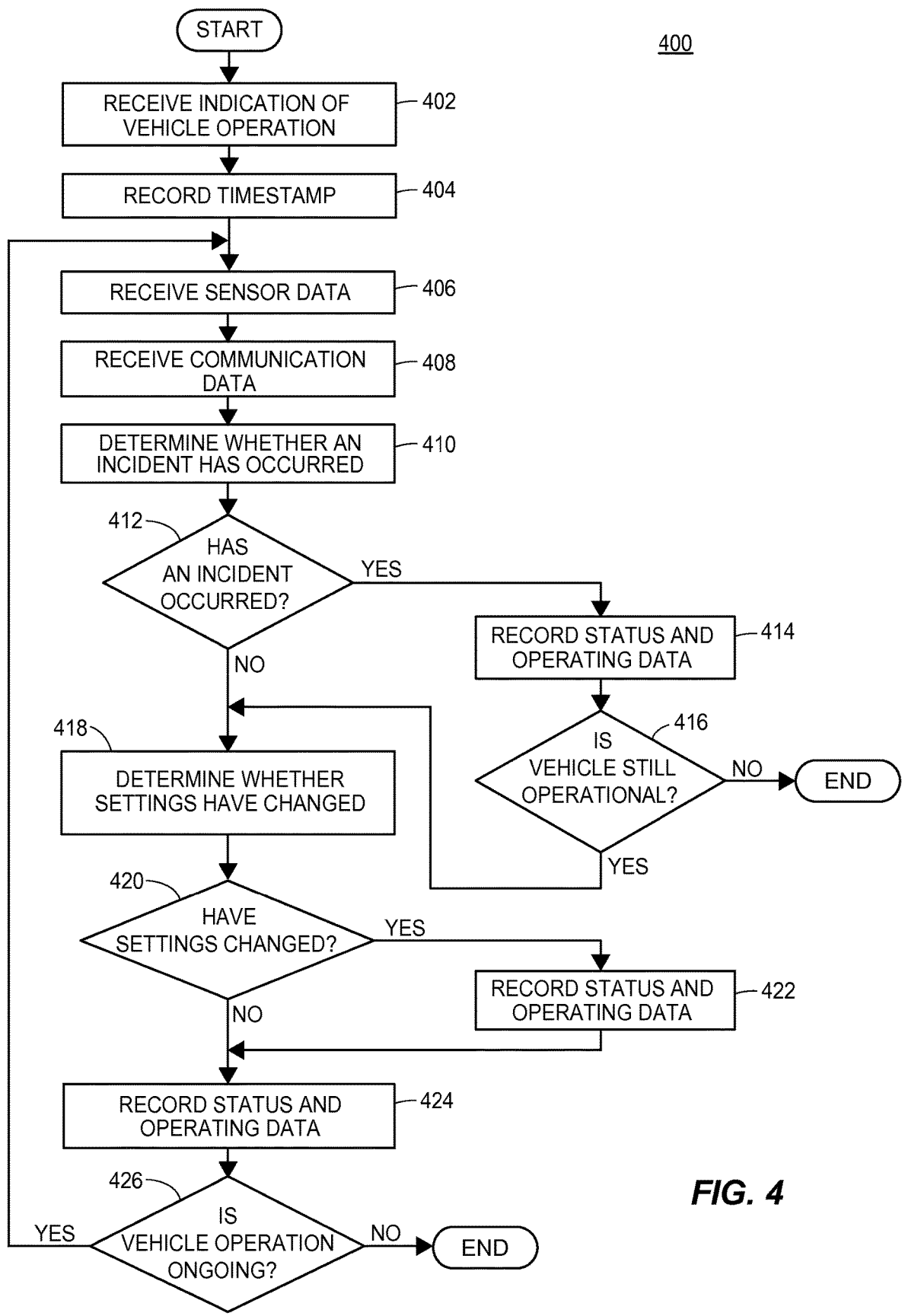
FIG. 4 illustrates a flow diagram of an exemplary autonomous vehicle operation monitoring method in accordance with the presently described embodiments.

The controller 204 may continue to receive and process sensor data at blocks 304 and 306 until an end signal is received by the controller 204 at block 312. The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the vehicle 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not be capable of resuming operation, the controller 204 may cause the vehicle to stop or take other appropriate action, Exemplary Monitoring Method FIG. 4 is a flow diagram depicting an exemplary autonomous vehicle operation monitoring method 400, which may be implemented by the autonomous vehicle insurance system 100. The method 400 monitors the operation of the vehicle 108 and transmits information regarding the vehicle 108 to the server 140, which information may then be used to determine autonomous operation feature effectiveness or usage rates to assess risk and price vehicle insurance policy premiums. The method 400 may be used both for testing autonomous operation features in a controlled environment of for determining feature use by an insured party. In alternative embodiments, the method 400 may be implemented whenever the vehicle 108 is in operation (manual or autonomous) or only when the autonomous operation features are enabled. The method 400 may likewise be implemented as either a real-time process, in which information regarding the vehicle 108 is communicated to the server 140 while monitoring is ongoing, or as a periodic process, in which the information is stored within the vehicle 108 and communicated to the server 140 at intervals (e.g., upon completion of a trip or when an incident occurs). In some embodiments, the method 400 may communicate with the server 140 in real-time when certain conditions exist (e.g., when a sufficient data connection through the network 130 exists or when no roaming charges would be incurred).

The method 400 may begin at block 402 when the controller 204 receives an indication of vehicle operation. The indication may be generated when the vehicle 108 is started or when an autonomous operation feature is enabled by the controller 204 or by input from the vehicle operator. In response to receiving the indication, the controller 204 may create a timestamp at block 404. The timestamp may include information regarding the date, time, location, vehicle environment, vehicle condition, and autonomous operation feature settings or configuration information. The date and time may be used to identify one vehicle trip or one period of autonomous operation feature use, in addition to indicating risk levels due to traffic or other factors. The additional location and environmental data may include information regarding the position of the vehicle 108 from the GPS unit 206 and its surrounding environment (e.g., road conditions, weather conditions, nearby traffic conditions, type of road, construction conditions, presence of pedestrians, presence of other obstacles, availability of autonomous communications from external sources, etc.). Vehicle condition information may include information regarding the type, make, and model of the vehicle 108, the age or mileage of the vehicle 108, the status of vehicle equipment (e.g., tire pressure, non-functioning lights, fluid levels, etc.), or other information relating to the vehicle 108. In some embodiments, the timestamp may be recorded on the client device 114, the mobile device 110, or the server 140.

The autonomous operation feature settings may correspond to information regarding the autonomous operation features, such as those described above with reference to the autonomous vehicle operation method 300. The autonomous operation feature configuration information may correspond to information regarding the number and type of the sensors 120, the disposition of the sensors 120 within the vehicle 108, the one or more autonomous operation features e.g., the autonomous vehicle operation application 232 or the software routines 240), autonomous operation feature control software, versions of the software applications 230 or routines 240 implementing the autonomous operation features, or other related information regarding the autonomous operation features. For example, the configuration information may include the make and model of the vehicle 108 (indicating installed sensors 120 and the type of on-board computer 114), an indication of a malfunctioning or obscured sensor 120 in part of the vehicle 108, information regarding additional after-market sensors 120 installed within the vehicle 108, a software program type and version for a control program installed as an application 230 on the on-board computer 114, and software program types and versions for each of a plurality of autonomous operation features installed as applications 230 or routines 240 in the program memory 208 of the on-board computer 114.

During operation, the sensors 120 may generate sensor data regarding the vehicle 108 and its environment. In some embodiments, one or more of the sensors 120 may preprocess the measurements and communicate the resulting processed data to the on-board computer 114. The controller 204 may receive sensor data from the sensors 120 at block 406. The sensor data may include information regarding the vehicle's position, speed, acceleration, direction, and responsiveness to controls. The sensor data may further include information regarding the location and movement of obstacles or obstructions (e.g., other vehicles, buildings, barriers, pedestrians, animals, trees, or gates), weather conditions (e.g., precipitation, wind, visibility, or temperature), road conditions (e.g., lane markings, potholes, road material, traction, or slope), signs or signals (e.g., traffic signals, construction signs, building signs or numbers, or control gates), or other information relating to the vehicle's environment.

In addition to receiving sensor data from the sensors 120, in some embodiments the controller 204 may receive autonomous communication data from the communication component 122 or the communication module 220 at block 408. The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), or other external sources e.g., map databases, weather databases, or traffic and accident databases).

At block 410, the controller 204 may process the sensor data, the communication data, and the settings or configuration information to determine whether an incident has occurred. Incidents may include collisions, hard braking, hard acceleration, evasive maneuvering, loss of traction, detection of objects within a threshold distance from the vehicle 108, alerts presented to the vehicle operator, component failure, inconsistent readings from sensors 120, or attempted unauthorized access to the on-board computer by external sources. When an incident is determined to have occurred at block 412, information regarding the incident and the vehicle status may be recorded at block 414, either in the data storage 228 or the database 146. The information recorded at block 414 may include sensor data, communication data, and settings or configuration information prior to, during, and immediately following the incident. The information may further include a determination of whether the vehicle 108 has continued operating (either autonomously or manually) or whether the vehicle 108 is capable of continuing to operate in compliance with applicable safety and legal requirements. If the controller 204 determines that the vehicle 108 has discontinued operation or is unable to continue operation at block 416, the method 400 may terminate. If the vehicle 108 continues operation, then the method 400 may continue at block 418.

In some embodiments, the controller 204 may further determine information regarding the likely cause of a collision or other incident. Alternatively, or additionally, the server 140 may receive information regarding an incident from the on-board computer 114 and determine relevant additional information regarding the incident from the sensor data. For example, the sensor data may be used to determine the points of impact on the vehicle 108 and another vehicle involved in a collision, the relative velocities of each vehicle, the road conditions at the time of the incident, and the likely cause or the party likely at fault. This information may be used to determine risk levels associated with autonomous vehicle operation, as described below, even where the incident is not reported to the insurer.

At block 418, the controller 204 may determine whether a change or adjustment to one or more of the settings or configuration of the autonomous operation features has occurred. Changes to the settings may include enabling or disabling an autonomous operation feature or adjusting the feature's parameters (e.g., resetting the speed on an adaptive cruise control feature). If the settings or configuration are determined to have changed, the new settings or configuration may be recorded at block 422, either in the data storage 228 or the database 146.

At block 424, the controller 204 may record the operating data relating to the vehicle 108 in the data storage 228 or communicate the operating data to the server 140 via the network 130 for recordation in the database 146. The operating data may include the settings or configuration information, the sensor data, and the communication data discussed above. In some embodiments, operating data related to normal autonomous operation of the vehicle 108 may be recorded. In other embodiments, only operating data related to incidents of interest may be recorded, and operating data related to normal operation may not be recorded. In still other embodiments, operating data may be stored in the data storage 228 until a sufficient connection to the network 130 is established, but some or all types of incident information may be transmitted to the server 140 using any available connection via the network 130.

At block 426, the controller 204 may determine whether the vehicle 108 is continuing to operate. In some embodiments, the method 400 may terminate when all autonomous operation features are disabled, in which case the controller 204 may determine whether any autonomous operation features remain enabled at block 426. When the vehicle 108 is determined to be operating (or operating with at least one autonomous operation feature enabled) at block 426, the method 400 may continue through blocks 406-426 until vehicle operation has ended. When the vehicle 108 is determined to have ceased operating (or is operating without autonomous operation features enabled) at block 426, the controller 204 may record the completion of operation at block 428, either in the data storage 228 or the database 146. In some embodiments, a second timestamp corresponding to the completion of vehicle operation may likewise be recorded, as above.

Exemplary Evaluation Methods

Figure 5:
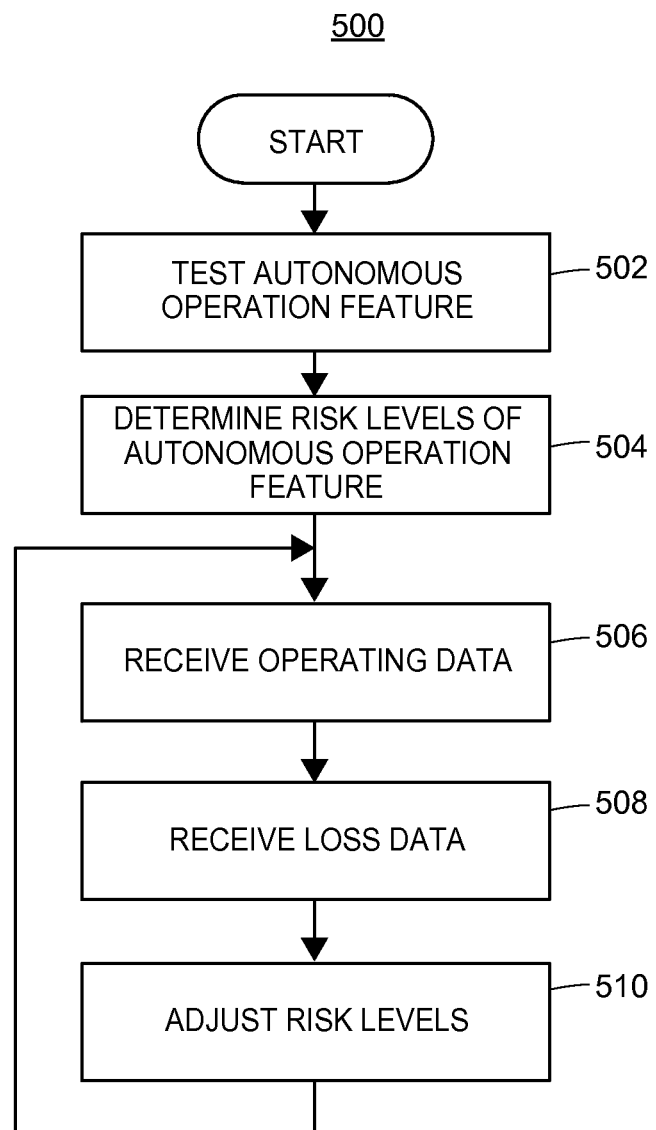
FIG. 5 illustrates a flow diagram of an exemplary autonomous operation feature evaluation method for determining the effectiveness of autonomous operation features in accordance with the presently described embodiments.

FIG. 5 illustrates a flow diagram of an exemplary autonomous operation feature evaluation method 500 for determining the effectiveness of autonomous operation features, which may be implemented by the autonomous vehicle insurance system 100. The method 500 begins by monitoring and recording the responses of an autonomous operation feature in a test environment at block 502. The test results are then used to determine a plurality of risk levels for the autonomous operation feature corresponding to the effectiveness of the feature in situations involving various conditions, configurations, and settings at block 504. Once a baseline risk profile of the plurality of risk levels has been established at block 504, the method 500 may refine or adjust the risk levels based upon operating data and actual losses for insured autonomous vehicles operation outside the test environment in blocks 506-510. Although FIG. 5 shows the method for only one autonomous operation feature, it should be understood that the method 500 may be performed to evaluate each of any number of autonomous operation features or combinations of autonomous operation features. In some embodiments, the method 500 may be implemented for a plurality of autonomous operation features concurrently on multiple servers 140 or at different times on one or more servers 140.

At block 502, the effectiveness of an autonomous operation feature is tested in a controlled testing environment by presenting test conditions and recording the responses of the feature. The testing environment may include a physical environment in which the autonomous operation feature is tested in one or more vehicles 108. Additionally, or alternatively, the testing environment may include a virtual environment implemented on the server 140 or another computer system in which the responses of the autonomous operation feature are simulated. Physical or virtual testing may be performed for a plurality of vehicles 108 and sensors 120 or sensor configurations, as well as for multiple settings of the autonomous operation feature. In some embodiments, the compatibility or incompatibility of the autonomous operation feature with vehicles 108, sensors 120, communication units 122, on-board computers 114, control software, or other autonomous operation features may be tested by observing and recording the results of a plurality of combinations of these with the autonomous operation feature. For example, an autonomous operation feature may perform well in congested city traffic conditions, but that will be of little use if it is installed in an automobile with control software that operates only above 30 miles per hour. Additionally, some embodiments may further test the response of autonomous operation features or control software to attempts at unauthorized access (e.g., computer hacking attempts), which results may be used to determine the stability or reliability of the autonomous operation feature or control software.

The test results may be recorded by the server 140. The test results may include responses of the autonomous operation feature to the test conditions, along with configuration and setting data, which may be received by the on-board computer 114 and communicated to the server 140. During testing, the on-board computer 114 may be a special-purpose computer or a general-purpose computer configured for generating or receiving information relating to the responses of the autonomous operation feature to test scenarios. In some embodiments, additional sensors may be installed within the vehicle 108 or in the vehicle environment to provide additional information regarding the response of the autonomous operation feature to the test conditions, which additional sensors may not provide sensor data to the autonomous operation feature.

In some embodiments, new versions of previously tested autonomous operation features may not be separately tested, in which case the block 502 may not be present in the method 500. In such embodiments, the server 140 may determine the risk levels associated with the new version by reference to the risk profile of the previous version of the autonomous operation feature in block 504, which may be adjusted based upon actual losses and operating data in blocks 506-510. In other embodiments, each version of the autonomous operation feature may be separately tested, either physically or virtually. Alternatively, or additionally, a limited test of the new version of the autonomous operation feature may be performed and compared to the test results of the previous version, such that additional testing may not be performed when the limited test results of the new version are within a predetermined range based upon the test results of the previous version.

Figure 6:
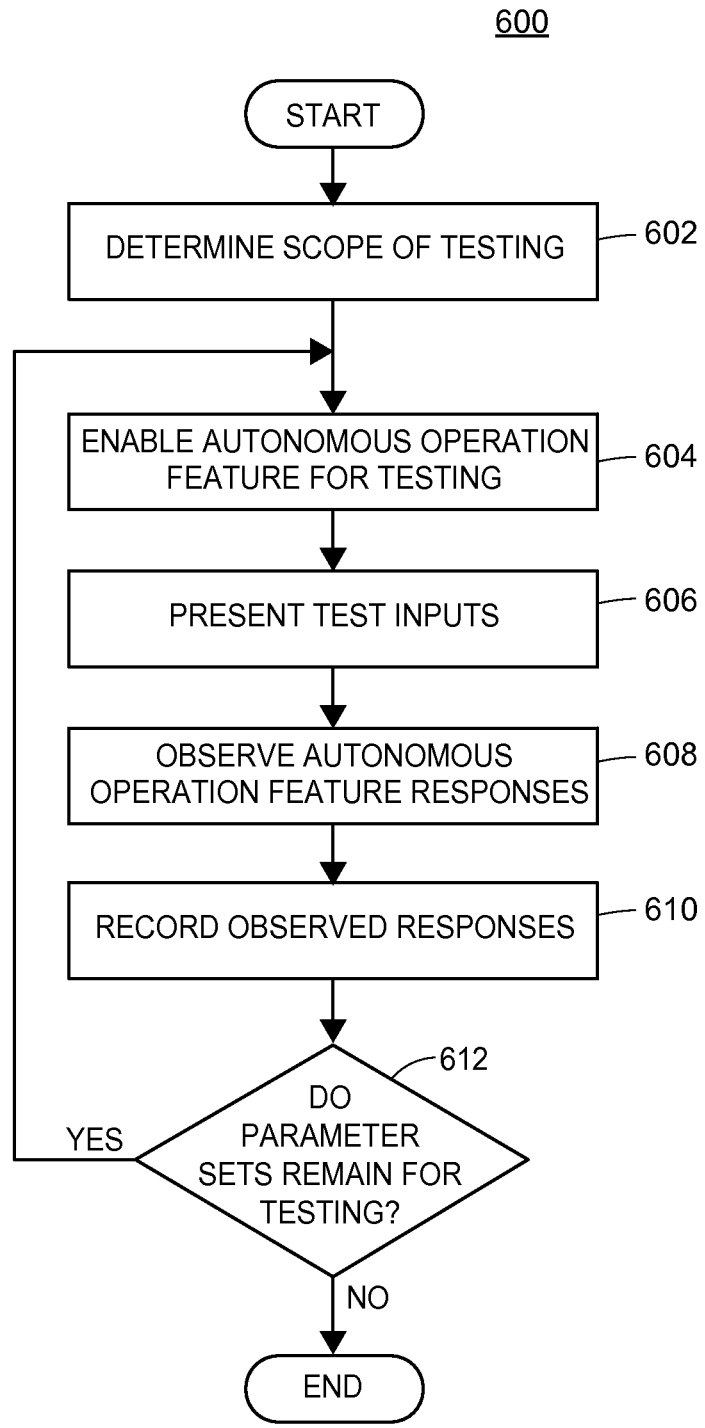
FIG. 6 illustrates a flow diagram of an exemplary autonomous operation feature testing method for presenting test conditions to an autonomous operation feature and observing and recording responses to the test conditions in accordance with the presently described embodiments.

FIG. 6 illustrates a flow diagram of an exemplary autonomous operation feature testing method 600 for presenting test conditions to an autonomous operation feature and observing and recording responses to the test conditions in accordance with the method 500. Although the method 600 is illustrated for one autonomous operation feature, it should be understood that the exemplary method 600 may be performed to test any number of features or combinations of features. At block 602, the server 140 may determine the scope of the testing based upon the autonomous operation feature and the availability of test results for related or similar autonomous operation features (e.g., previous versions of the feature). The scope of the testing may include parameters such as configurations, settings, vehicles 108, sensors 120, communication units 122, on-board computers 114, control software, other autonomous operation features, or combinations of these parameters to be tested.

At block 604, the autonomous operation feature is enabled within a test system with a set of parameters determined in block 602. The test system may be a vehicle 108 or a computer simulation, as discussed above. The autonomous operation feature or the test system may be configured to provide the desired parameter inputs to the autonomous operation feature. For example, the controller 204 may disable a number of sensors 120 or may provide only a subset of available sensor data to the autonomous operation feature for the purpose of testing the feature's response to certain parameters.

At block 606, test inputs are presented to the autonomous operation feature, and responses of the autonomous operation feature are observed at block 608. The test inputs may include simulated data presented by the on-board computer 114 or sensor data from the sensors 120 within the vehicle 108. In some embodiments, the vehicle 108 may be controlled within a physical test environment by the on-board computer 114 to present desired test inputs through the sensors 120. For example, the on-board computer 114 may control the vehicle 108 to maneuver near obstructions or obstacles, accelerate, or change directions to trigger responses from the autonomous operation feature. The test inputs may also include variations in the environmental conditions of the vehicle 108, such as by simulating weather conditions that may affect the performance of the autonomous operation feature e.g., snow or ice cover on a roadway, rain, or gusting crosswinds, etc.).

In some embodiments, additional vehicles may be used to test the responses of the autonomous operation feature to moving obstacles. These additional vehicles may likewise be controlled by on-board computers or remotely by the server 140 through the network 130. In some embodiments, the additional vehicles may transmit autonomous communication information to the vehicle 108, which may be received by the communication component 122 or the communication unit 220 and presented to the autonomous operation feature by the (in-board computer 114. Thus, the response of the autonomous operation feature may be tested with and without autonomous communications from external sources. The responses of the autonomous operation feature may be observed as output signals from the autonomous operation feature to the on-board computer 114 or the vehicle controls. Additionally, or alternatively, the responses may be observed by sensor data from the sensors 120 and additional sensors within the vehicle 108 or placed within the vehicle environment.

At block 610, the observed responses of the autonomous operation feature are recorded for use in determining effectiveness of the feature. The responses may be recorded in the data storage 228 of the on-board computer 114 or in the database 146 of the server 140. If the responses are stored on the on-board computer 114 during testing, the results may be communicated to the server 140 via the network either during or after completion of testing.

At block 612, the on-board computer 114 or the server 140 may determine whether the additional sets of parameters remain for which the autonomous operation feature is to be tested, as determined in block 602. When additional parameter sets are determined to remain at block 612, they are separately tested according to blocks 604-610. When no additional parameter sets are determined to exist at block 612, the method 600 terminates.

Referring again to FIG. 5, the server 140 may determine a baseline risk profile for the autonomous operation feature from the recorded test results at block 504, including a plurality of risk levels corresponding to a plurality of sets of parameters such as configurations, settings, vehicles 108, sensors 120, communication units 122, on-board computers 114, control software, other autonomous operation features, or combinations of these. The server 140 may determine the risk levels associated with the autonomous operation feature by implementing the feature evaluation application 142 to determine the effectiveness of the feature. In some embodiments, the server 140 may further implement the compatibility evaluation application 143 to determine the effectiveness of combinations of features based upon test results and other information. Additionally, or alternatively, in some embodiments, the baseline risk profile may not depend upon the type, make, model, year, or other aspect of the vehicle 108, In such embodiments, the baseline risk profile and adjusted risk profiles may correspond to the effectiveness or risk levels associated with the autonomous operation features across a range of vehicles, disregarding any variations in effectiveness or risk levels associated with operation of the features in different vehicles.

Figure 7:
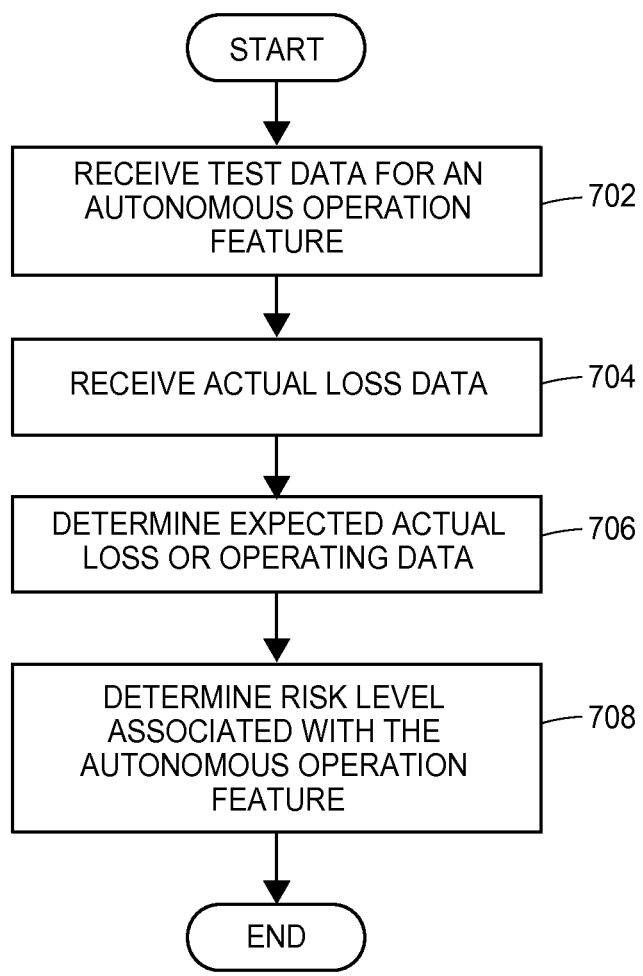
FIG. 7 illustrates a flow diagram of an exemplary autonomous feature evaluation method for determining the effectiveness of an autonomous operation feature under a set of environmental conditions, configuration conditions, and settings in accordance with the presently described embodiments.

FIG. 7 illustrates a flow diagram of an exemplary autonomous feature evaluation method 700 for determining the effectiveness of an autonomous operation feature under a set of environmental conditions, configuration conditions, and settings. Although the method 700 shows determination of a risk level associated with an autonomous operation feature within one set of parameters, it should be understood that the method 700 may be implemented for any number of sets of parameters for any number of autonomous features or combinations thereof.

At block 702, the server 140 receives the test result data observed and recorded in block 502 for the autonomous operation feature in conjunction with a set of parameters. In some embodiments, the rest result data may be received from the on-board computer 114 or from the database 146. In addition, in some embodiments, the server 140 may receive reference data for other autonomous operation features in use on insured autonomous vehicles at block 704, such as test result data and corresponding actual loss or operating data for the other autonomous operation features. The reference data received at block 704 may be limited to data for other autonomous operation features having sufficient similarity to the autonomous operation feature being evaluated, such as those performing a similar function, those with similar test result data, or those meeting a minimum threshold level of actual loss or operating data.

Using the test result data received at block 702 and the reference data received at block 704, the server 140 determines the expected actual loss or operating data for the autonomous operation feature at block 706. The server 140 may determine the expected actual loss or operating data using known techniques, such as regression analysis or machine learning tools (e.g., neural network algorithms or support vector machines). The expected actual loss or operating data, may be determined using any useful metrics, such as expected loss value, expected probabilities of a plurality of collisions or other incidents, expected collisions per unit time or distance traveled by the vehicle, etc.

At block 708, the server 140 may further determine a risk level associated with the autonomous operation feature in conjunction with the set of parameters received in block 702. The risk level may be a metric indicating the risk of collision, malfunction, or other incident leading to a loss or claim against a vehicle insurance policy covering a vehicle in which the autonomous operation feature is functioning. The risk level may be defined in various alternative ways, including as a probability of loss per unit time or distance traveled, a percentage of collisions avoided, or a score on a fixed scale. In a preferred embodiment, the risk level is defined as an effectiveness rating score such that a higher score corresponds to a lower risk of loss associated with the autonomous operation feature.

Referring again to FIG. 5, the method 700 may be implemented for each relevant combination of an autonomous operation feature in conjunction with a set of parameters relating to environmental conditions, configuration conditions, and settings. It may be beneficial in some embodiments to align the expected losses or operating data metrics with loss categories for vehicle insurance policies. Once the baseline risk profile is determined for the autonomous operation feature, the plurality of risk levels in the risk profile may be updated or adjusted in blocks 506-510 using actual loss and operating data from autonomous vehicles operating in the ordinary course, viz. not in a test environment.

At block 506, the server 140 may receive operating data from one or more vehicles 108 via the network 130 regarding operation of the autonomous operation feature. The operating data may include the operating data discussed above with respect to monitoring method 400, including information regarding the vehicle 108 the vehicle's environment, the sensors 120, communications for external sources, the type and version of the autonomous operation feature, the operation of the feature, the configuration and settings relating to the operation of the feature, the operation of other autonomous operation features, control actions performed by the vehicle operator, or the location and time of operation. The operating data may be received by the server 140 from the on-board computer 114 or the mobile device 110 implementing the monitoring method 400 or from other sources, and the server 140 may receive the operating data either periodically or continually.

At block 508, the server 140 may receive data regarding actual losses on autonomous vehicles that included the autonomous operation feature. This information may include claims filed pursuant to insurance policies, claims paid pursuant to insurance policies, accident reports filed with government agencies, or data from the sensors 120 regarding incidents (e.g., collisions, alerts presented, etc.). This actual loss information may further include details such as date, time, location, traffic conditions, weather conditions, road conditions, vehicle speed, vehicle heading, vehicle operating status, autonomous operation feature configuration and settings, autonomous communications transmitted or received, points of contact in a collision, velocity and movements of other vehicles, or additional information relevant to determining the circumstances involved in the actual loss.

At block 510, the server 140 may process the information received at blocks 506 and 508 to determine adjustments to the risk levels determined at block 504 based upon actual loss and operating data for the autonomous operation feature. Adjustments may be necessary because of factors such as sensor failure, interference disrupting autonomous communication, better or worse than expected performance in heavy traffic conditions, etc. The adjustments to the risk levels may be made by methods similar to those used to determine the baseline risk profile for the autonomous operation feature or by other known methods (e.g., Bayesian updating algorithms). The updating procedure of blocks 506-510 may be repeatedly implemented periodically or continually as new data become available to refine and update the risk levels or risk profile associated with the autonomous operation feature. In subsequent iterations, the most recently updated risk profile or risk levels may be adjusted, rather than the initial baseline risk profile or risk levels determined in block 504.

Exemplary Autonomous Vehicle Insurance Risk and Price Determination Methods

Figure 8:
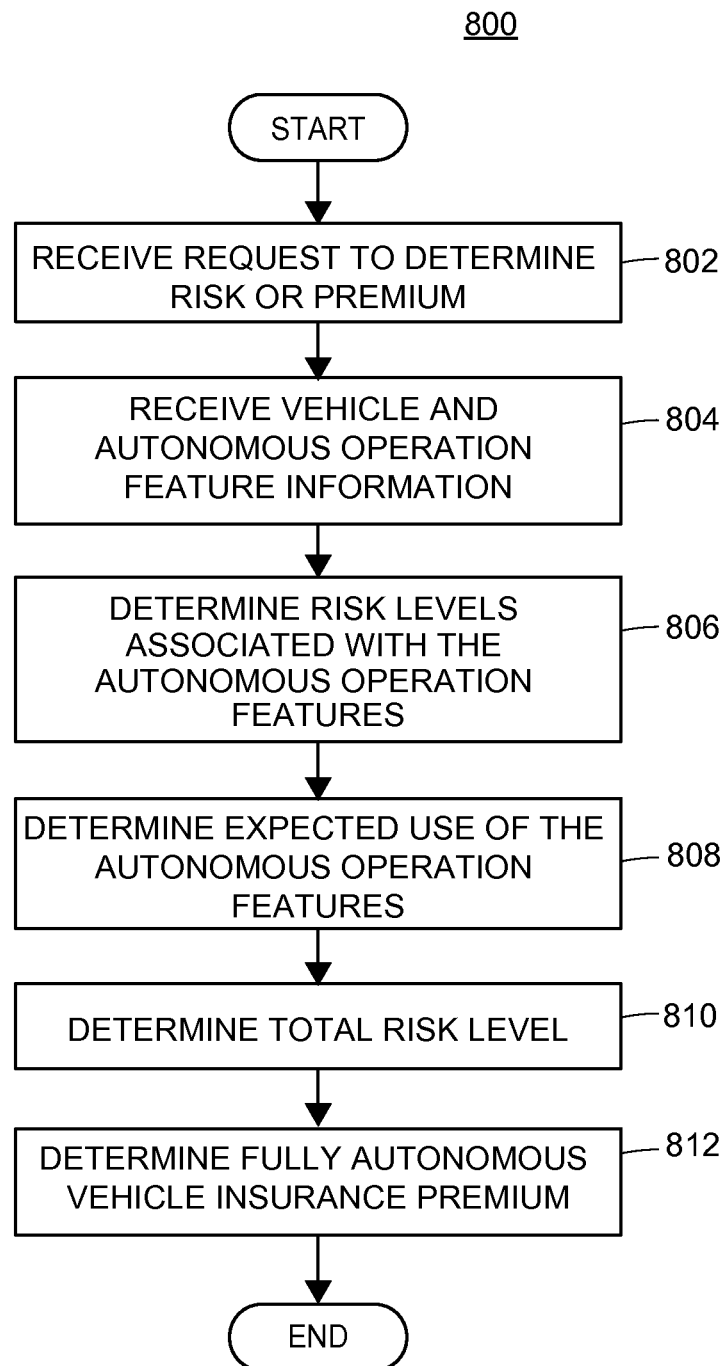
FIG. 8 illustrates a flow diagram depicting an exemplary embodiment of a fully autonomous vehicle insurance pricing method in accordance with the presently described embodiments.
Figure 9:
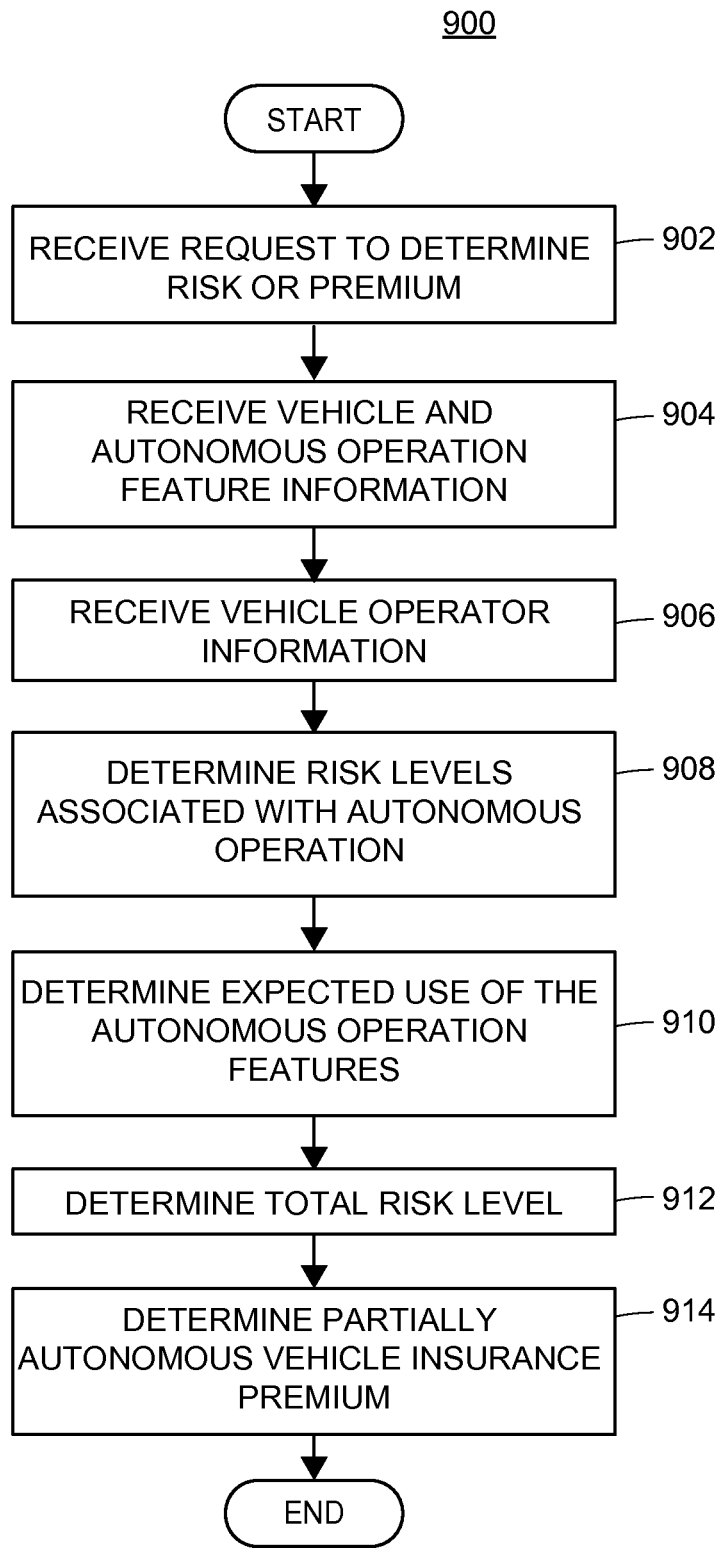
FIG. 9 illustrates a flow diagram depicting an exemplary embodiment of a partially autonomous vehicle insurance pricing method in accordance with the presently described embodiments.
Figure 10:
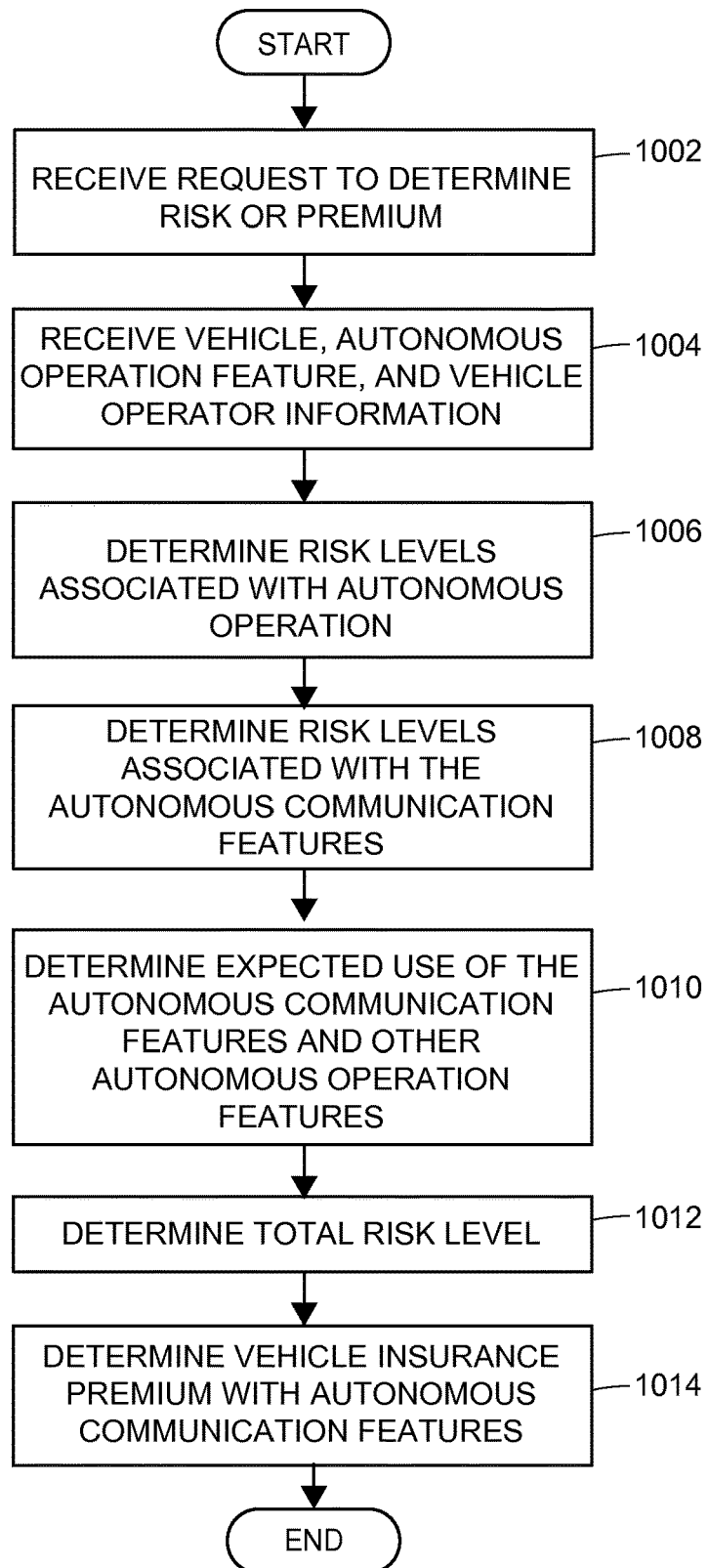
FIG. 10 illustrates a flow diagram depicting an exemplary embodiment of an autonomous vehicle insurance pricing method for determining risk and premiums for vehicle insurance policies covering autonomous vehicles with autonomous communication features in accordance with the presently described embodiments.

The risk profiles or risk levels associated with one or more autonomous operation features determined above may be further used to determine risk categories or premiums for vehicle insurance policies covering autonomous vehicles. FIGS. 8-10 illustrate flow diagrams of exemplary embodiments of methods for determining risk associated with an autonomous vehicle or premiums for vehicle insurance policies covering an autonomous vehicle. In some embodiments or under some conditions, the autonomous vehicle may be a fully autonomous vehicle operating without a vehicle operator's input or presence. In other embodiments or under other conditions, the vehicle operator may control the vehicle with or without the assistance of the vehicle's autonomous operation features. For example, the vehicle may be fully autonomous only above a minimum speed threshold or may require the vehicle operator to control the vehicle during periods of heavy precipitation. Alternatively, the autonomous vehicle may perform all relevant control functions using the autonomous operation features wider all ordinary operating conditions. In still further embodiments, the vehicle 108 may operate in either a fully or a partially autonomous state, while receiving or transmitting autonomous communications.

Where the vehicle 108 operates only under fully autonomous control by the autonomous operation features under ordinary operating conditions or where control by a vehicle operator may be disregarded for insurance risk and price determination, the method 800 may be implemented to determine the risk level or premium associated with an insurance policy covering the autonomous vehicle. Where the vehicle 108 may be operated manually under some conditions, the method 900 may be implemented to determine the risk level or premium associated with an insurance policy covering the autonomous vehicle, including a determination of the risks associated with the vehicle operator performing manual vehicle operation. Where the vehicle 108 may be operated with the assistance of autonomous communications features, the method 1000 may be implemented to determine the risk level or premium associated with an insurance policy covering the autonomous vehicle, including a determination of the expected use of autonomous communication features by external sources in the relevant environment of the vehicle 108 during operation of the vehicle 108.

FIG. 8 illustrates a flow diagram depicting an exemplary embodiment of a fully autonomous vehicle insurance pricing method 800, which may be implemented by the autonomous vehicle insurance system 100. The method 800 may be implemented by the server 140 to determine a risk level or price for a vehicle insurance policy covering a fully autonomous vehicle based upon the risk profiles of the autonomous operation features in the vehicle. It is important to note that the risk category or price is determined without reference to factors relating to risks associated with a vehicle operator (e.g., age, experience, prior history of vehicle operation). Instead, the risk and price may be determined based upon the vehicle 108, the location and use of the vehicle 108, and the autonomous operation features of the vehicle 108.

At block 802, the server 140 receives a request to determine a risk category or premium associated with a vehicle insurance policy for a fully autonomous vehicle. The request may be caused by a vehicle operator or other customer or potential customer of an insurer, or by an insurance broker or agent. The request may also be generated automatically (e.g., periodically for repricing or renewal of an existing vehicle insurance policy). In some instances, the server 140 may generate the request upon the occurrence of specified conditions.

At block 804, the server 140 receives information regarding the vehicle 108, the autonomous operation features installed within the vehicle 108, and anticipated or past use of the vehicle 108. The information may include vehicle information (e.g., type, make, model, year of production, safety features, modifications, installed sensors, on-board computer information, etc.), autonomous operation features (e.g., type, version, connected sensors, compatibility information, etc.), and use information (e.g., primary storage location, primary use, primary operating time, past use as monitored by an on-board computer or mobile device, past use of one or more vehicle operators of other vehicles, etc.), The information may be provided by a person having an interest in the vehicle, a customer, or a vehicle operator, and/or the information may be provided in response to a request for the information by the server 140. Alternatively, or additionally, the server 140 may request or receive the information from one or more databases communicatively connected to the server 140 through the network 130, which may include databases maintained by third parties (e.g., vehicle manufacturers or autonomous operation feature manufacturers). In some embodiments, information regarding the vehicle 108 may be excluded, in which case the risk or premium determinations below may likewise exclude the information regarding the vehicle 108.

At block 806, the server 140 may determine the risk profile or risk levels associated with the vehicle 108 based upon the vehicle information and the autonomous operation feature information received at block 804. The risk levels associated with the vehicle 108 may be determined as discussed above with respect to the method 500 and/or may be determined by looking up in a database the risk level information previously determined. In some embodiments, the information regarding the vehicle may be given little or no weight in determining the risk levels. In other embodiments, the risk levels may be determined based upon a combination of the vehicle information and the autonomous operation information. As with the risk levels associated with the autonomous operation features discussed above, the risk levels associated with the vehicle may correspond to the expected losses or incidents for the vehicle based upon its autonomous operation features, configuration, settings, and/or environmental conditions of operation. For example, a vehicle may have a risk level of 98% effectiveness when on highways during fair weather days and a risk level of 87% effectiveness when operating on city streets at night in moderate rain. A plurality of risk levels associated with the vehicle may be combined with estimates of anticipated vehicle use conditions to determine the total risk associated with the vehicle.

At block 808, the server 140 may determine the expected use of the vehicle 108 in the relevant conditions or with the relevant settings to facilitate determining a total risk for the vehicle 108. The server 140 may determine expected vehicle use based upon the use information received at block 804, which may include a history of prior use recorded by the vehicle 108 and/or another vehicle. For example, recorded vehicle use information may indicate that 80% of vehicle use occurs during weekday rush hours in or near a large city, that 20% occurs on nights and weekends. From this information, the server 140 may determine that 80% (75%, 90%, etc.) of the expected use of the vehicle 108 is in heavy traffic and that 20% (25%, 10%, etc.) is in light traffic. The server 140 may further determine that vehicle use is expected to be 60% on limited access highways and 40% on surface streets. Based upon the vehicle's typical storage location, the server 140 may access weather data for the location to determine expected weather conditions during the relevant times. For example, the server 140 may determine that 20% of the vehicle's operation on surface streets in heavy traffic will occur in rain or snow. In a similar manner, the server 140 may determine a plurality of sets of expected vehicle use parameters corresponding to the conditions of use of the vehicle 108. These conditions may further correspond to situations in which different autonomous operation features may be engaged and/or may be controlling the vehicle. Additionally, or alternatively, the vehicle use parameters may correspond to different risk levels associated with the autonomous operation features. In some embodiments, the expected vehicle use parameters may be matched to the most relevant vehicle risk level parameters, viz. the parameters corresponding to vehicle risk levels that have the greatest predictive effect and/or explanatory power.

At block 810, the server 140 may use the risk levels determined at block 806 and the expected vehicle use levels determined at block 808 to determine a total expected risk level. To this end, it may be advantageous to attempt to match the vehicle use parameters as closely as possible to the vehicle risk level parameters. For example, the server 140 may determine the risk level associated with each of a plurality of sets of expected vehicle use parameters. In some embodiments, sets of vehicle use parameters corresponding to zero or negligible (e.g., below a predetermined threshold probability) expected use levels may be excluded from the determination for computational efficiency. The server 140 may then weight the risk levels by the corresponding expected vehicle use levels, and aggregate the weighted risk levels to obtain a total risk level for the vehicle 108. In some embodiments, the aggregated weighted risk levels may be adjusted or normalized to obtain the total risk level for the vehicle 108. In some embodiments, the total risk level may correspond to a regulatory risk category or class of a relevant insurance regulator.

At block 812, the server 140 may determine one or more premiums for vehicle insurance policies covering the vehicle 108 based upon the total risk level determined at block 810. These policy premiums may also be determine based upon additional factors, such as coverage type and/or amount, expected cost to repair or replace the vehicle 108, expected cost per claim for liability in the locations where the vehicle 108 is typically used, discounts for other insurance coverage with the same insurer, and/or other factors unrelated to the vehicle operator. In some embodiments, the server 140 may further communicate the one or more policy premiums to a customer, broker, agent, or other requesting person or organization via the network 130. The server 140 may further store the one or more premiums in the database 146.

FIG. 9 illustrates a flow diagram depicting an exemplary embodiment of a partially autonomous vehicle insurance pricing method 900, which may be implemented by the autonomous vehicle insurance system 100 in a manner similar to that of the method 800. The method 900 may be implemented by the server 140 to determine a risk category and/or price for a vehicle insurance policy covering an autonomous vehicle based upon the risk profiles of the autonomous operation features in the vehicle and/or the expected use of the autonomous operation features. In addition to information regarding the vehicle 108 and the autonomous operation features, the method 900 includes information regarding the vehicle operator, including information regarding the expected use of the autonomous operation features and/or the expected settings of the features under various conditions. Such additional information is relevant where the vehicle operator may control the vehicle 108 under some conditions and/or may determine settings affecting the effectiveness of the autonomous operation features.

At block 902, the server 140 may receive a request to determine a risk category and/or premium associated with a vehicle insurance policy for an autonomous Vehicle in a manner similar to block 802 described above. At block 904, the server 140 likewise receives information regarding the vehicle 108, the autonomous operation features installed within the vehicle 108, and/or anticipated or past use of the vehicle 108. The information regarding anticipated or past use of the vehicle 108 may include information regarding past use of one or more autonomous operation features, and/or settings associated with use of the features. For example, this may include times, road conditions, and/or weather conditions when autonomous operation features have been used, as well as similar information for past vehicle operation when the features have been disabled. In some embodiments, information regarding the vehicle 108 may be excluded, in which case the risk or premium determinations below may likewise exclude the information regarding the vehicle 108. At block 906, the server 140 may receive information related to the vehicle operator, including standard information of a type typically used in actuarial analysis of vehicle operator risk (e.g., age, location, years of vehicle operation experience, and/or vehicle operating history of the vehicle operator).

At block 908, the server 140 may determine the risk profile or risk levels associated with the vehicle 108 based upon the vehicle information and the autonomous operation feature information received at block 904. The risk levels associated with the vehicle 108 may be determined as discussed above with respect to the method 500 and/or as further discussed with respect to method 800.

At block 910, the server 140 may determine the expected manual and/or autonomous use of the vehicle 108 in the relevant conditions and/or with the relevant settings to facilitate determining a total risk for the vehicle 108. The server 140 may determine expected vehicle use based upon the use information received at block 904, which may include a history of prior use recorded by the vehicle 108 and/or another vehicle for the vehicle operator. Expected manual and autonomous use of the vehicle 108 may be determined in a manner similar to that discussed above with respect to method 800, but including an additional determination of the likelihood of autonomous and/or manual operation by the vehicle operation under the various conditions. For example, the server 140 may determine based upon past operating data that the vehicle operator manually controls the vehicle 108 when on a limited-access highway only 20% of the time in all relevant environments, but the same vehicle operator controls the vehicle 60% of the time on surface streets outside of weekday rush hours and 35% of the time on surface streets during weekday rush hours. These determinations may be used to further determine the total risk associated with both manual and/or autonomous vehicle operation.

At block 912, the server 140 may use the risk levels determined at block 908 and the expected vehicle use levels determined at block 910 to determine a total expected risk level, including both manual and autonomous operation of the vehicle 108. The autonomous operation risk levels may be determined as above with respect to block 810. The manual operation risk levels may be determined in a similar manner, but the manual operation risk may include risk factors related to the vehicle operator. In some embodiments, the manual operation risk may also be determined based upon vehicle use parameters and/or related autonomous operation feature risk levels for features that assist the vehicle operator in safely controlling the vehicle. Such features may include alerts, warnings, automatic braking for collision avoidance, and/or similar features that may provide information to the vehicle operator or take control of the vehicle from the vehicle operator under some conditions. These autonomous operation features may likewise be associated with different risk levels that depend upon settings selected by the vehicle operator. Once the risk levels associated with autonomous operation and manual operation under various parameter sets that have been weighted by the expected use levels, the total risk level for the vehicle and operator may be determined by aggregating the weighted risk levels. As above, the total risk level may be adjusted or normalized, and/or it may be used to determine a risk category or risk class in accordance with regulatory requirements.

At block 914, the server 140 may determine one or more premiums for vehicle insurance policies covering the vehicle 108 based upon the total risk level determined at block 812. As in method 800, additional factors may be included in the determination of the policy premiums, and/or the premiums may be adjusted based upon additional factors. The server 140 may further record the premiums or may transmit one or more of the policy premiums to relevant parties.

FIG. 10 illustrates a flow diagram depicting an exemplary embodiment of an autonomous vehicle insurance pricing method 1000 for determining risk and/or premiums for vehicle insurance policies covering autonomous vehicles with autonomous communication features, which may be implemented by the autonomous vehicle insurance system 100, The method 1000 may determine risk levels as without autonomous communication discussed above with reference to methods 800 and/or 900, then adjust the risk levels based upon the availability and effectiveness of communications between the vehicle 108 and external sources. Similar to environmental conditions, the availability of external sources such as other autonomous vehicles for communication with the vehicle 108 affects the risk levels associated with the vehicle 108. For example, use of an autonomous communication feature may significantly reduce risk associated with autonomous operation of the vehicle 108 only where other autonomous vehicles also use autonomous communication features to send and/or receive information.

At block 1002, the server 140 may receive a request to determine a risk category or premium associated with a vehicle insurance policy for an autonomous vehicle with one or more autonomous communication features in a manner similar to blocks 802 and/or 902 described above. At block 1004, the server 140 likewise receives information regarding the vehicle 108, the autonomous operation features installed within the vehicle 108 (including autonomous communication features), the vehicle operator, and/or anticipated or past use of the vehicle 108. The information regarding anticipated or past use of the vehicle 108 may include information regarding locations and times of past use, as well as past use of one or more autonomous communication features. For example, this may include locations, times, and/or details of communication exchanged by an autonomous communication feature, as well as information regarding past vehicle operation when no autonomous communication occurred. This information may be used to determine the past availability of external sources for autonomous communication with the vehicle 108, facilitating determination of expected future availability of autonomous communication as described below. In some embodiments, information regarding the vehicle 108 may be excluded, in which case the risk or premium determinations below may likewise exclude the information regarding the vehicle 108.

At block 1006, the server 140 may determine the risk profile or risk levels associated with the vehicle 108 based upon the vehicle information, the autonomous operation feature information, and/or the vehicle operator information received at block 1004. The risk levels associated with the vehicle 108 may be determined as discussed above with respect to the method 500 and as further discussed with respect to methods 800 and 900. At block 1008, the server 140 may determine the risk profile and/or risk levels associated with the vehicle 108 and/or the autonomous communication features. This may include a plurality of risk levels associated with a plurality of autonomous communication levels and/or other parameters relating to the vehicle 108, the vehicle operator, the autonomous operation features, the configuration and/or setting of the autonomous operation features, and/or the vehicle's environment. The autonomous communication levels may include information regarding the proportion of vehicles in the vehicle's environment that are in autonomous communication with the vehicle 108, levels of communication with infrastructure, types of communication (e.g., hard braking alerts, full velocity information, etc.), and/or other information relating to the frequency and/or quality of autonomous communications between the autonomous communication feature and the external sources.

At block 1010, the server 140 may then determine the expected use levels of the vehicle 108 in the relevant conditions, autonomous operation feature settings, and/or autonomous communication levels to facilitate determining a total risk for the vehicle 108. The server 140 may determine expected vehicle use based upon the use information received at block 1004, including expected levels of autonomous communication under a plurality of sets of parameters. For example, the server 140 may determine based upon past operating data that the 50% of the total operating time of the vehicle 108 is likely to occur in conditions where approximately a quarter of the vehicles utilize autonomous communication features, 40% of the total operating time is likely to occur in conditions where a negligible number of vehicles utilize autonomous communication features, and/or 10% is likely to occur in conditions where approximately half of vehicles utilize autonomous communication features. Of course, each of the categories in the preceding example may be further divided by other conditions, such as traffic levels, weather, average vehicle speed, presence of pedestrians, location, autonomous operation feature settings, and/or other parameters. These determinations may be used to further determine the total risk associated with autonomous vehicle operation including autonomous communication.

At block 1012, the server 140 may use the risk levels determined at block 1010 to determine a total expected risk level for the vehicle 108 including one or more autonomous communication features, in a similar manner to the determination described above in block 810. The server 140 may weight each of the risk levels corresponding to sets of parameters by the expected use levels corresponding to the same set of parameters. The weighted risk levels may then be aggregated using known techniques to determine the total risk level. As above, the total risk level may be adjusted or normalized, or it may be used to determine a risk category or risk class in accordance with regulatory requirements.

At block 1014, the server 140 may determine one or more premiums for vehicle insurance policies covering the vehicle 108 based upon the total risk level determined at block 1012. As in methods 800 and/or 900, additional factors may be included in the determination of the policy premiums, and/or the premiums may be adjusted based upon additional factors. The server 140 may further record the premiums and/or may transmit one or more of the policy premiums to relevant parties.

In any of the preceding embodiments, the determined risk level or premium associated with one or more insurance policies may be presented by the server 140 to a customer or potential customer as offers for one or more vehicle insurance policies. The customer may view the offered vehicle insurance policies on a display such as the display 202 of the mobile device 110, select one or more options, and/or purchase one or more of the vehicle insurance policies. The display, selection, and/or purchase of the one or more policies may be facilitated by the server 140, which may communicate via the network 130 with the mobile device 110 and/or another computer device accessed by the user.

Exemplary Method of Adjusting Insurance

In one aspect, a computer-implemented method of adjusting an insurance policy may be provided. The method may include (a) determining an accident risk factor, analyzing, via a processor, the effect on the risk of, or associated with, a potential vehicle accident of (1) an autonomous or semi-autonomous vehicle technology, and/or (2) an accident-related factor or element; (b) adjusting, updating, or creating (via the processor) an automobile insurance policy (or premium) for an individual vehicle equipped with the autonomous or semi-autonomous vehicle technology based upon the accident risk factor determined; and/or (c) presenting on a display screen (or otherwise communicating) all or a portion of the insurance policy (or premium) adjusted, updated, or created for the individual vehicle equipped with the autonomous or semi-autonomous vehicle functionality for review, approval, or acceptance by a new or existing customer, or an owner or operator of the individual vehicle. The method may include additional, fewer, or alternate actions, including those discussed elsewhere herein.

The autonomous or semi-autonomous vehicle technology may include and/or be related to a fully autonomous vehicle and/or limited human driver control. The autonomous or semi-autonomous vehicle technology may include and/or be related to: (a) automatic or semi-automatic steering; (b) automatic or semi-automatic acceleration and/or braking; (c) automatic or semi-automatic blind spot monitoring; (d) automatic or semi-automatic collision warning; (e) adaptive cruise control; and/or (t) automatic or semi-automatic parking assistance. Additionally or alternatively, the autonomous or semi-autonomous vehicle technology may include and/or be related to: (g) driver alertness or responsive monitoring; (h) pedestrian detection; (i) artificial intelligence and/or back-up systems; (j) navigation, GPS (Global Positioning System)-related, and/or road mapping systems; (k) security and/or anti-hacking measures; and/or (l) theft prevention and/or vehicle location determination systems or features.

The accident-related factor or element may be related to various factors associated with (a) past and/or potential or predicted vehicle accidents, and/or (b) autonomous or semi-autonomous vehicle testing or test data. Accident-related factors or elements that may be analyzed, such as for their impact upon automobile accident risk and/or the likelihood that the autonomous or semi-autonomous vehicle will be involved in an automobile accident, may include: (1) point of vehicle impact; (2) type of road involved in the accident or on which the vehicle typical travels; (3) time of day that an accident has occurred or is predicted to occur, or time of day that the vehicle owner typically drives; (4) weather conditions that impact vehicle accidents; (5) type or length of trip; (6) vehicle style or size; (7) vehicle-to-vehicle wireless communication; and/or (8) vehicle-to-infrastructure and/or infrastructure-to-vehicle) wireless communication.

The risk factor may be determined for the autonomous or semi-autonomous vehicle technology based upon an ability of the autonomous or semi-autonomous vehicle technology, and/or versions of, or updates to, computer instructions (stored on non-transitory computer readable medium or memory) associated with the autonomous or semi-autonomous vehicle technology, to make driving decisions and avoid crashes without human interaction. The adjustment to the insurance policy may include adjusting an insurance premium, discount, reward, or other item associated with the insurance policy based upon the risk factor (or accident risk factor) determined for the autonomous or semi-autonomous vehicle technology.

The method may further include building a database or model of insurance or accident risk assessment from (a) past vehicle accident information, and/or (b) autonomous or semi-autonomous vehicle testing information. Analyzing the effect on risk associated with a potential vehicle accident based upon (1) an autonomous or semi-autonomous vehicle technology, and/or (2) an accident-related factor or element (such as factors related to type of accident, road, and/or vehicle, and/or weather information, including those factors mentioned elsewhere herein) to determine an accident risk factor may involve a processor accessing information stored within the database or model of insurance or accident risk assessment.

Exemplary Method of Adjusting Insurance Based Upon Artificial Intelligence

In one aspect, a computer-implemented method of adjusting (or generating) an insurance policy may be provided. The method may include (1) evaluating, via a processor, a performance of an autonomous or semi-autonomous driving package of computer instructions (or software package) and/or a sophistication of associated artificial intelligence in a test environment; (2) analyzing, via the processor, loss experience associated with the computer instructions (and/or associated artificial intelligence) to determine effectiveness in actual driving situations; (3) determining, via the processor, a relative accident risk factor for the computer instructions (and/or associated artificial intelligence) based upon the ability of the computer instructions (and/or associated artificial intelligence) to make automated or semi-automated driving decisions for a vehicle and avoid crashes; (4) determining or updating, via the processor, an automobile insurance policy for an individual vehicle with the autonomous or semi-autonomous driving technology based upon the relative accident risk factor assigned to the computer instructions (and/or associated artificial intelligence); and/or (5) presenting on a display (or otherwise communicating) all or a portion of the automobile insurance policy, such as a monthly premium, to an owner or operator of the individual vehicle, or other existing or potential customer, for purchase, approval, or acceptance by the owner or operator of the individual vehicle, or other customer. The computer instructions may direct the processor to perform autonomous or semi-autonomous vehicle functionality and be stored on non-transitory computer media, medium, or memory. The method may include additional, fewer, or alternate actions, including those discussed elsewhere herein.

The autonomous or semi-autonomous vehicle functionality that is supported by the computer instructions and/or associated artificial intelligence may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous vehicle functionality may include and/or be related to: driver alertness or responsive monitoring; pedestrian detection; artificial intelligence and/or back-up systems; navigation or GPS-related systems; security and/or anti-hacking measures; theft prevention systems; and/or systems that may remotely locate stolen vehicles, such as via GPS coordinates.

The determination of the relative accident risk factor for the computer instructions and/or associated artificial intelligence may consider, or take into account, previous, future, or potential accident-related factors, including: point of impact; type of road; time of day; weather conditions; type or length of trip; vehicle style; vehicle-to-vehicle wireless communication; vehicle-to-infrastructure wireless communication; and/or other factors, including those discussed elsewhere herein.

The method may further include adjusting an insurance premium, discount, reward, or other item associated with an insurance policy based upon the relative accident risk factor assigned to the autonomous or semi-autonomous driving technology, the computer instructions, and/or associated artificial intelligence. Additionally or alternatively, insurance rates, ratings, special offers, points, programs, refunds, claims, claim amounts, etc. may be adjusted based upon the relative accident or insurance risk factor assigned to the autonomous or semi-autonomous driving technology, the computer instructions, and/or associated artificial intelligence.

Exemplary Methods of Providing Insurance Coverage

In one aspect, a computer-implemented method of adjusting or creating an insurance policy may be provided. The method may include: (1) capturing or gathering data, via a processor, to determine an autonomous or semi-autonomous technology or functionality associated with a specific vehicle; (2) comparing the received data, via the processor, to a stored baseline of vehicle data created from (a) actual accident data involving automobiles equipped with the autonomous or semi-autonomous technology or functionality, and/or (b) autonomous or semi-autonomous vehicle testing; (3) identifying (or assessing) accident or collision risk, via the processor, based upon an ability of the autonomous or semi-autonomous technology or functionality associated with the specific vehicle to make driving decisions and/or avoid or mitigate crashes; (4) adjusting or creating an insurance policy, via the processor, based upon the accident or collision risk identified that is based upon the ability of the autonomous or semi-autonomous technology or functionality associated with the specific vehicle; and/or (5) presenting on a display screen, or otherwise providing or communicating, all or a portion of (such as a monthly premium or discount) the insurance policy adjusted or created to a potential or existing customer, or an owner or operator of the specific vehicle equipped with the autonomous or semi-autonomous technology or functionality, for review, acceptance, and/or approval. The method may include additional, fewer, or alternative steps or actions, including those discussed elsewhere herein.

For instance, the method may include evaluating, via the processor, an effectiveness of the autonomous or semi-autonomous technology or functionality, and/or an associated artificial intelligence, in a test environment, and/or using real driving experience or information.

The identification (or assessment) of accident or collision risk performed by the processor may be dependent upon the extent of control and/or decision making that is assumed by the specific vehicle equipped with the autonomous or semi-autonomous technology or functionality, rather than the human driver. Additionally or alternatively, the identification (or assessment) of accident or collision risk may be dependent upon (a) the ability of the specific vehicle to use external information (such as vehicle-to-vehicle, vehicle-to-infrastructure, and/or infrastructure-to-vehicle wireless communication) to make driving decisions, and/or (b) the availability of such external information, such as may be determined by a geographical region (urban or rural) associated with the specific vehicle or vehicle owner.

Information regarding the autonomous or semi-autonomous technology or functionality associated with the specific vehicle, including factory-installed hardware and/or versions of computer instructions, may be wirelessly transmitted to a remote server associated with an insurance provider and/or other third party for analysis. The method may include remotely monitoring an amount or percentage of usage of the autonomous or semi-autonomous technology or functionality by the specific vehicle, and based upon such amount or percentage of usage, (a) providing feedback to the driver and/or insurance provider via wireless communication, and/or (b) adjusting insurance policies or premiums.

In another aspect, another computer-implemented method of adjusting or creating an automobile insurance policy may be provided. The method may include: (1) determining, via a processor, a relationship between an autonomous or semi-autonomous vehicle functionality and a likelihood of a vehicle collision or accident; (2) adjusting or creating, via a processor, an automobile insurance policy for a vehicle equipped with the autonomous or semi-autonomous vehicle functionality based upon the relationship, wherein adjusting or creating the insurance policy may include adjusting or creating an insurance premium, discount, or reward for an existing or new customer; and/or (3) presenting on a display screen, or otherwise communicating, all or a portion of the automobile insurance policy adjusted or created for the vehicle equipped with the autonomous or semi-autonomous vehicle functionality to an existing or potential customer, or an owner or operator of the vehicle for review, approval, and/or acceptance. The method may include additional, fewer, or alternative actions, including those discussed elsewhere herein.

For instance, the method may include determining a risk factor associated with the relationship between the autonomous or semi-autonomous vehicle functionality and the likelihood of a vehicle collision or accident. The likelihood of a vehicle collision or accident associated with the autonomous or semi-autonomous vehicle functionality may be stored in a risk assessment database or model. The risk assessment database or model may be built from (a) actual accident information involving vehicles having the autonomous or semi-autonomous vehicle functionality, and/or (b) testing of vehicles having the autonomous or semi-autonomous vehicle functionality and/or resulting test data. The risk assessment database or model may account for types of accidents, roads, and/or vehicles; weather conditions; and/or other factors, including those discussed elsewhere herein.

In another aspect, another computer-implemented method of adjusting or generating an insurance policy may be provided. The method may include: (1) receiving an autonomous or semi-autonomous vehicle functionality associated with a vehicle via a processor; (2) adjusting or generating, via the processor, an automobile insurance policy for the vehicle associated with the autonomous or semi-autonomous vehicle functionality based upon historical or actual accident information, and/or test information associated with the autonomous or semi-autonomous vehicle functionality; and/or (3) presenting on a display screen, or otherwise communicating, the adjusted or generated automobile insurance policy (for the vehicle associated with the autonomous or semi-autonomous vehicle functionality) or portions thereof for review, acceptance, and/or approval by an existing or potential customer, or an owner or operator of the vehicle. The adjusting or generating the automobile insurance policy may include calculating an automobile insurance premium, discount, or reward based upon actual accident or test information associated with the autonomous or semi-autonomous vehicle functionality. The method may also include: (a) monitoring, or gathering data associated with, an amount of usage (or a percentage of usage) of the autonomous or semi-autonomous vehicle functionality, and/or (b) updating, via the processor, the automobile insurance policy, or an associated premium or discount, based upon the amount of usage (or the percentage of usage) of the autonomous or semi-autonomous vehicle functionality. The method may include additional, fewer, or alternate actions, including those discussed elsewhere herein.

In another aspect, another computer-implemented method of generating or updating an insurance policy may be provided. The method may include: (1) developing an accident risk model associated with a likelihood that a vehicle having autonomous or semi-autonomous vehicle functionality or technology will be involved in a vehicle accident or collision, the accident risk model may comprise a database, table, or other data structure, the accident risk model and/or the likelihood that the vehicle having autonomous or semi-autonomous vehicle functionality or technology will be involved in a vehicle accident or collision may be determined from (i) actual accident information involving vehicles having the autonomous or semi-autonomous functionality or technology, and/or (ii) test data developed from testing vehicles having the autonomous or semi-autonomous functionality or technology; (2) generating or updating an automobile insurance policy, via a processor, for a vehicle equipped with the autonomous or semi-autonomous vehicle functionality or technology based upon the accident risk model; and/or (3) presenting on a display screen, or otherwise communicating, all or a portion of the automobile insurance policy generated or updated to an existing or potential customer, or an owner or operator of the vehicle equipped with the autonomous or semi-autonomous vehicle functionality or technology for review, approval, and/or acceptance. The autonomous or semi-autonomous vehicle functionality or technology may involve vehicle self-braking or self-steering functionality. Generating or updating the automobile insurance policy may include calculating an automobile insurance premium, discount, and/or reward based upon the autonomous or semi-autonomous vehicle functionality or technology and/or the accident risk model. The method may include additional, fewer, or alternate actions, including those discussed elsewhere herein.

In another aspect, another computer-implemented method of generating or updating an insurance policy may be provided. The method may include (a) developing an accident risk model associated with (1) an autonomous or semi-autonomous vehicle functionality, and/or (2) a likelihood of a vehicle accident or collision. The accident risk model may include a database, table, and/or other data structure. The likelihood of the vehicle accident or collision may comprise a likelihood of an actual or potential vehicle accident involving a vehicle having the autonomous or semi-autonomous functionality determined or developed from analysis of (i) actual accident information involving vehicles having the autonomous or semi-autonomous functionality, and/or (ii) test data developed from testing vehicles having the autonomous or semi-autonomous functionality. The method may include (b) generating or updating an automobile insurance policy, via a processor, for a vehicle equipped with the autonomous or semi-autonomous vehicle functionality based upon the accident risk model; and/or (c) presenting on a display, or otherwise communicating, all or a portion of the automobile insurance policy generated or updated for review and/or acceptance by an existing or potential customer, or an owner or operator of the vehicle equipped with the autonomous or semi-autonomous vehicle functionality. The method may include additional, fewer, or alternate actions or steps, including those discussed elsewhere herein.

In another aspect, a computer-implemented method of adjusting or creating an insurance policy may be provided. The method may include (a) estimating an accident risk factor for a vehicle having an autonomous or semi-autonomous vehicle functionality based upon (1) a specific, or a type of, autonomous or semi-autonomous vehicle functionality; and/or (2) actual accident data or vehicle testing data associated with vehicles having autonomous or semi-autonomous vehicle functionality; (h) adjusting or creating an automobile insurance policy for an individual vehicle equipped with the autonomous or semi-autonomous vehicle functionality based upon the accident risk factor associated with the autonomous or semi-autonomous vehicle functionality; and/or (c) presenting on a display, or otherwise communicating, all or a portion of the automobile insurance policy adjusted or created based upon the accident risk factor associated with the autonomous or semi-autonomous vehicle functionality to an existing or potential customer, or an owner or operator of the individual vehicle equipped with the autonomous or semi-autonomous vehicle functionality for review, approval, or acceptance. The method may include additional, fewer, or alternate actions, including those discussed elsewhere herein.

In another aspect, a computer-implemented method of adjusting or generating an automobile insurance policy may be provided. The method may include: (1) collecting data, via a processor, related to (a) vehicle accidents involving vehicles having an autonomous or semi-autonomous vehicle functionality or technology, and/or (b) testing data associated with such vehicles; (2) based upon the data collected, identifying, via the processor, a likelihood that a vehicle employing a specific autonomous or semi-autonomous vehicle functionality or technology will be involved in a vehicle accident or collision; (3) receiving, via the processor, an insurance-related request for a vehicle equipped with the specific autonomous or semi-autonomous vehicle functionality or technology; (4) adjusting or generating, via the processor, an automobile insurance policy for the vehicle equipped with the specific autonomous or semi-autonomous vehicle functionality or technology based upon the identified likelihood that the vehicle employing the specific autonomous or semi-autonomous vehicle functionality or technology will be involved in a vehicle accident or collision; and/or (5) presenting on a display, or otherwise communicating, all or a portion of the automobile insurance policy adjusted or generated for the vehicle equipped with the specific autonomous or semi-autonomous vehicle functionality or technology for review, approval, or acceptance by an existing or potential customer, or an owner or operator of the vehicle equipped with the specific autonomous or semi-autonomous vehicle functionality or technology. The method may include additional, fewer, or alternate actions, including those discussed elsewhere herein.

For the methods and embodiments discussed directly above, and elsewhere herein, the autonomous or semi-autonomous technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Exemplary V2V Wireless Communication Functionality

In one aspect, a computer-implemented method of generating or adjusting an automobile insurance policy may be provided. The method may include: (1) determining a likelihood that vehicles employing a vehicle-to-vehicle (V2V) wireless communication-based autonomous or semi-autonomous vehicle functionality or technology will be involved in an accident or collision; (2) receiving data or a request for automobile insurance, via a processor, indicating that a specific vehicle is equipped with the vehicle-to-vehicle (V2V) wireless communication-based autonomous or semi-autonomous vehicle functionality or technology; (3) generating or adjusting an automobile insurance policy for the specific vehicle, via the processor, based upon the likelihood that vehicles employing the V2V wireless communication-based autonomous or semi-autonomous vehicle functionality or technology will be involved in an accident or collision; and/or (4) presenting on a display, or otherwise communicating, a portion or all of the automobile insurance policy generated or adjusted for the specific vehicle equipped with the V2V wireless communication-based autonomous or semi-autonomous vehicle functionality or technology for review, approval, or acceptance by an existing or potential customer, or an owner or operator of the vehicle that is equipped with the V2V wireless communication-based autonomous or semi-autonomous vehicle functionality or technology.

The method may further include: monitoring and/or collecting, via the processor, data associated with an amount of usage (or percentage of usage) by the specific vehicle of the V2V wireless communication-based autonomous or semi-autonomous vehicle functionality or technology; adjusting, via the processor, the insurance policy (such as insurance premium, discount, reward, etc.) based upon the amount of usage (or percentage of usage) by the specific vehicle of the V2V wireless communication-based autonomous or semi-autonomous vehicle functionality or technology; and/or presenting or communicating, via the processor, the adjustment to the insurance policy based upon the amount of usage (or percentage of usage) by the specific vehicle of the V2V wireless communication-based autonomous or semi-autonomous vehicle functionality or technology to the vehicle owner or operator, or an existing or potential customer. The method may include additional, fewer, or alternate actions, including those discussed elsewhere herein.

For the method discussed directly above, the V2V wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

In another aspect, another computer-implemented method of generating or adjusting an automobile insurance policy may be provided. The method may include (1) receiving data or a request for automobile insurance, via a processor, indicating that a vehicle is equipped with a vehicle-tovehicle (V2V) wireless communication-based autonomous or semi-autonomous vehicle functionality or technology. The V2V wireless communication-based autonomous or semi-autonomous vehicle functionality or technology may enable the vehicle to automatically self-brake and/or automatically self-steer based upon a wireless communication received from a second vehicle. The wireless communication may indicate that the second vehicle is braking or maneuvering. The method may include (2) generating or adjusting an automobile insurance policy for the specific vehicle, via the processor, based upon the V2V wireless communication-based autonomous or semi-autonomous vehicle functionality or technology of the vehicle; and/or (3) presenting on a display, or otherwise communicating, a portion or all of the automobile insurance policy generated or adjusted for the vehicle equipped with the V2V wireless communication-based autonomous or semi-autonomous vehicle functionality or technology for review, approval, or acceptance by an existing or potential customer, or an owner or operator of the vehicle that is equipped with the V2V wireless communication-based autonomous or semi-autonomous vehicle functionality or technology.

The method may also include: determining a likelihood that vehicles employing the vehicle-to-vehicle (V2V) wireless communication-based autonomous or semi-autonomous vehicle functionality or technology will be involved in an accident or collision; and/or generating or adjusting the automobile insurance policy for the specific vehicle is based at least in part on the likelihood of accident or collision determined. The method may include additional, fewer, or alternate actions, including those discussed elsewhere herein.

Exemplary Wireless Communication Functionality

In one aspect, a computer-implemented method of generating or adjusting an automobile insurance policy may be provided. The method may include: (1) determining a likelihood that vehicles employing a wireless communication-based autonomous or semi-autonomous vehicle functionality or technology will be involved in an automobile accident or collision, the wireless communication-based autonomous or semi-autonomous vehicle functionality or technology includes wireless communication capability between (a) individual vehicles, and (b) roadside or other travel-related infrastructure; (2) receiving data or a request for automobile insurance; via a processor, indicating that a specific vehicle is equipped with the wireless communication-based autonomous or semi-autonomous vehicle functionality or technology; (3) generating or adjusting an automobile insurance policy for the specific vehicle, via the processor, based upon the likelihood that vehicles employing the wireless communication-based autonomous or semi-autonomous vehicle functionality or technology will be involved in automobile accident or collisions; and/or (4) presenting on a display, or otherwise communicating, all or a portion of the automobile insurance policy generated or adjusted for the vehicle equipped with the wireless communication-based autonomous or semi-autonomous vehicle functionality or technology for review; approval, or acceptance by an existing or potential customer, or an owner or operator of the vehicle.

The roadside or travel-related infrastructure may be a smart traffic light, smart stop sign, smart railroad crossing indicator, smart street sing, smart road or highway marker; smart tollbooth, Wi-Fi hotspot, superspot, and/or other vehicle-to-infrastructure (V2I) component with two-way wireless communication to and from the vehicle, and/or data download availability.

The method may further include: monitoring and/or collecting data associated with, via the processor, an amount of usage (or percentage of usage) of the wireless communication-based autonomous or semi-autonomous vehicle functionality or technology by the specific vehicle; adjusting, via the processor, the insurance policy (such as an insurance premium, discount, reward, etc.) based upon the amount of usage (or percentage of usage) by the specific vehicle of the wireless communication-based autonomous or semi-autonomous vehicle functionality or technology; and/or presenting or communicating; via the processor, the adjustment to the insurance policy based upon the amount of usage (or percentage of usage) by the specific vehicle of the wireless communication-based autonomous or semi-autonomous vehicle functionality or technology to the vehicle owner or operator, and/or an existing or potential customer. The method may include additional, fewer, or alternate actions, including those discussed elsewhere herein.

For the method discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

In another aspect, a computer-implemented method of generating or adjusting an automobile insurance policy may be provided. The method may include (1) receiving data or a request for automobile insurance, via a processor, indicating that a vehicle is equipped with a wireless communication-based autonomous or semi-autonomous vehicle functionality or technology. The wireless communication-based autonomous or semi-autonomous vehicle functionality or technology may include wireless communication capability between (a) the vehicle, and (b) roadside or other travel-related infrastructure, and may enable the vehicle to automatically self-brake and/or automatically self-steer based upon wireless communication received from the roadside or travel-related infrastructure. The wireless communication transmitted by the roadside or other travel-related infrastructure to the vehicle may indicate that the vehicle should brake or maneuver. The method may include (2) generating or adjusting an automobile insurance policy for the vehicle, via the processor, based upon the wireless communication-based autonomous or semi-autonomous vehicle functionality or technology of the vehicle; and/or (3) presenting on a display, or otherwise communicating, all or a portion of the automobile insurance policy generated or adjusted for the vehicle equipped with the wireless communication-based autonomous or semi-autonomous vehicle functionality or technology for review, approval, or acceptance by an existing or potential customer, or an owner or operator of the vehicle. The method may include additional, fewer, or alternate actions, including those discussed elsewhere herein.

Autonomous Vehicle Insurance Policies

The disclosure herein relates to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator control other aspects of the operation of the vehicle. The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator, Operating input from a vehicle operator excludes selection of a destination or selection of settings relating to the one or more autonomous operation features.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals. Although insurance policy premiums are typically associated with an insurance policy covering a specified period of time, they may likewise be associated with other measures of a duration of an insurance policy, such as a specified distance traveled or a specified number of trips. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company. The terms "insured," "insured party," "policyholder," and "customer" are used interchangeably herein to refer to a person, party, or entity (e.g., a business or other organizational entity) that is covered by the insurance policy, e.g., whose insured article or entity is covered by the policy. Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm), In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or al least one and the singular also includes the plural unless it is obvious that it is meant otherwise.

This detailed description is to be construed as exemplary only and does not describe every possible embodiment, as describing every possible embodiment would be impractical, if not impossible, One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for assessing collision risk of autonomous vehicle operation, the method comprising:
   receiving, by a server from an on-board computer of a vehicle, information regarding one or more autonomous operation features of the vehicle;
   determining, by the server, a plurality of collision risk levels associated with an autonomous operation of the vehicle under a plurality of operating environments based upon the information regarding the one or more autonomous operation features;
   determining, by the server, a plurality of expected use levels of the vehicle based upon log entries of vehicle operation data;
   determining, by the server, a plurality of autonomous communication levels within the plurality of operating environments associated with the plurality of expected use levels of the vehicle, the plurality of autonomous communication levels indicating availability of each of a plurality of type of autonomous communication capability in other vehicles as a proportion of the other vehicles in corresponding environments that exhibit the plurality of type of autonomous communication capability;
   determining, by the server, a total collision risk level associated with the autonomous operation of the vehicle based at least in part upon: (i) the plurality of collision risk levels, (ii) the plurality of expected use levels, and (iii) the plurality of autonomous communication levels; and
   communicating, from the server to a computing device, information regarding the total collision risk level to cause one or more actions to be performed based upon the total collision risk level.

2. The computer-implemented method of claim 1, wherein the plurality of autonomous communication levels include information relating to one or more of: levels of autonomous communication with infrastructures, or frequency of autonomous communications between the vehicle and the other vehicles.

3. The computer-implemented method of claim 1, further comprising:
   receiving, by the server, information regarding previous use of the one or more autonomous operation features; and
   wherein the plurality of expected use levels are determined based at least in part upon the information regarding the previous use of the one or more autonomous operation features.

4. The computer-implemented method of claim 3, wherein the information regarding the previous use of the one or more autonomous operation features includes information regarding previous use of an autonomous communication feature.

5. The computer-implemented method of claim 1, wherein the information regarding the one or more autonomous operation features is based upon: (i) test results for test units corresponding to the one or more autonomous operation features, the test results including responses of the test units to test inputs corresponding to test scenarios, and (ii) actual collision data associated with a plurality of other vehicles having at least one of the one or more autonomous operation features.

6. The computer-implemented method of claim 1, wherein the total collision risk level is determined without reference to factors relating to collision risk associated with an operator of the vehicle.

7. The computer-implemented method of claim 1, further comprising:
   receiving, by the server, information regarding an operator of the vehicle;
   determining, by the server, an operator collision-risk profile associated with vehicle operation by the operator of the vehicle; and
   wherein the total collision risk level is determined based at least in part upon the operator collision-risk profile.

8. A computer system for assessing collision risk of autonomous vehicle operation, the system comprising:
   one or more processors; and
   a program memory coupled to the one or more processors and storing executable instructions that, when executed by the one or more processors, cause the computer system to:
      receive information regarding one or more autonomous operation features of a vehicle;
      determine a plurality of collision risk levels associated with an autonomous operation of the vehicle under a plurality of operating environments based upon the information regarding the one or more autonomous operation features;

determine a plurality of expected use levels of the vehicle based upon log entries of vehicle operation data;

determine a plurality of autonomous communication levels within the plurality of operating environments associated with the plurality of expected use levels of the vehicle, the plurality of autonomous communication levels indicating availability of each of a plurality of type of autonomous communication capability in other vehicles as a proportion of the other vehicles in corresponding environments that exhibit the plurality of type of autonomous communication capability;

determine a total collision risk level associated with the autonomous operation of the vehicle based at least in part upon: (i) the plurality of collision risk levels, (ii) the plurality of expected use levels, and (iii) the plurality of autonomous communication levels; and communicate information regarding the total collision risk level to cause one or more actions to be performed based upon the total collision risk level.

9. The computer system of claim 8, wherein the plurality of autonomous communication levels include information relating to one or more of: levels of autonomous communication with infrastructures, or frequency of autonomous communications between the vehicle and the other vehicles.

10. The computer system of claim 8, wherein the executable instructions, when executed by the one or more processors, further cause the computer system to:

receive information regarding previous use of the one or more autonomous operation features; and wherein the plurality of expected use levels are determined based at least in part upon the information regarding the previous use of the one or more autonomous operation features.

11. The computer system of claim 10, wherein the information regarding the previous use of the one or more autonomous operation features includes information regarding previous use of an autonomous communication feature.

12. The computer system of claim 8, wherein the information regarding the one or more autonomous operation features is based upon: (i) test results for test units corresponding to the one or more autonomous operation features, the test results including responses of the test units to test inputs corresponding to test scenarios, and (ii) actual collision data associated with a plurality of other vehicles having at least one of the one or more autonomous operation features.

13. The computer system of claim 8, wherein the total collision risk level is determined without reference to factors relating to collision risks associated with an operator of the vehicle.

14. The computer system of claim 8, wherein the executable instructions, when executed by the one or more processors, further cause the computer system to:

receive information regarding an operator of the vehicle;

determine an operator collision-risk profile associated with vehicle operation by the operator of the vehicle; and wherein the total collision risk level is determined based at least in part upon the operator collision-risk profile.

15. A tangible, non-transitory computer-readable medium storing instructions for assessing collision risk of autonomous vehicle operation that, when executed by at least one processor of a computer system, cause the computer system to:

receive information regarding one or more autonomous operation features of a vehicle at a server from an on-board computer of the vehicle;

determine a plurality of collision risk levels associated with an autonomous operation of the vehicle under a plurality of operating environments based upon the information regarding the one or more autonomous operation features;

determine a plurality of expected use levels of the vehicle based upon log entries of vehicle operation data;

determine a plurality of autonomous communication levels within the plurality of operating environments associated with the plurality of expected use levels of the vehicle, the plurality of autonomous communication levels indicating availability of each of a plurality of type of autonomous communication capability in other vehicles as a proportion of the other vehicles in corresponding environments that exhibit the plurality of type of autonomous communication capability;

determine a total collision risk level associated with the autonomous operation of the vehicle based at least in part upon: (i) the plurality of collision risk levels, (ii) the plurality of expected use levels, and (iii) the plurality of autonomous communication levels; and communicate information regarding the total collision risk level to cause one or more actions to be performed based upon the total collision risk level.

16. The tangible, non-transitory computer-readable medium of claim 15, wherein the plurality of autonomous communication levels include information relating to one or more of: levels of autonomous communication with infrastructures, or frequency of autonomous communications between the vehicle and the other vehicles.

17. The tangible, non-transitory computer-readable medium of claim 15, further comprising instructions that, when executed by the at least one processor, cause the computer system to:

receive information regarding previous use of the one or more autonomous operation features; and wherein the plurality of expected use levels are determined based at least in part upon the information regarding the previous use of the one or more autonomous operation features.

18. The tangible, non-transitory computer-readable medium of claim 17, wherein the information regarding the previous use of the one or more autonomous operation features includes information regarding previous use of an autonomous communication feature.

19. The computer-implemented method of claim 1, wherein the one or more actions to be performed based upon the total collision risk level include: adjusting an insurance policy associated with the vehicle, determining a coverage level associated with the insurance policy, presenting information regarding the total collision risk level to a reviewer to verify the total collision risk level, or presenting the total collision risk level to a customer for review of an adjustment to an insurance policy associated with the vehicle.

20. The computer system of claim 8, wherein the one or more actions to be performed based upon the total collision risk level include: adjusting an insurance policy associated with the vehicle, determining a coverage level associated with the insurance policy, presenting information regarding the total collision risk level to a reviewer to verify the total collision risk level, or presenting the total collision risk level to a customer for review of an adjustment to an insurance policy associated with the vehicle.

* * * * *